United States Patent [19]

McFee et al.

[11] Patent Number: 6,026,135
[45] Date of Patent: Feb. 15, 2000

[54] MULTISENSOR VEHICLE-MOUNTED MINE DETECTOR

[75] Inventors: John E. McFee; Victor C. Aitken; Yogadhish Das; Kevin L. Russell; Chris A. Brosinsky; Robert H. Chesney, all of Medicine Hat; Philip Church, Kanata; George Gundesen, Calgary; Edward T. H. Clifford, Deep River; E. Barclay Selkirk, Greenspond; Harry Ing, Deep River; Robert O. Ellingson, Redcliff; Steven G. Penzes, Medicine Hat; Mick Saruwatari, Calgary; Kevin Saruwatari, Calgary; Craig Poulsom, Calgary, all of Canada

[73] Assignee: Her Majesty the Queen in right of Canada, as represented by the Minister of National Defence of Her Majesty's Canadian Government

[21] Appl. No.: 09/054,397

[22] Filed: Apr. 3, 1998

Related U.S. Application Data

[60] Provisional application No. 60/041,929, Apr. 4, 1997.

[51] Int. Cl.⁷ .............. G21G 1/06; G01T 1/00; G01V 3/08; G01J 1/00
[52] U.S. Cl. .......... 376/159; 376/154; 324/326; 324/329; 324/337; 250/392
[58] Field of Search ............. 376/159, 154; 324/326, 327, 328, 329, 337; 250/392, 359

[56] References Cited

U.S. PATENT DOCUMENTS

| | | | |
|---|---|---|---|
| 3,341,706 | 9/1967 | Swift et al. | 376/159 |
| 3,505,520 | 4/1970 | Stewart et al. | 376/159 |
| 3,898,463 | 8/1975 | Noakes | 250/367 |
| 3,997,787 | 12/1976 | Fearon et al. | 250/359 |
| 4,004,212 | 1/1977 | Wortman | 324/3 |
| 4,134,016 | 1/1979 | Larsen | 250/392 |

(List continued on next page.)

FOREIGN PATENT DOCUMENTS

| | | | |
|---|---|---|---|
| 2174496 | 2/1999 | Canada . | |
| 2588969 | 4/1987 | France | 376/159 |
| WO 90/16072 | 12/1990 | WIPO | 376/159 |
| WO 91/11009 | 7/1991 | WIPO | 376/159 |

OTHER PUBLICATIONS

"The Detection of Buried Explosive Objects", McFee et al., Can. J. Remote Sensing 6, p. 104, Dec. 1980.

"Advances in the Location and Identification of Hidden Explosive Munitions (U)", McFee et al., Suffield Report 548, Feb. 1991. Unclassified.

"Crad Countermine R&D Study—Final Report (U)", McFee et al., Suffield Special Publication 174, Apr. 1994. Unclassified.

(List continued on next page.)

*Primary Examiner*—Michael J. Carone
*Assistant Examiner*—Fredrick T. French, III
*Attorney, Agent, or Firm*—Larson & Taylor

[57] ABSTRACT

A multisensor vehicle-mounted mine detector having one or more sensors leading the vehicle for detecting objects in the ground while moving. A navigational system tracks the coordinates of the detected objects, performs data fusion, declares whether the object is a target worthy of interest and if so, stops the vehicle with a trailing thermal neutron activator sensor (TNA) over the coordinates of the object and interrogating the object with slow neutrons to confirm whether it contains sufficient nitrogen to indeed be a mine. The TNA confirmation is kept brief due to the use of a strong source coupled with means for analysing the resultant pulses and rejecting piled-up pulses. The difference between an integration of the entire pulse and a portion of the pulse is compared against a predetermined difference for a normal pulse wherein variations therebetween are indicative of a piled-up pulse which is then rejected. If a mine is confirmed it is then temporarily physically marked with a mixture of a dry granular, free-flowing superabsorbent polymer and dyed liquid to form a voluminous semi-solid gel.

34 Claims, 49 Drawing Sheets

U.S. PATENT DOCUMENTS

| | | | |
|---|---|---|---|
| 4,152,596 | 5/1979 | Marshall, III | 250/358 R |
| 4,362,947 | 12/1982 | Perraudin et al. | 378/150 |
| 4,568,510 | 2/1986 | Caldwell | 376/154 |
| 4,593,198 | 6/1986 | Pang et al. | 250/366 |
| 4,612,443 | 9/1986 | Alcidi | 250/362 |
| 4,641,566 | 2/1987 | Pomeroy | 89/1.13 |
| 5,080,856 | 1/1992 | Grenier | 376/159 |
| 5,132,622 | 7/1992 | Valentino | 324/326 |
| 5,135,704 | 8/1992 | Shefer et al. | 376/108 |
| 5,135,706 | 8/1992 | Costes et al. | 376/245 |
| 5,206,653 | 4/1993 | Westphal | 342/61 |
| 5,307,272 | 4/1994 | Butler et al. . | |
| 5,410,575 | 4/1995 | Uhm | 376/159 |
| 5,452,639 | 9/1995 | Aulenbacher et al. | 89/1.13 |
| 5,629,626 | 5/1997 | Russell et al. | 324/345 |
| 5,680,048 | 10/1997 | Wollny | 324/329 |
| 5,719,500 | 2/1998 | Eschner et al. | 324/329 |
| 5,869,967 | 2/1999 | Straus | 324/326 |
| 5,886,664 | 3/1999 | Yujiri et al. | 342/351 |

OTHER PUBLICATIONS

"IR Contrast Prediction of Shallowly Buried Objects by Characterizing the Temperature Gradient into the Soil", Simard, Patent Disclosure, Jan. 24, 1996.

"Fused Airborne Sensor Technology", Summey et al., Proc. SPIE Conference on Detection and Remediation Technologies for Mines and Mine–like Targets, vol. 2765, Orlando, Fl, USA, Apr. 9–12, 1996, pp. 226–232.

"Multisensor Application for Mines and Minelike Target Detection in the Operational Environment", Hanshaw, Proc. SPIE Conference on Detection and Remediation Technologies for Mines and Mine–like Targets, vol. 2765, Orlando, FL, USA, Apr. 9–12, 1996, pp. 249–258.

"A Multisensor System for Mine Detection", Garriott et al., Proc. SPIE Conference on Detection and Remediation Technologies for Mines and Mine–like Targets, vol. 2765, Orlando, FL, USA, Apr. 9–12, 1996, pp. 259–268.

"IGMMDT: A Multisensor Approach to Mine Detection", Gorman, Proc. SPIE Conference on Detection and Remediation Technologies for Mines and Mine–like Targets, vol. 2765, Orlando, FL, USA, Apr. 9–12, 1996, pp. 269–274.

"Multisensor Fusion for the Detection of Mines and Mine–like Targets", Hanshaw, Proc. SPIE Conference on Detection Technologies for Mines and Mine–like Targets, vol. 2496, Orlando, FL, USA, Apr. 17–21, 1995, pp. 152–158.

"Model–based Sensor Fusion for Minefield Detection", Bargel et al., Proc. SPIE Conference on Detection Technologies for Mines and Mine–like Targets, vol. 2496, Orlando, FL, USA, Apr. 17–21, 1995, pp. 509–518.

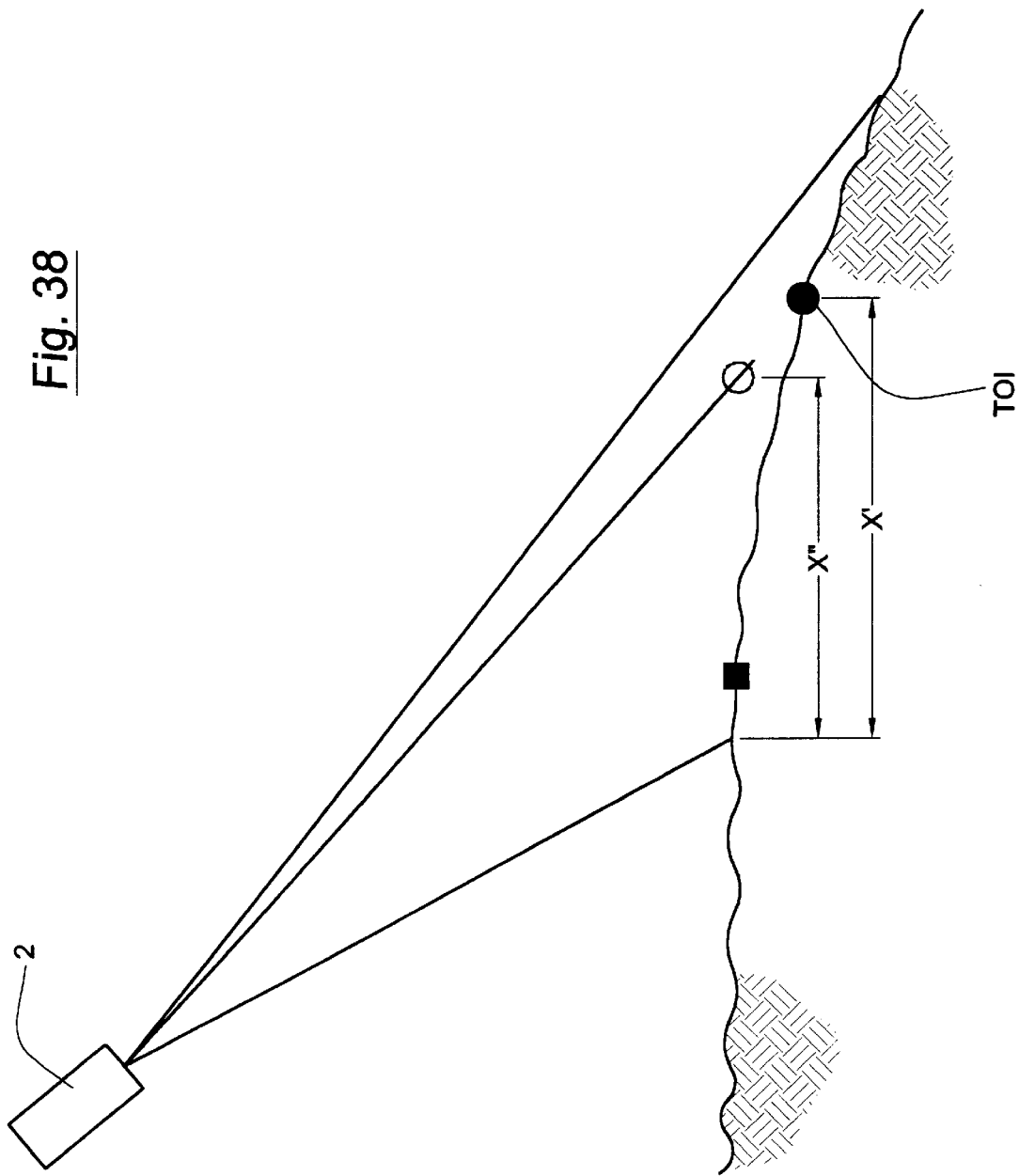

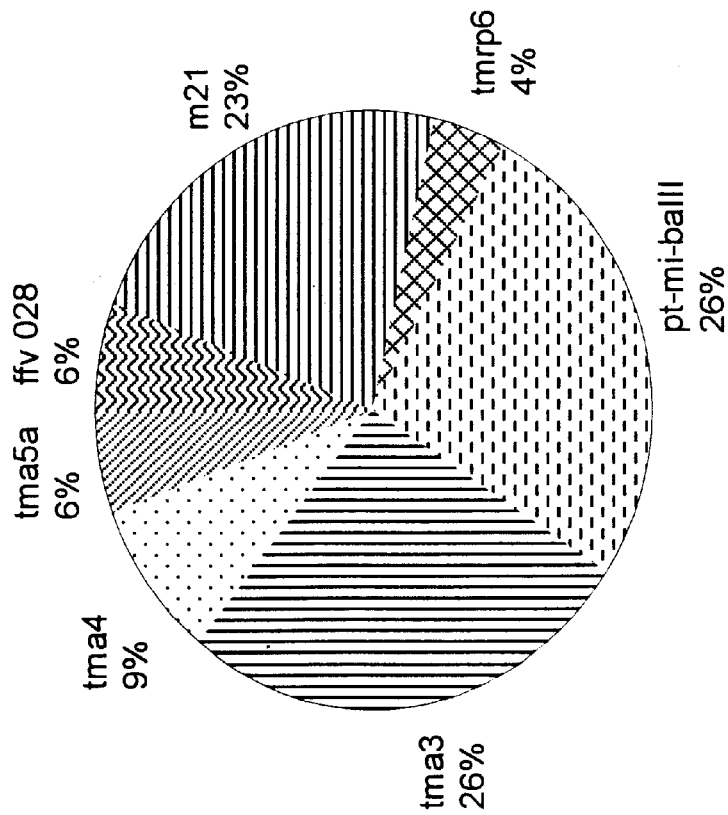
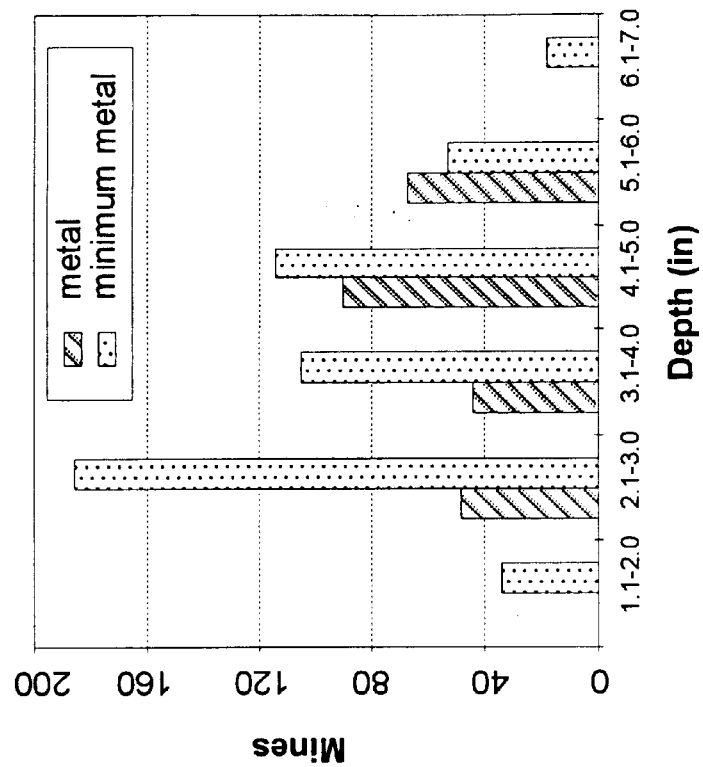
Fig. 42b
Fig. 42a

MULTISENSOR VEHICLE-MOUNTED MINE DETECTOR

CROSS REFERENCE TO RELATED APPLICATIONS

This Application claims the benefit of U.S. Provisional application Ser. No. 60/041,929, filed on Apr. 04, 1997.

FIELD OF THE INVENTION

The invention relates to apparatus and method for detecting mines using a plurality of sensors mounted on a remote controlled vehicle and then physically marking confirmed mines for follow-up neutralisation. Sensors used include infrared, electromagnetic induction, ground-penetrating radar and a thermal neutron activation sensor having high rate pulse pileup rejection circuitry. A confirmed mine is physically marked with a superabsorbant polymer, water and dye mixture.

BACKGROUND OF THE INVENTION

Much effort has been expended in area of ground-based detection of mines. While a number of technologies have been applied to the task, each is particular to the type of mine, the terrain, or the time pressures for detection, i.e. during the stress of combat or during peace time. There is an objective to obtain the highest probability of detection (Pd) and the lowest false alarm rate (FAR). Further, there is the objective cover ground at a high rate of speed which equates to clearance of mines at a faster rate.

Conventional methods include hand-held, ground based vehicle-mounted or airborne detectors. Vehicle-mounted detectors have a high ground speed and hand-held detectors are intended for places that vehicle-mounted detectors cannot reach. The hand-held detectors have a slow ground speed. Airborne detectors are fast but are designed for gross detection of minefields and as such generally have a lower Pd and higher FAR than the other two methods.

The prior art detection apparatus and methodology have employed a variety of different single sensor technologies, including electromagnetic induction, magnetometers, impedance measurements, ground probing radar, millimeter and microwave radiometry, optical and infrared imaging (IR), ultraviolet, acoustics, various nuclear methods, trace gas detection, biodetection, and mechanical probes.

Some hand-held sensors, using electromagnetic induction detectors, achieve a desirably high Pd for metallic mines but can be associated with a high FAR, i.e. detecting metallic debris which are not mines. The applicants are not aware of hand-held detectors which can reliably detect nonmetallic mines.

Thermal Neutron Activation (TNA) is another known sensor technology for detection and relative quantification of nitrogen in nitrogen-based explosives. A long standing known application is the use of TNA for detection of explosives in baggage. Applicants are also aware of application of TNA applied to continuously moving mine-detection vehicles for dynamically detecting mines. It is applicant's understanding that this moving application has been unsuccessful thus far due to the incompatibility of covering ground relatively quickly and collecting sufficient gamma rays to reliably assess the nitrogen content of an object.

Prior art attempts have been attempted to assess the data from combinations of IR, radar and metal detectors. "Data Fusion" is known which combines and analyses a plurality of sensor data as a whole. In conventional information-analysis systems, individual data from each sensor is weighted or compared to a threshold, then combined for improving decision-making. One disadvantage with data fusion alone is that despite the potential for improved detection probabilities, there is also a greater likelihood of greater false positive detections.

For ground-based, vehicle-mounted mine detection, the majority of prior art systems are single sensor systems using electromagnetic induction (EMI) or ground penetrating radar (GPR). Known combinations of sensors include using forward-looking IR (FLIR) cameras, EMI arrays and GPR. To date, applicant's believe that data from each sensor has been presented separately to an operator who has had the very difficult task of sorting out the simultaneous information or a combination of sensors merely improves the likelihood of identifying potential hazardous objects In short, the prior art teaches:
  ground-based, vehicle-mounted sensors for detecting mines;
  use of multiple mine detecting sensors on one vehicle;
  data fusion techniques for combining the data from multiple sensors generally for improving the probability of detection; and
  use of massive TNA sensors for baggage interrogation or for detection under moving, short time duration sensing.

There is a demonstrated need for a system which will traverse the ground at a reasonable rate and rather than being able to suggest that the object is likely a mine, a system which will substantially confirming whether a detected object is a mine or not.

Thermal Neutron Activation (TNA) is known for inspecting baggage for the presence of nitrogen, a known constituent of explosives. Generally, a target of interest, such as baggage, is exposed to thermal (slow) neutrons. A reaction between the thermal neutrons and nitrogen-14 causes emission of gamma rays. The emitted gamma rays are captured, counted and processed with electronics to determine the presence or concentration of nitrogen.

To count the gamma rays, events detected by a scintillation crystal are converted to an output signal containing serial pulses. High energy pulses are sought as being indicative of the presence of nitrogen. Low energy pulses are ignored (by applying a threshold or fast discriminator). Unfortunately, as the rate of pulses increases, such as is the result of using a high strength source and a close target, low energy pulses can be too closely spaced in time and pile-up upon each other. The apparent energy of the low energy piled-up pulses can exceed the detection threshold and be incorrectly interpreted as a high energy pulse representing nitrogen. Methods are successfully practised to reject such pileup at counting rates of upwards of 200,000 counts per second (cps).

Low efficiency detectors such as Germanium directly generate pulses having a shape which can be processed with conventional amplifiers at count rates in the 200,000–400,000 cps. To use Germanium detectors would require use of very high strength sources or many detectors—the costs being 10 to 20 time greater than using Sodium Iodide. Further, the Germanium units require cryogenics. High efficiency detectors such as a Sodium Iodide detector can use a lower strength source, but the detector collects and output pulses having a shape which is subject to greater incidences of pile-up. Applicant is not aware of amplifiers or methods for rejecting pile-up at count rates from NaI detectors of over 200,000 cps.

Should an object be deemed to be a mine, it needs to be marked for subsequent neutralisation, usually by digging it out of the ground. The existing line marking and other spray paint means are substantially massless, are difficult to place on ground and are only visible if viewed substantially straight on. Further, paints and the like are usually associated with toxicity and are semi-permanent. There is opportunity and a need for a temporary, environmentally friendly and highly visible marking scheme.

SUMMARY OF THE INVENTION

A plurality of sensors are provided, mounted to a vehicle for the sensing, identification and marking of mines for subsequent clearance. A plurality of sensors lead the vehicle to identify targets of interest and a trailing sensor confirms whether the identified target is a mine. The vehicle is optimised to operate within certain restricted guidelines including: limiting detection of mines upon roadways or other similarly homogenous paths and limiting the search for the greater than 90% of mines which contain at least some metal. Completely non-metallic mines constitute only <1% of all mines. Even plastic mines contain some metal (i.e. in the fuse). Particularly for anti-tank mines, the <1% non-metallic mines are ignored and ideally should be previously cleared by the preceding vehicle. Further however, certain limitations have been lifted including no longer being required to operate in a high intensity conflict role and instead being operated in peace-time and other non-threatening environments.

One aspect of the invention comprises implementation of a TNA sensor as a confirmatory sensor in contradistinction to the prior art explosive detectors which have traditionally used a large, expensive and technically complex TNA as a primary sensor. Used in combination with conventional sensors, a stationary, confirmatory TNA sensor can be applied with more specificity and thus can be smaller, yet provide faster confirmation. Implementation of a stationary TNA sensor in an otherwise moving system requires a particular and synergistic combination of features. The use of a confirmation sensor permits rapid identification of targets of interest and, even having a relatively slow confirmation step, ground can be traversed at a reasonable speed and with minimum false alarms.

In brief the system comprises:
a. a moving vehicle to traverse the ground quickly having a plurality of sensors mounted to the vehicle and capable of identifying targets of interest while in motion;
b. a TNA which is connected to the vehicle yet which is operated only when the vehicle is stationary;
c. a navigation system which
   accurately records the location of targets of interest located by the moving sensors,
   accurately retains the absolute location of the target throughout vehicle motion including acceleration and deceleration; and
d. apparatus for communicating with the navigation system, obtaining the absolute target location and then positioning the TNA over the target of interest once the vehicle is rendered stationary. The TNA has a narrow view of view which necessitates accurate positioning of the TNA over the target location so that it may be operated to confirm whether the target is explosive or not.

In order to properly position the TNA sensor, one must be able to pinpoint a target of interest, locate the coordinates of the target in a common frame of reference, and manipulate the vehicle and TNA in space so as to position the TNA. Accordingly a vehicle-based positioning system provides the link between the relative positions of the, the leading sensors, the detected target of interest, the vehicle, and the trailing TNA. As the leading sensors require a minimum field of data and further that they are moving, the sensors are associated with a certain latency. Accordingly by the time the target has been detected, the vehicle and leading sensors has moved past it. The vehicle has mass and must be stopped before using the TNA sensor which is employed while stationary. The field of view of the TNA is small and thus must be positioned accurately. It is advantageous to both minimise positional errors while slowing and stopping the vehicle, and to minimise the length of the apparatus. Thus, optimal placement of the leading sensors is in front of the vehicle to minimise the impact of latency, and further to locate the TNA behind the vehicle, permitting a controlled deceleration and hence accurate positioning of the vehicle and hence the TNA. Factors impacting on maintaining accuracy between the target location as detected and the target's location for confirmatory investigation by the TNA include: the positional error reported by the leading sensors, error of the sensor location relative to the vehicle, and positional error or drift introduced by vehicle movement.

It is imperative to accurately locate targets and further to minimise the error between the recordation of target location as detected by the leading sensors and the understanding of position once the vehicle has passed over the target and the TNA is positioned thereover.

It is desirable to traverse the greatest distance of ground in the shortest period of time while still positively confirming whether detected objects are in fact mines. The above system utilises sensors which operate at acceptable ground speeds such as EMI, GPR and IR sensors. According to one aspect of the invention, this desirable rate of coverage is necessarily interrupted by occasional stops to apply a non-moving sensor to confirm whether the detected object is explosive or not. A stationary TNA is utilised as the confirmation sensor. The time necessary to position the TNA over the object, and dwell there long enough to confirm whether an object is explosive or not, is a large part of the time budget. The dwell time is small however with respect to the time necessary upon follow-up to neutralise a confirmed mine.

It is advantageous to the throughput of the mine-detector vehicle to minimise the time necessary to acquire a sufficient number of gamma ray emission counts to confidently identify or reject an object as a mine. Use of existing TNA apparatus for detecting mines has resulted in count times numbered in hours. By increasing the source strength, the necessary number of counts are acquired in a shorter period of time. Further, to acquire a statistically useful number of counts, a high efficiency detector, such as that utilising a Sodium Iodide crystal is used. Unfortunately, the resultant count rates are in the order or 200,000 to 500,000 per second and for Sodium Iodide detectors, pulse-pile up becomes excessive. Prior art pile-up pulse rejection methods are inadequate in these circumstances.

In summary, to minimise dwell time, it is therefore desirable to use a strong neutron source (about 10× to 100× conventional for use with NaI detectors) placed as close as possible to the target of interest, and to use the high efficiency NaI detectors for reducing the time necessary to confirm a target of interest as being explosive. The resulting high count rates must accordingly be used in combination with means for rejecting pulse pile-up.

The solution to the pulse pile-up is to perform a pulse shape comparison. First, one eliminates the low energy pulses to lighten the processing load on the pile-up circuitry. Then, the pulse is analysed for its shape in comparison to the known shape of a non-pile-up pulse. Preferably this is achieved by integrating the pulse, preferably using a gated integrator, between a designated portion the pulse (such as from its start to its middle, or its middle to its end) and for the whole pulse. The difference between the two integrations (portion and whole) should produce a repeatable baseline for pulses which haven't piled-up. More preferably, the baseline is zeroed out to a null difference and thus any non-zero difference is illustrative of a piled-up pulse. Accordingly, pulse issuing from NaI(TI) detectors at rates of in excess of 200,000 cps can be analysed and pile-up pulses rejected, thereby maintaining high count rates while continuing to distinguish and count nitrogen-related events.

Once confirmed as a mine, an object or the ground in which it lies is marked by placing a visible temporary mark on the ground. In a broad aspect, a process is provided comprising mixing a dry granular, free-flowing superabsorbent polymer powder with water and dye to form a semi-solid gel and depositing the gel onto the surface to be marked. Apparatus comprising a ram used to eject the gel from a mixing chamber without excess mechanical agitation and thus without causing significant breakdown. The resultant mark is bulky and thus highly visible from the side. The mark's visibility continues for several hours and after its useful life, the mark degrades in an environmentally-friendly manner, substantially disappearing completely in 48 hours under drying, sunlight or rain conditions.

BRIEF DESCRIPTION OF THE DRAWINGS

FIG. 18b is a block diagram of the two workstations according to FIG. 18a;

FIG. 38 is a representation of the field of view of the FLIR which illustrated the variation in determining the coordinates of an object far or close up in the field of view;

FIGS. 42a and 42b are charts of mine type and distribution of easily discovered metal AT mines and the less easily detected minimum metal plastic mines, illustrating the opportunity to detect and providing a basis for the detection results following;

DETAILED DESCRIPTION OF THE PREFERRED EMBODIMENT

The MVMMD Vehicle Generally

Figure 1:
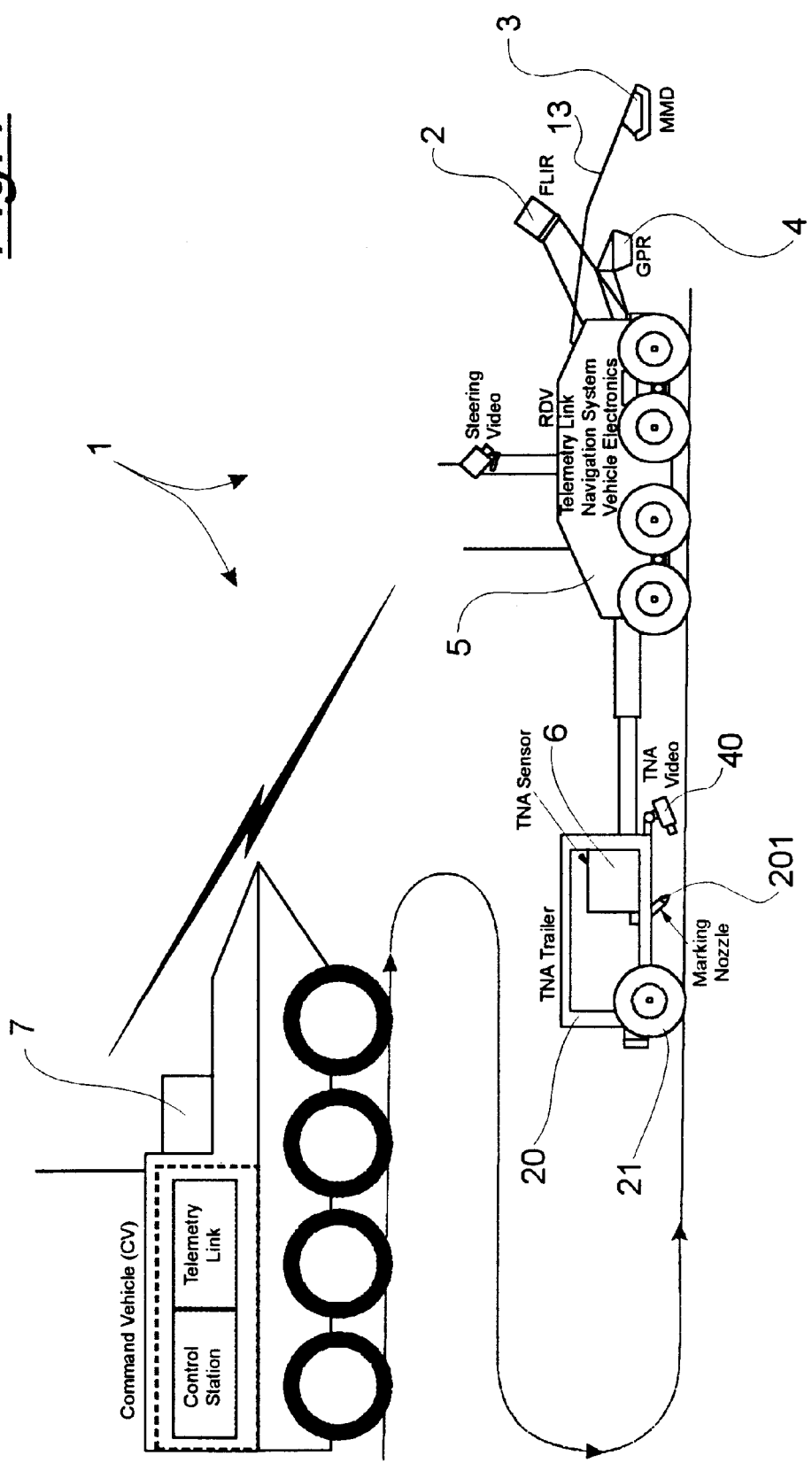
FIG. 1 is a schematic side view of the Multisensor Vehicle-Mounted Mine Detection system (MVMMD) according to one embodiment of the invention.
Figure 2:
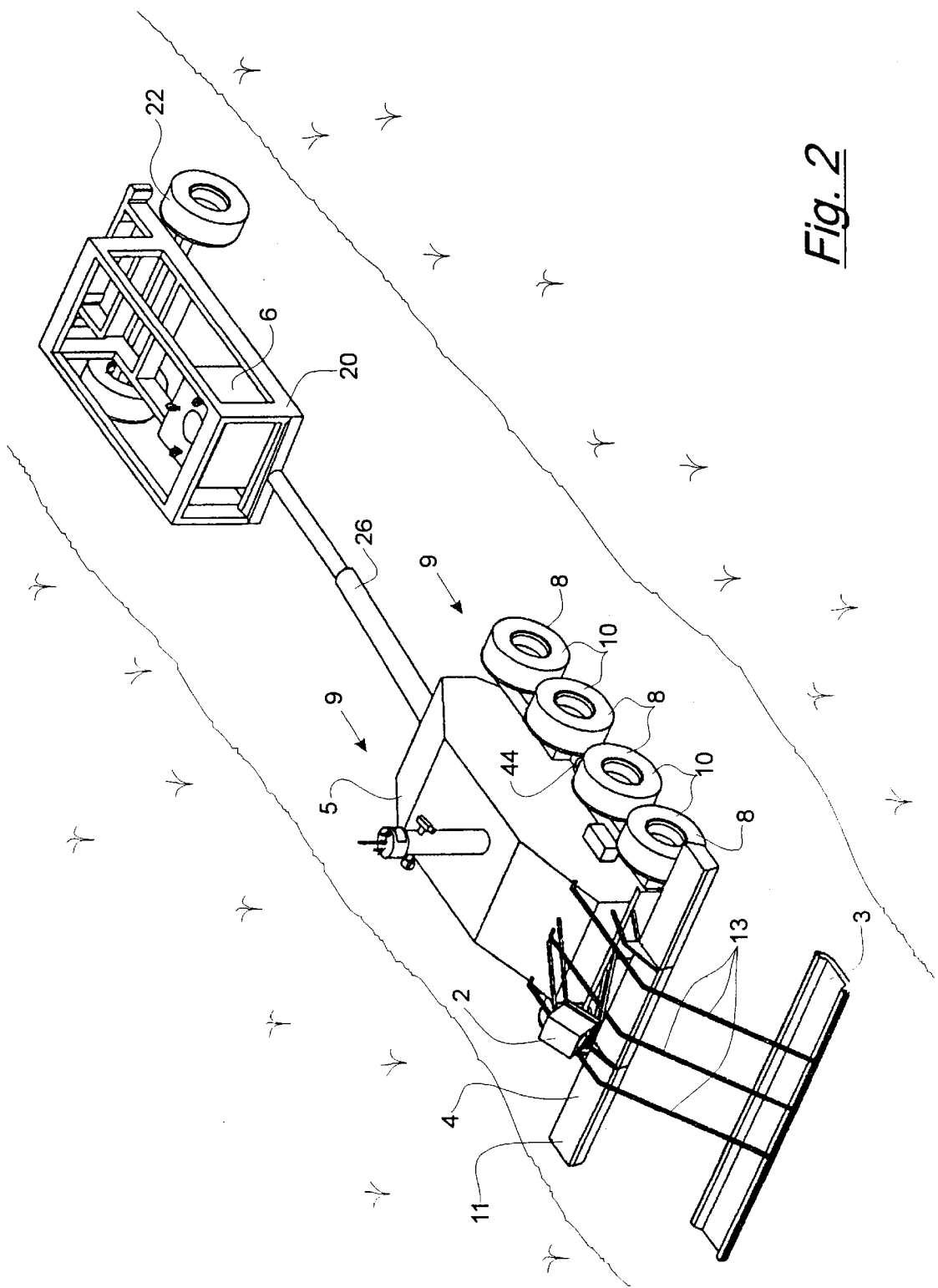
FIG. 2 is perspective view of the MVMMD sweeping a path while traversing the ground.

Having reference to FIGS. 1 and 2, a multisensor vehicle-mounted mine detector 1 or MVMMD is provided comprising leading sensors 2,3,4, a remote-controlled detection vehicle (RDV) 5, a trailing sensor 6 and a following command vehicle 7.

The RDV 5 comprises a hydrostatically driven self-propelled vehicle having eight wheels arranged in two parallel lines 9 of 4 wheels each. The wheels 8 are fitted with wide tires and pairs of wheels are suspended on bogeys 10 for achieving a low ground pressure. The RDV has a low magnetic signature which, in combination with the low ground pressure, is insufficient to activate anti-tank mines which would be a threat to the RDV 5.

Preferably, a low pressure, low magnetic signature flail or bladed pre-clearance vehicle (not shown) will have preceded the RDV for clearing antipersonnel mines.

The RDV 5 is remotely controlled from the command vehicle 7 using wireless RF communications. Remote operation minimises exposure of personnel to mines and radiation from onboard nuclear-equipped sensors. A forward looking visible light camera (VIS) is mounted to the RDV 5 for providing image feedback for steering of the RDV by the personnel in the command vehicle.

The three leading sweep sensors 2,3,4 are supported off of and lead the RDV 5 for sweeping a path. The leading sensors comprise a ground penetrating radar (GPR) 4, a metal detection electromagnetic induction sensor (EMI) 3, and an infrared scanning camera 2.

Each of the leading sensors, the FLIR 2, EMI 3 and GPR 4 have an effective scanning width of 3 meters. When the RDV 5 is driven straight ahead, the leading sensors 2,3,4 sweep a full 3 meter width. Upon curved paths (>20 meters turning radius), an effective width of 2.7 meters is cleared, sufficient for a following 2.6 meter wide Canadian Armed Forces "Bison" Armoured Personnel Carrier (APC) (not shown).

The GPR

The GPR 4 is mounted immediately ahead of the RDV 5 for detecting discontinuities in the ground. The GPR 4 is of conventional design, having a transmitting and receiving antenna 11 which sends a high frequency electromagnetic signal into the ground and reflects back from electromagnetic discontinuities such as: the interface between the air and ground; a change in material; a change in density; or a change in moisture content. As the GPR 4 must obtain at least two spaced readings to calculate the depth of a discontinuity, it must pass over a finite distance to compare changes in received signal. Accordingly, the GPR 4 must receive spatial or traversed distance data from the RDV 5. Some implementations of GPR are superior than others for detecting mines. One such GPR is model IAI ELTA LE/M-2190 obtained from ELTA Electronics, Israel. This GPR uses a continuous 1–3 GHz wave, a 3 meter wide antenna and is mounted 70 cm above the ground's surface. It can process data and detect mine-like objects at speeds of up to 2.5 kph. For example, the GPR 4 can detect anti-tank mines from between the surface and those buried up to 30 cm deep. Individual discrimination of mines requires a minimum separation of about 80 cm. Detection of a discontinuity or disturbance constitutes an alarm.

The EMI

Figure 3:
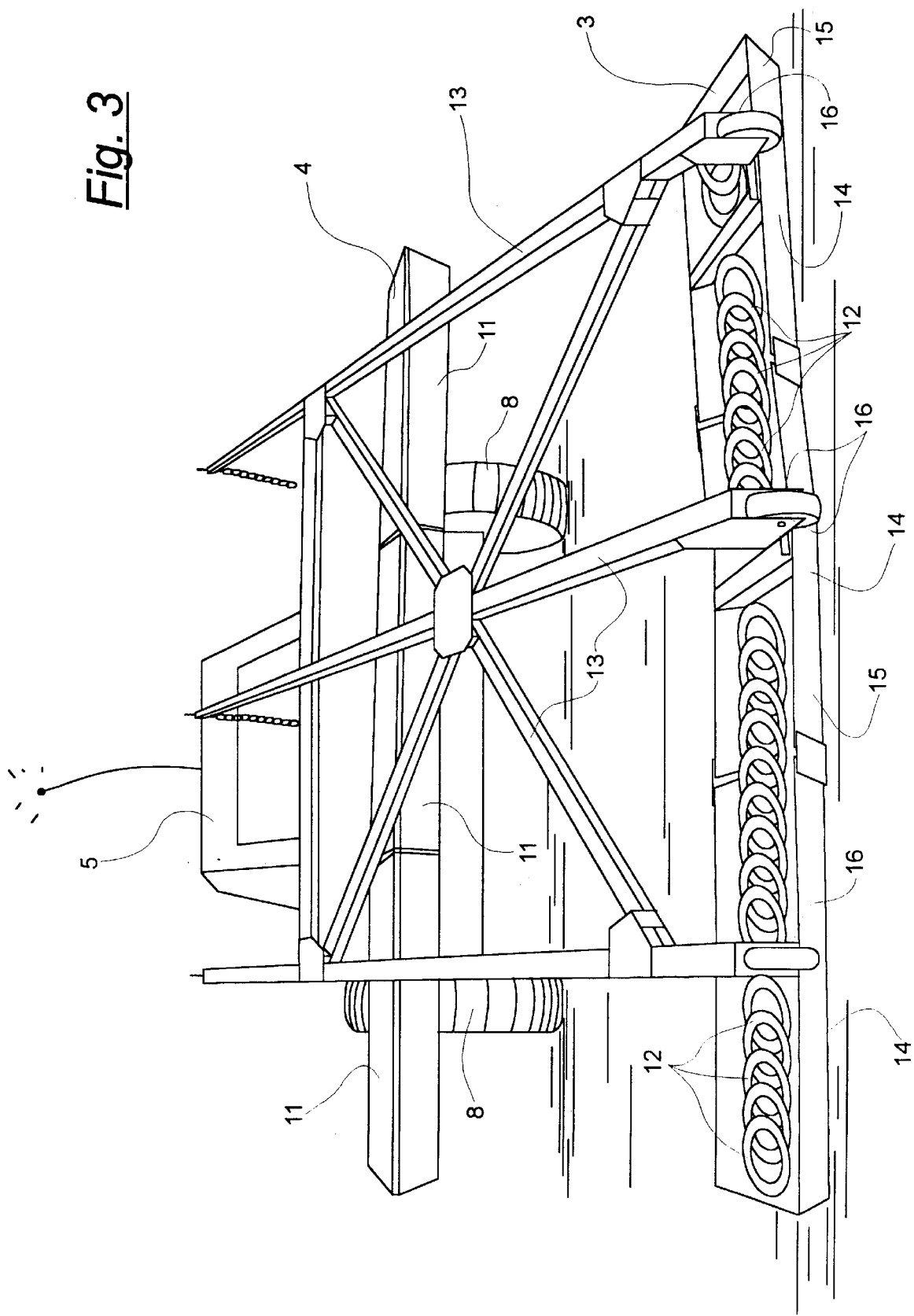
FIG. 3 is a perspective front view of the MVMMD illustrating in particular the EMI, GPR mounted and leading the RDV.
Figure 4:
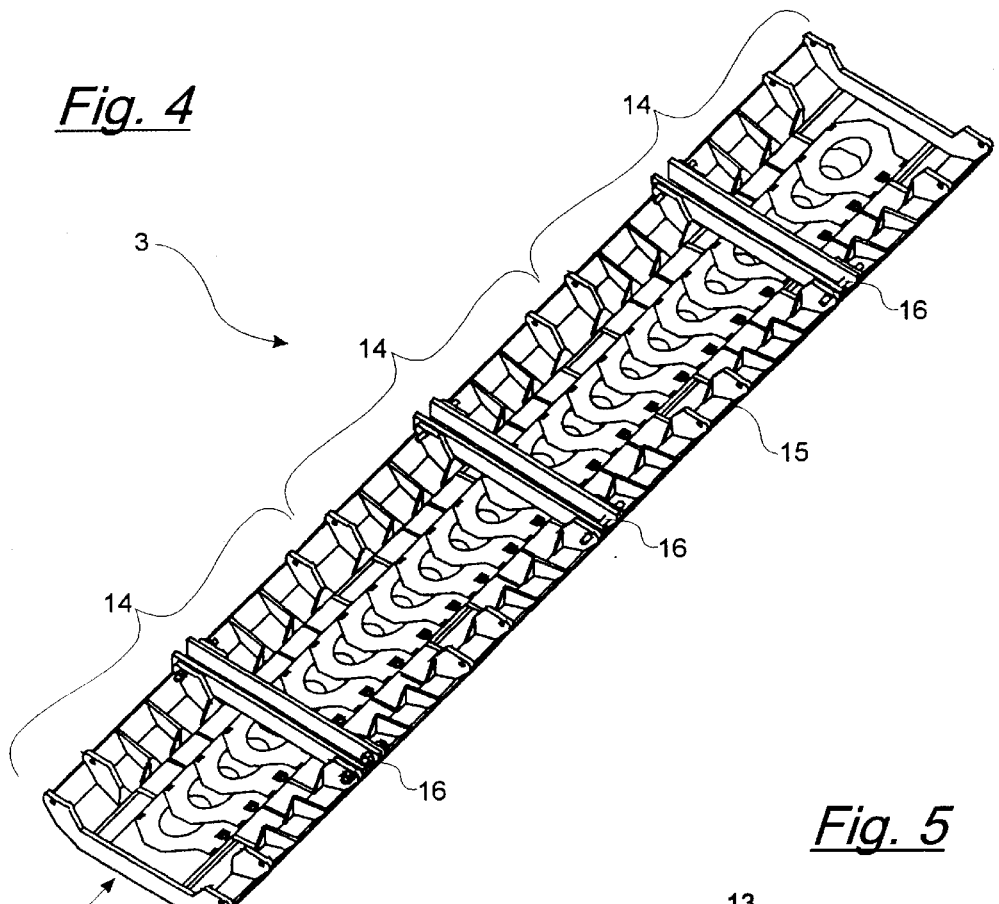
FIG. 4 is a perspective view of the EMI illustrating the plurality of overlapping coils lying in trays.

The EMI 3 comprises a linear array of electromagnetic induction transmitting and receiving coils 12 (FIGS. 3 and 4) are dragged on the ground ahead of the GPR 4 for detecting metal. A non-metallic support structure 13 extends forward from the RDV 4 to the EMI 3. The EMI 3 is sufficiently forward of the RDV 5 (about 3.5 meters, being greater than a minimum of about 2 meters) to avoid metallic interference and influence from the RDV 5 itself.

More particularly, the EMI 3 used is a VAMIDS Minimum Metal Detector (MMD) available from Schiebel, Germany. The EMI comprises a linear array of 24 transmit and receive coils 12 in three—one meter long sections. Each coil 12 overlaps its neighbour in a fish-scale fashion. The coils 12 operate at a pulse frequency of 19,200 Hz.

Figure 5:
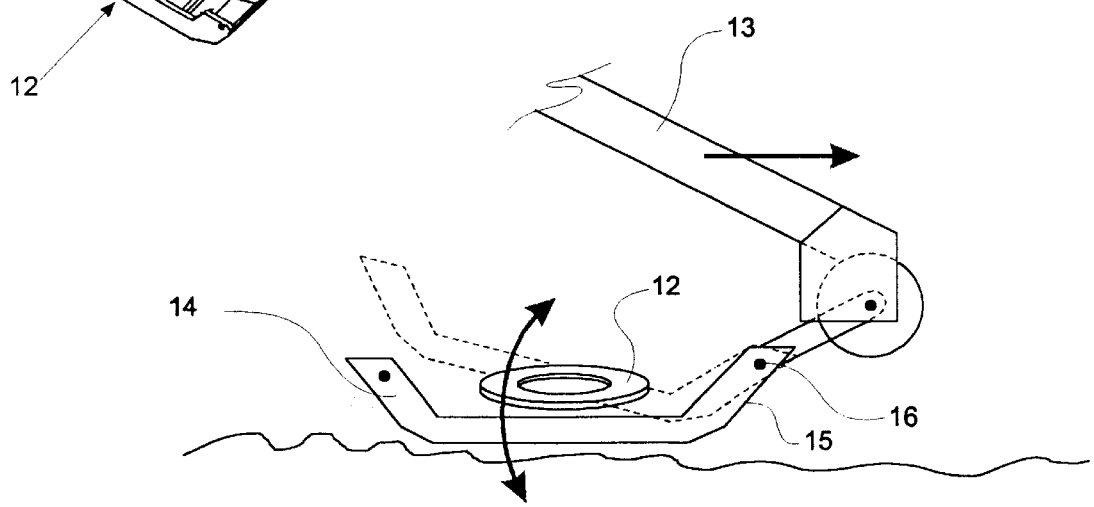
FIG. 5 is a partial side view of the support structure and connection to the EMI and illustrating the pivoting action in phantom lines.

The EMI coils 12 are supported in one or more trays 14 having a bevelled leading edge. The leading edge of the trays is attached to support structure 13 by pivots 16. In this fashion, the EMI 3 can be dragged ahead of the RDV 5. Dragging ensures the minimum separation between the ground and the coils 12. Dragging also ensures that moving encounters with obstacles are not inflexible contacts (the trays 14 can pivot passively (FIG. 5) and not jack-knife as it could under a "pushing" structure) which threaten either the EMI 3 or the supporting structure 13. The fish-scale arrangement of coils 12 also permits flexibility of the EMI 3 over ground variations and maintains minimum ground separation. As is the case with the GPR, detection of a disturbance, or metal in this case, constitutes an alarm.

Figure 6:
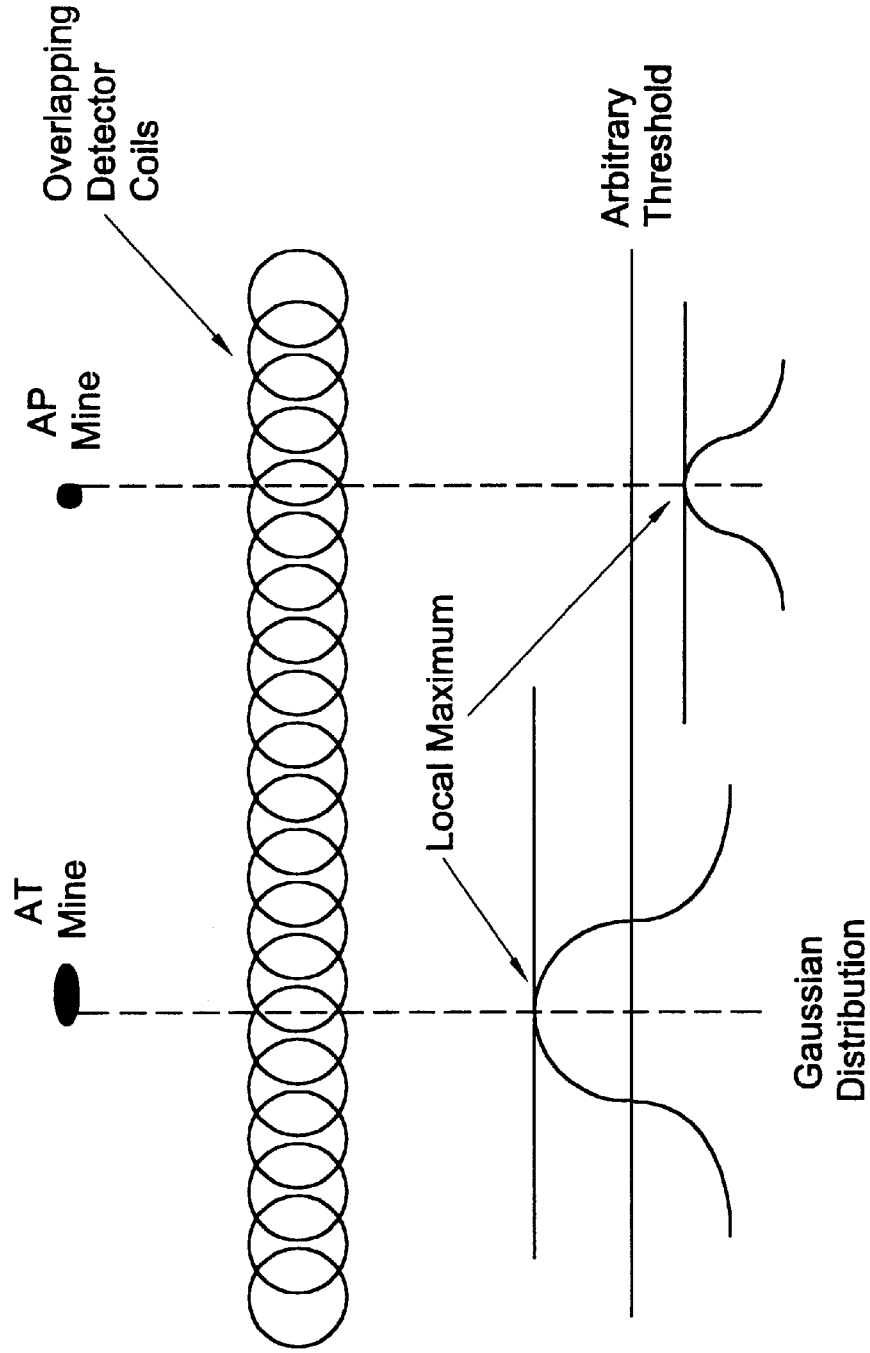
FIG. 6 is a diagrammatic representation of the EMI array of coils and the electromagnetic response to metal mines and minimum metal mines.

As seen in FIG. 6, both substantially all metal or high metal content mines produce a high response, above an arbitrary threshold. However, minimum metal mines (like plastics with metal fuses components) may be below the threshold but still produce a typical Gaussian response which is used as the basis for an alarm.

The FLIR

The infrared scanning camera 2 (seen in FIGS. 1 and 2) comprises a forward looking infrared (FLIR) camera directed downwardly and forward of the RDV 5 for scanning of the ground ahead of the EMI 3. Mounted about 3 meters above the ground, the FLIR 2 provides a field of view of about 4 meters ahead of the EMI 3. The 4 meter lead provides about 14.4 seconds of viewing time at 1 kph or 7.2 seconds at 2 kph.

The FLIR 2 relies upon difference in the emitted thermal properties of disturbances in the ground. An AGEMA Thermovision 1000 IR camera is used which detects IR in the wavelengths of 9–14 $\mu$m. Identifying changes in emitted radiation is well known in the art. Factors which affect the emission include: ground condition; depth of a mine; sunshine or overcast conditions; and diurnal thermal cycling. The particular camera used has the additional specifications including a lens having a field of view of 65° H and 45° V with a focus range of 1 meter to infinity and being able to detect temperature differences of 0.05° C.

Detection of a disturbance constitutes an alarm.

For calibration of the FLIR, a hot wire grid or jig (not shown) is placed within the camera's field of view and known "hot" coordinates on the grid are compared against the camera's reported coordinates of the identified "hot" IR emission.

The Trailing Sensor

Figure 7:
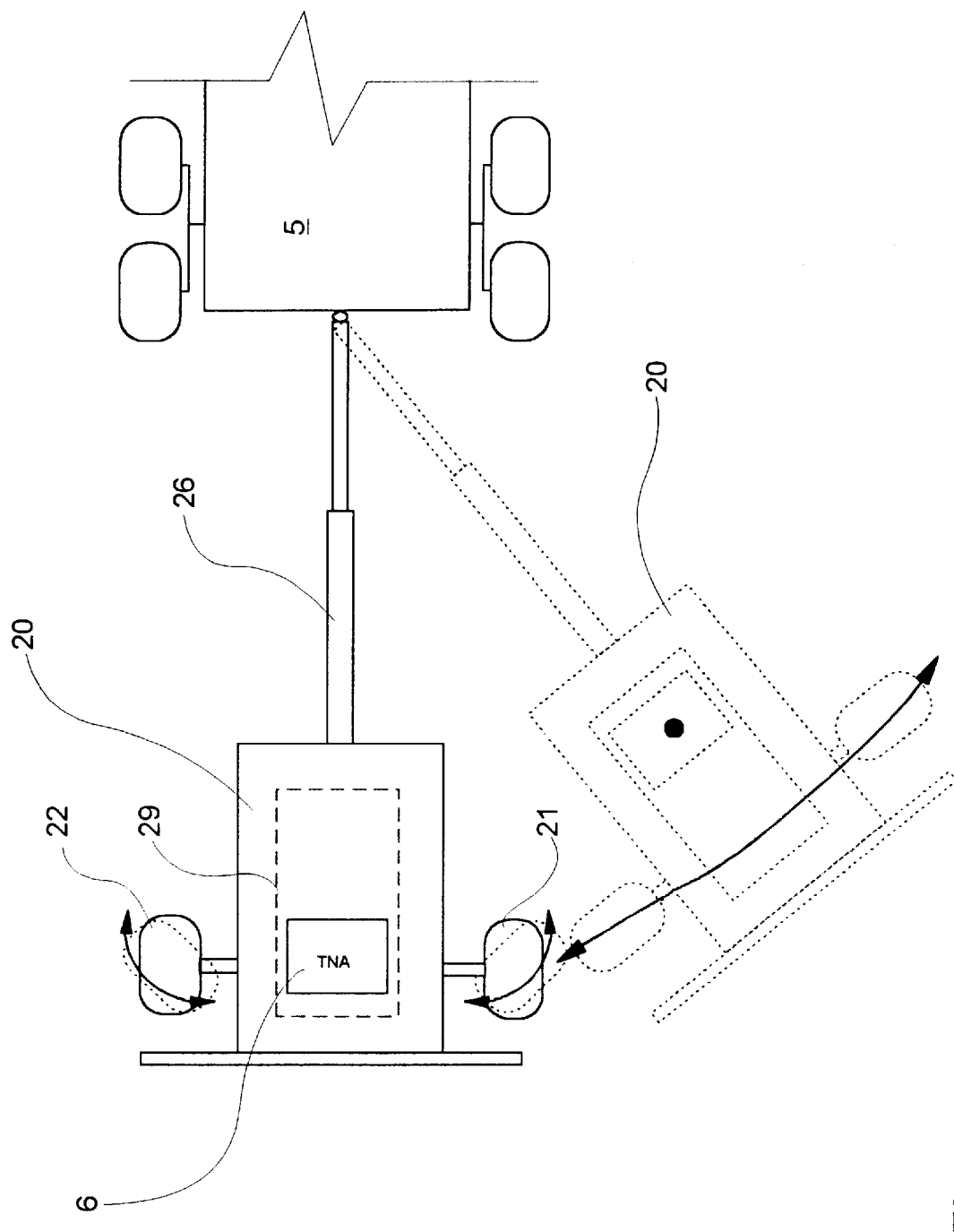
FIG. 7 is a schematic top view of the trailing sensor, more specifically a TNA in a trailer. The pivoting of the wheels and polar rotation of the trailer is illustrated between inline (solids lines) and rotated (phantom lines) positions.
Figure 8:
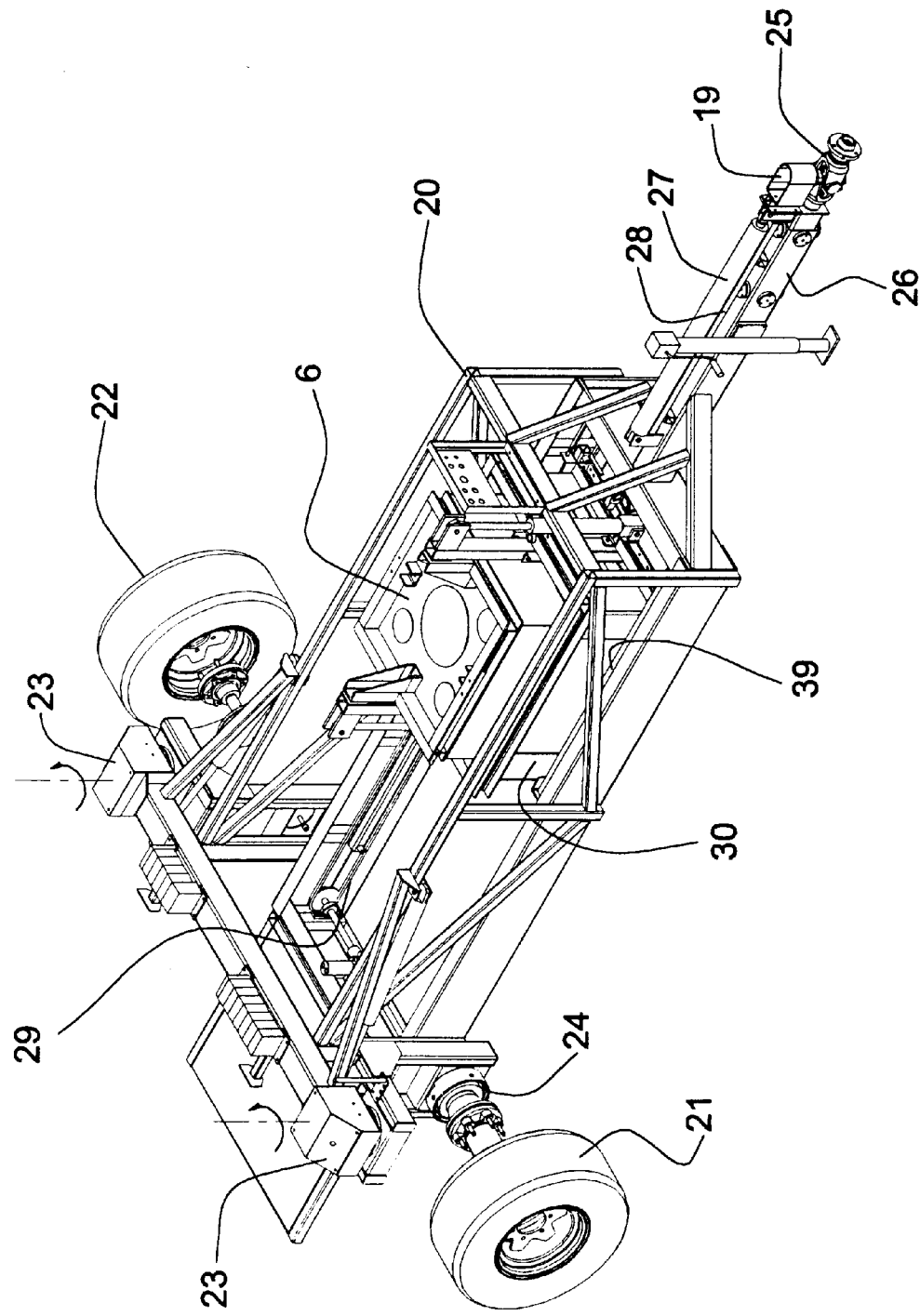
FIG. 8 is a perspective view of the TNA mounted in the trailing trailer. The wheels are shown in exploded view from the trailer to illustrate the drive motor and idler spindle.
Figure 9:
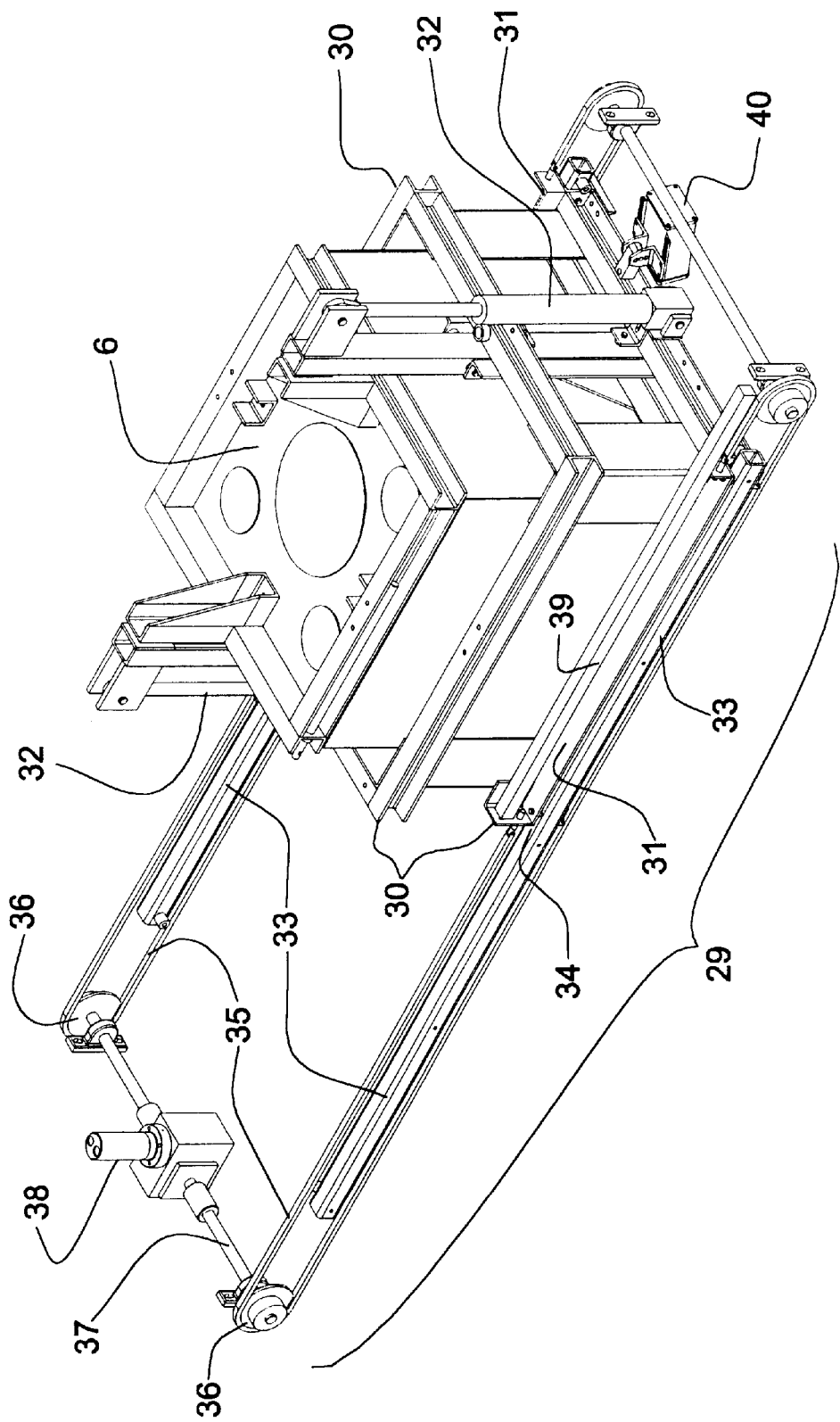
FIG. 9 is a perspective view of the trailer's gantry sub-assembly and TNA.

Turning to FIGS. 1,2 and 7–9, the trailing sensor 6 is a sensor which is capable of confirming whether a TOI is a mine or not. Various devices are known such as chemical sniffers and thermal neutron activation sensors. In the preferred embodiment a thermal neutron activation sensor (TNA) is towed behind the RDV 5. The custom TNA 6 is an inherently heavy sensor (about 270 kgs) and is supported in its own trailer 20 which distributes weight between the trailer 20 and the RDV 5 and thus and keeps the RDV ground pressure low. The trailer 20 is supported on two wheels 21,22 having low ground pressure tires. The two trailer wheels 21,22 are steerable and can be rotated about a vertical axis or pivot 23 to permit polar swinging action (FIG. 7). One of the wheels 21 is powered with a hydraulic drive 24 for driving polar movement. The trailer 20 is connected to the rear of RDV 5 with a hitch swivel 25 and a telescoping tongue 26. The hitch swivel 25 permits both polar movement and up and down rotation. A hitch potentiometer 19 (not shown) reports polar rotational position.

A hydraulic cylinder 27 actuates the telescoping tongue 26 for radial extension and contraction. A linear transducer 28, associated with the tongue 26, records the radial position of the tongue extension and trailer 20. The telescoping tongue 26 provides about 40" of radial travel.

The TNA 6 itself is further mounted on a radial gantry 29 within the trailer 20. The gantry 29 comprises a frame 30 having parallel supporting rails 31. The TNA 6 is suspended in the frame 30. The frame 30 is vertically positionable in the trailer 20 using hydraulic cylinders 32. The cylinders 32 positioning the TNA 6 as close to the ground as possible when sensing and lift the TNA for providing clearance during positioning. A proximity sensor (not shown) prevents the TNA 6 from being lowered onto the ground and possible contact with the mine being sought. A CCD camera 40 is positioned to view the ground under the TNA 6.

The supporting rails 31 are slidably supported on parallel guide rails 33. The guide rails 33 are fixed within the trailer 20. The supporting rails 31 slide on buttons 34 bearing on the guide rails 33. A roller chain 35 is driven by sprockets 36 on a shaft 37 driven by a hydraulic motor 38. The roller chain 35 is connected to the frame 30 for driving the TNA 6 radially along the guide rails 33.

A linear transducer 39, associated with the frame 30, records the radial position of the TNA 6 in the trailer 20. The gantry 29 provides about 45" of radial travel for the TNA.

Combined, the 45" gantry and 40" tongue radial travel and the polar movement capability permit the TNA to be accurately positioned anywhere across the sweep path or operational window.

Marking System

A marking system is located on the TNA trailer 20 and comprises a marking assembly 201 for placing a physical mark on the ground at the confirmed location of a mine. The marking assembly 210 is described in greater detail below.

Alarms, TOI and Mines

Figure 10:
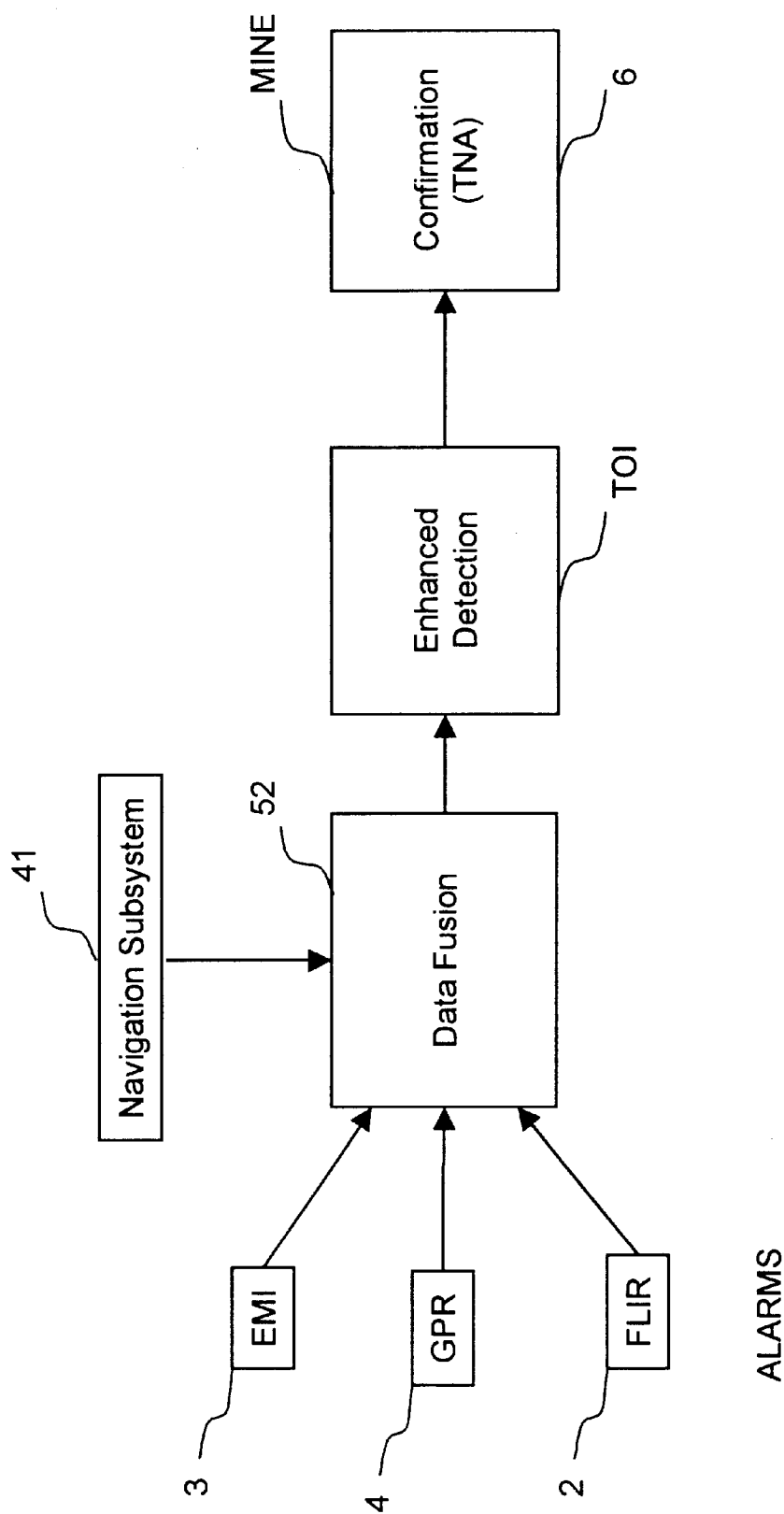
FIG. 10 is a block diagram of the leading sensor alarms being processed with data fusion to identify a TOI before applying confirmation TNA.

Individually, the leading sensors 2,3,4 alarm at disturbances in the ground. As shown in FIG. 10, the alarms are processed using data fusion for enhancing detection and identifying targets of interest (TOI). Data fusion is processed at a control station 52 (FIG. 12) in the command vehicle 7. A TOI is tested by the TNA 6 for possible confirmation as a mine at the option of an operator.

The Arrangement of Sensors

The leading sensors range in distance from about 10 to 5 meters in advance of the confirming TNA sensor (FIGS. 1 and 2) for two reasons. First, as the TNA 6 is rendered stationary when operated, sufficient time must exist to stop the RDV 5 between detecting a TOI and positioning the TNA 6 over the TOI for confirmation. Secondly, the alarm inputs from all leading sensors 2,3,4 are input to a data fusion process (including human operator input) which requires time to view and assess each alarm and for deciding whether it qualifies as a TOI and then whether or not to perform confirmation with the TNA 6. At 2 kph, up to 10 meter spacing provides up to 18 seconds to review a TOI and to stop the RDV 5 in a controlled manner.

The arrangement of three sensors 2,3,4, for sensing while moving, and a trailing confirmation sensor 6, for sensing while stationary, is an optimised arrangement. Spacing and placement of the sensors minimises overall length of the MVMMD 1 while still providing an operator with sufficient lead time (minimum 3.5 meters) between the closest leading sensor 4 and the confirming TNA 6 for decision-making and for controlled deceleration of the MVMMD 1. Further, orienting the FLIR 2 field of view ahead of the EMI 3 avoids IR disturbance of the ground before scanning. Rather than providing separate platforms, location of the TNA 6 in a trailer 20 connected to the RDV 5 reduces the difficulty of co-registration of the TOI coordinates and positioning of the confirmation TNA 6. The EMI 3 is located sufficiently spaced from metal structures (i.e. the RDV 5 or GPR 4) to avoid interference.

The leading sensors 2,3,4 are each capable of identifying the certain physical properties or disturbances in the path ahead of the RDV 5 which may or may not be mines. Each leading sensor determines the location of such a disturbance in the leading sensor's own individual coordinate system. Herein, coordinate system and frame are used interchangeably.

The leading sensors 2,3,4 are supported in fixed geometric relation from the RDV 5 and thus their individual coordinate systems can be readily transformed into the vehicle's or RDV's coordinate system. To minimise error, the geometry and coordinate system of each sensor is surveyed and precisely located with respect to the RDV's frame. As the RDV 5 is moving over the ground within which the disturbance or mine lies, the disturbance must be placed or located in the world coordinate system or frame. The moving RDV's coordinate system is tracked in the world frame using a navigational system 41.

Navigation

Figure 11:
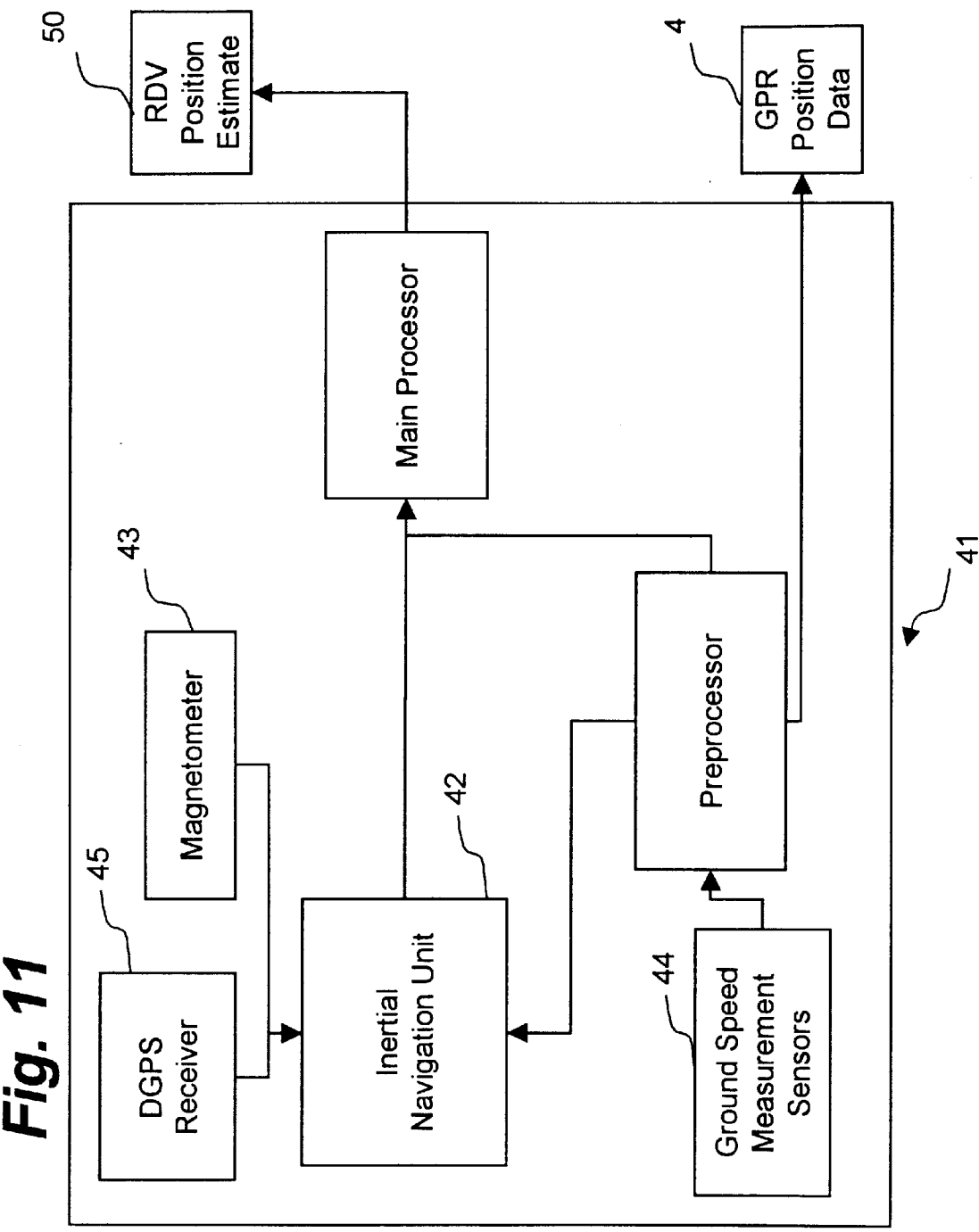
FIG. 11 is a block diagram of the navigation subsystem controls.

Referring to FIG. 11, the navigation system 41 comprises an inertial navigational unit 42, a magnetometer 43, and ground speed measurement sensors 44. While the navigation system can include a differential global positioning system (DGPS) 45, there are reliability problems in heavily treed or cluttered urban areas. Accordingly, the inertial unit 42 and ground speed sensors 44 supplant reliance upon a DGPS 45.

The navigation system 41 outputs a data record which includes vehicle time, a sensor hit coordinates in X,Y,Z world coordinates, vehicle roll/pitch/yaw and an error. The error is based upon known application of a steady-state extended Kalman filtering model.

More particularly, the navigation system 41 includes a land vehicle version of the Lear Astronics Navigation Sensor Unit (NSU) available from Lear Astronics Corp., Santa Monica, Calif. The NSU incorporates Kalman Filtering for providing vehicle control and guidance. The standard land vehicle version was modified upon request to accept input from dual fifth wheel odometer sensors 44 (not shown) which integrate the odometer and inertial systems to provide solutions for attitude, heading, rotational rates, inertial velocities and position. The dual fifth-wheel odometer sensors 44 are positioned on the flanks of the RDV 5 at the vehicle's midpoint. Two fifth-wheels sensors are provided to track vehicle rotation. The coordinates of the dual fifth-wheel sensors 44 are transformed into the coordinate system or frame of the NSU. The NSU frame is transformed to the vehicle frame with the X-axis aligned with vehicle forward.

Vehicle Control and Sensor Relation

Figure 12:
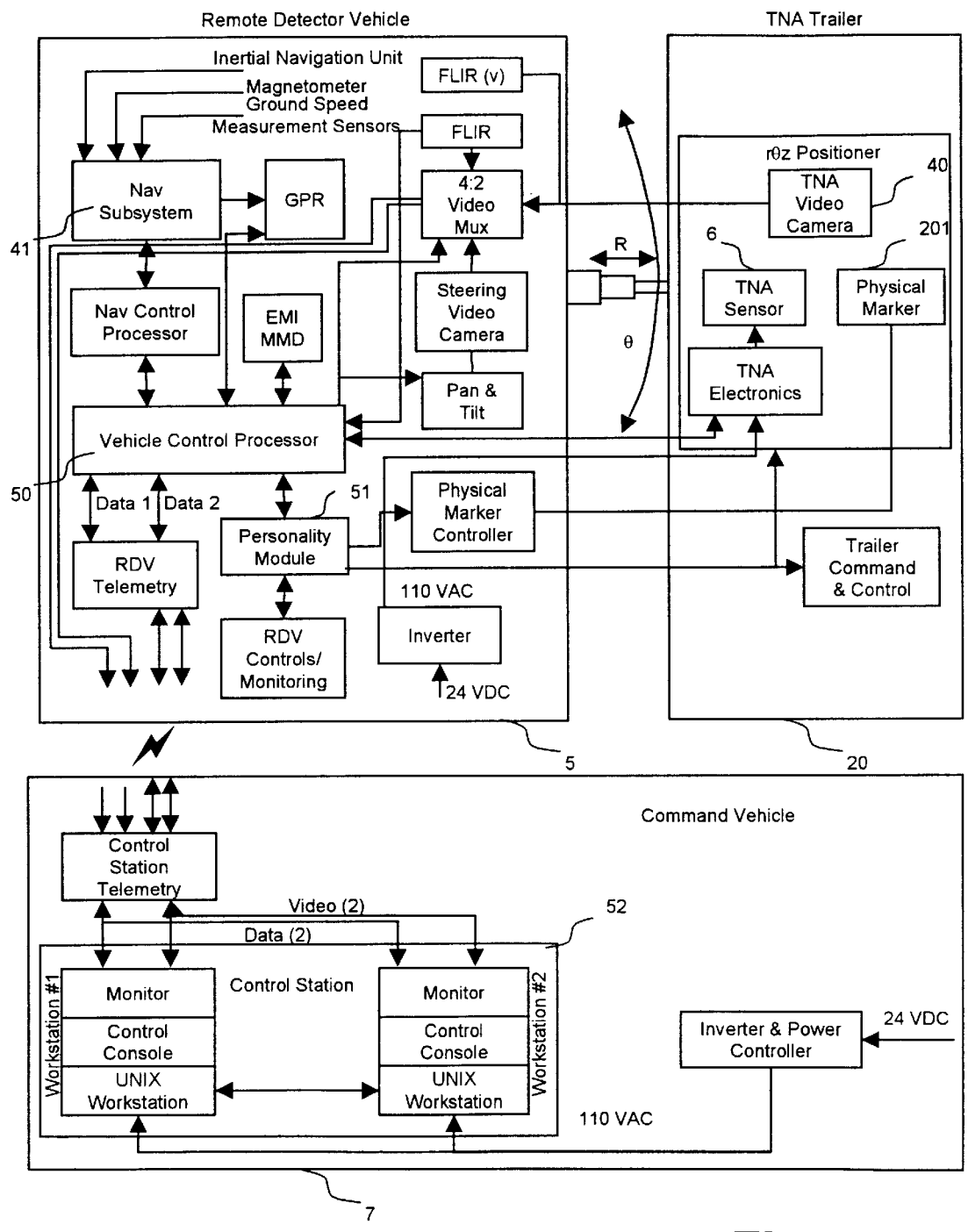
FIG. 12 is a block diagram of the control systems including vehicle control, navigation subsystems, trailer control and the telemetry between the RDV and the command vehicle.
Figure 13:
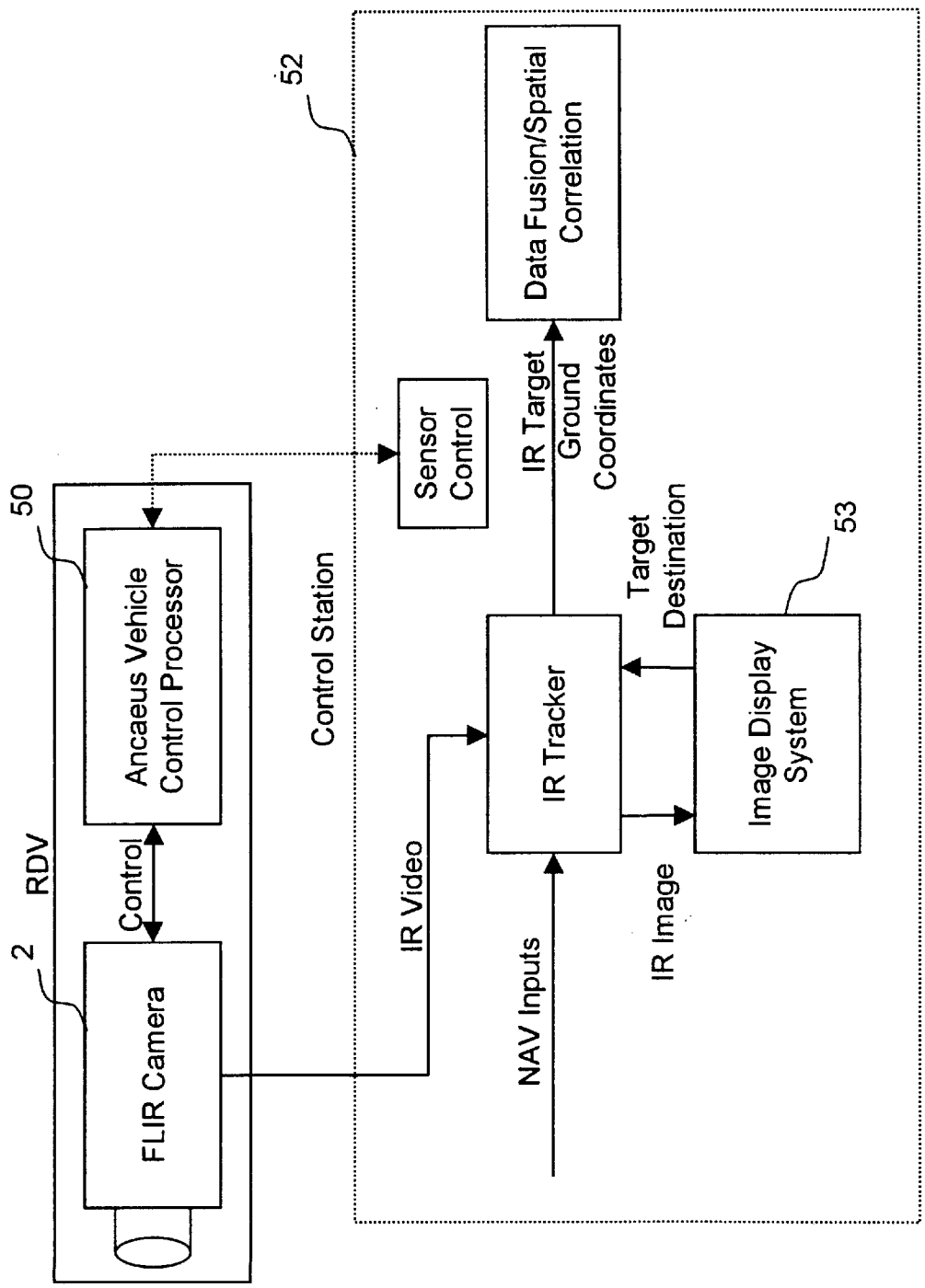
FIG. 13 is a block flow diagram of the relationship between the FLIR and the control station.
Figure 14:
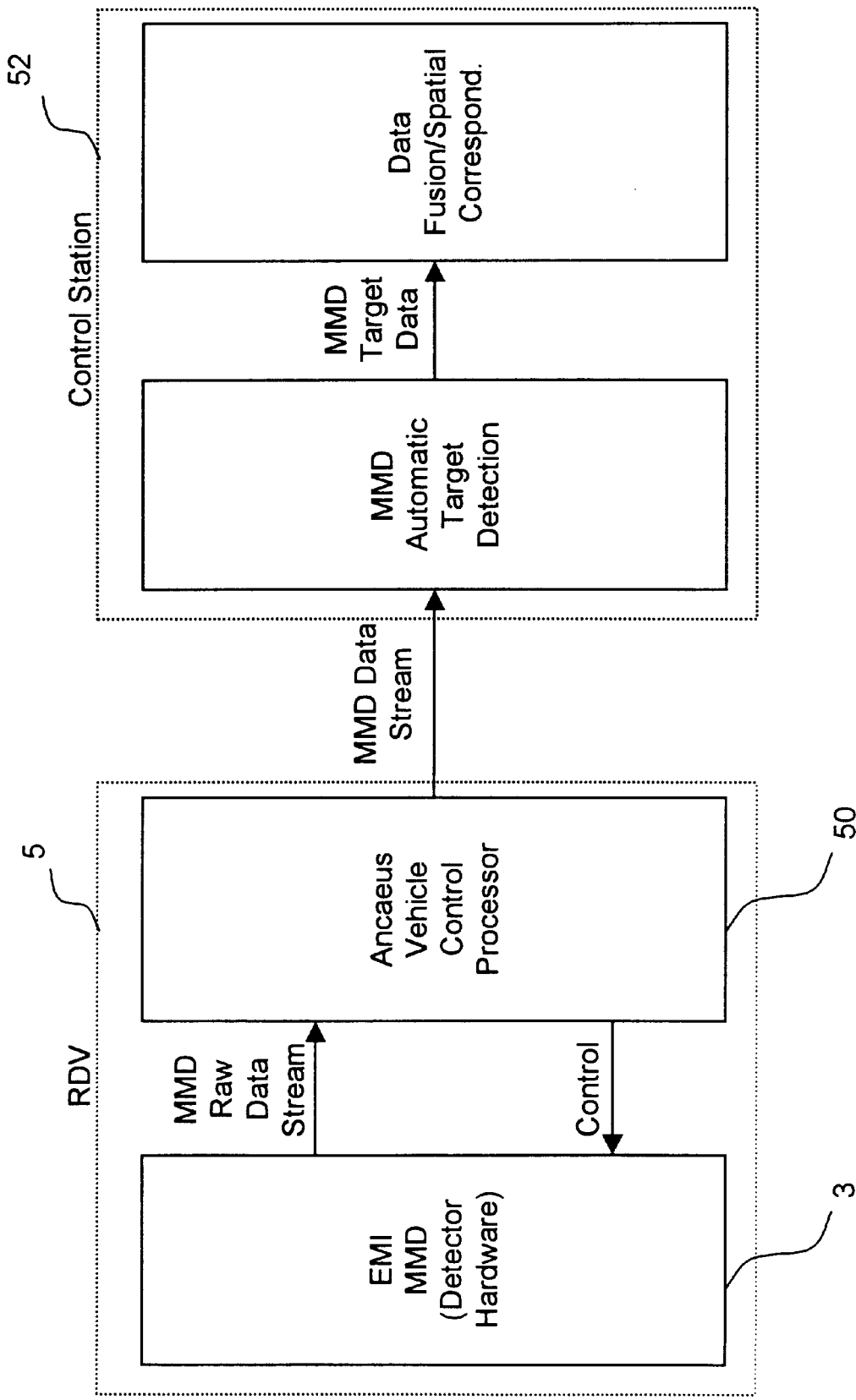
FIG. 14 is a block flow diagram of the relationship between the EMI, the vehicle control system and the control station.
Figure 15:
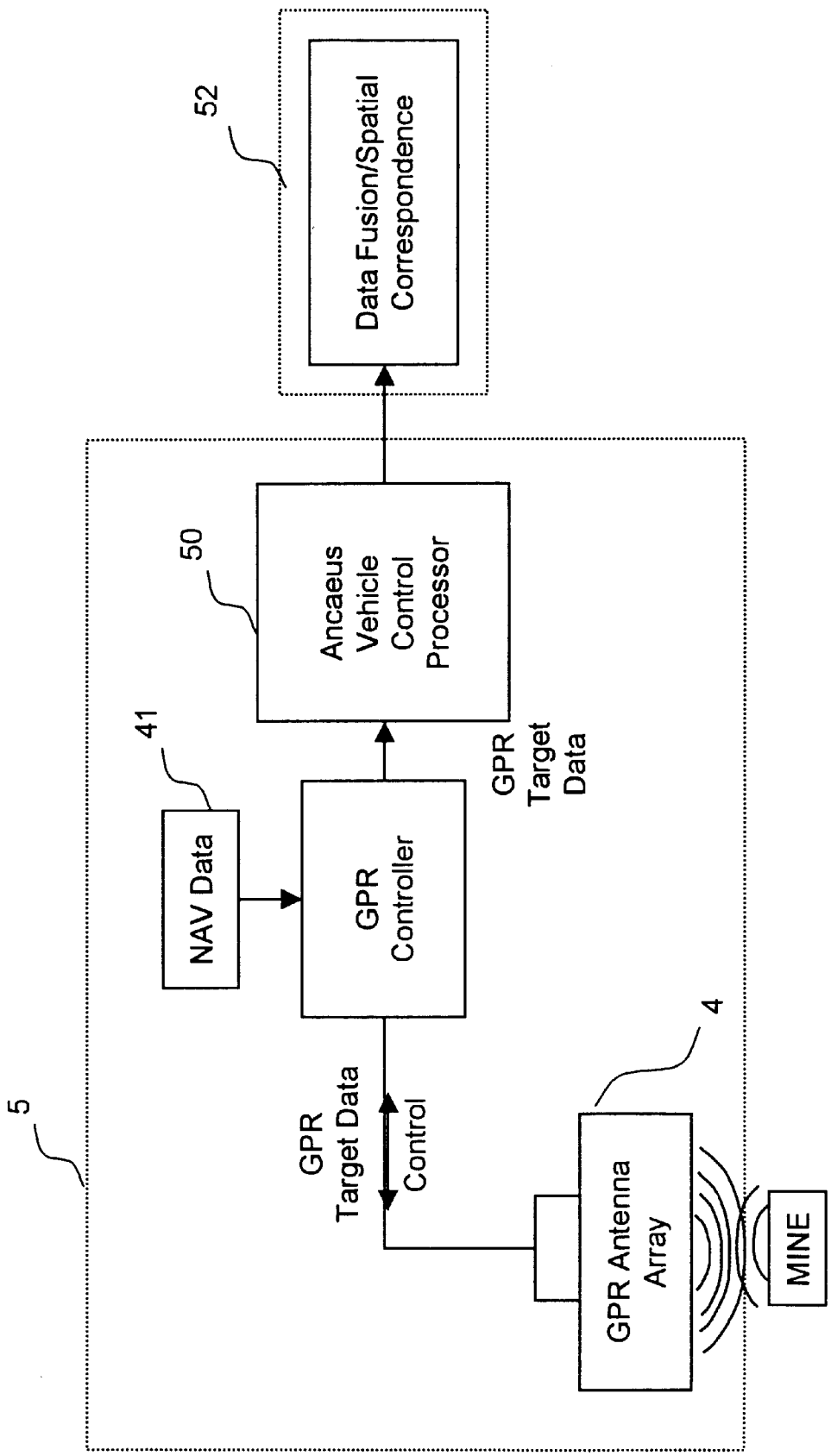
FIG. 15 is a block flow diagram of the relationship between the GPR, the navigation system, the vehicle control system and the control station.
Figure 16:
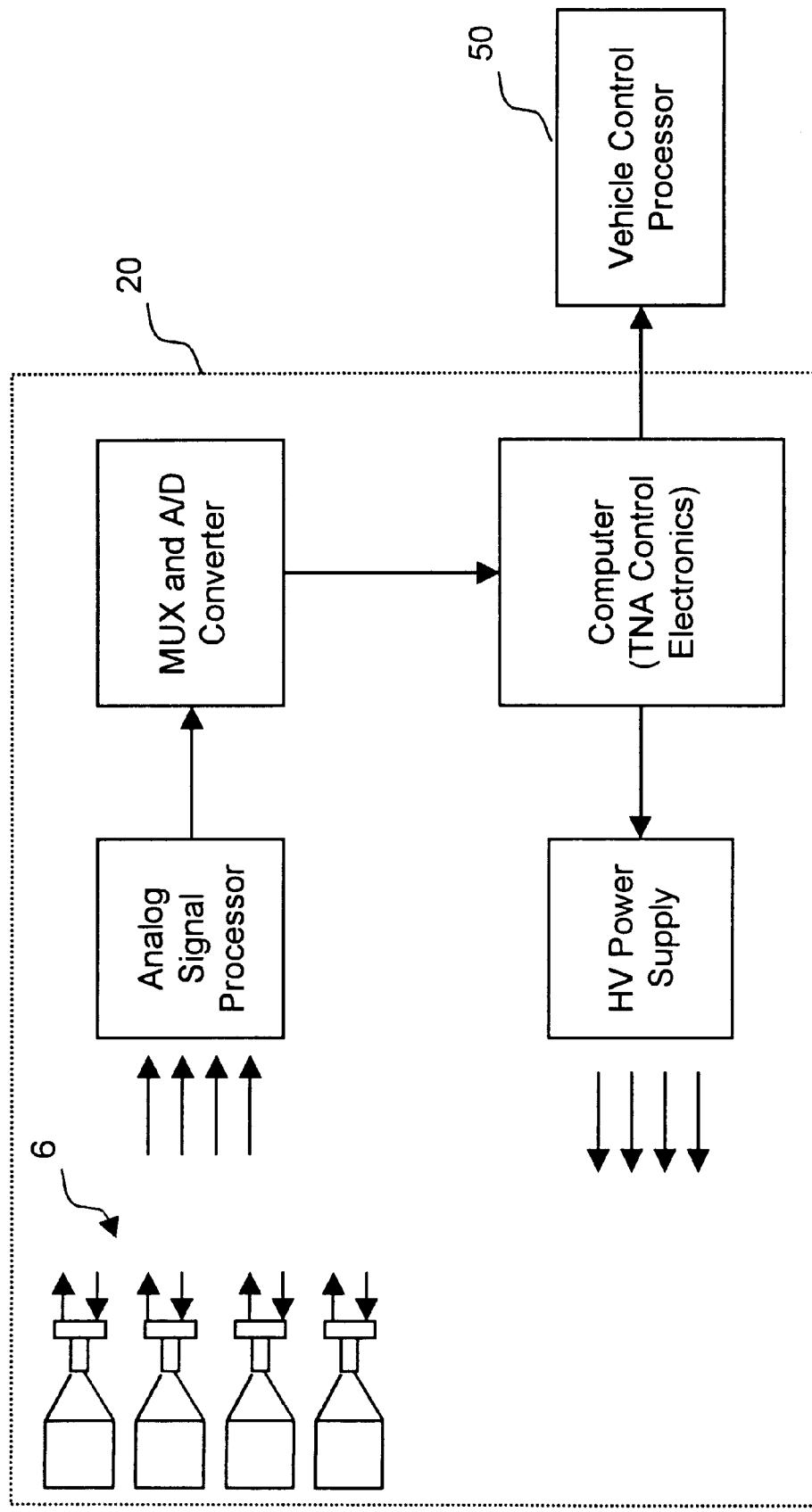
FIG. 16 is a block flow diagram of the relationship between the TNA, TNA processing electronics and vehicle control system.

Having reference to FIG. 12, a vehicle control system 50 or processor termed "Ancaeus" co-ordinates the VIR and RDV steering, EMI and GPR spatial data requirements, navigational data, remote control and radio telemetry between the RDV 5 and command vehicle 7 and control of the trailer 20. Ancaeus is a generic control system, developed at the Defence Research Establishment Suffield, Alberta under various contracts for the Canadian Department of National Defence. The basic vehicle control system 50 comprises a main vehicle control processor 51 and a personality module 52 which handles specifics of the particular application including remote control functions and TNA positioning control. Steering video control is tied into the vehicle control system 50.

FIGS. 13–16 illustrate the relationship of each sensor to the vehicle control system 50. The FLIR 2 (FIG. 13) comprises both the sensor and steering functions and thus is connected to both the vehicle control system 50 and the control station 52. The control station co-ordinates the navigational information and presents it to the operator on an image display system 53. The Schiebel MMD or EMI 3 (FIG. 14) has spatial data requirements and communicates with the vehicle control system 50. EMI data is processed at the control station for incorporation in the data fusion process. The GPR 4 (FIG. 15) has spatial requirements which are met by the navigational subsystem 51. The alarm information is forwarded to the control station 52 for processing in the data fusion process. The data from the TNA 6 (FIG. 16) is processed onboard the TNA and trailer 20. TNA data is forwarded to the vehicle control system 50 and control station 52.

As stated the sensors each provide coordinates of their respective detection or alarm in the sensor's own frame of reference. Sometimes the alarms from each sensor 2,3,4 are substantially coincident in a world frame and it is clear that the resultant TOI deserves further investigation. Other times, several sensors may provide substantially co-incident alarms but another other does not. Further complicating the decision making process is that each sensor is associated with an error. As the RDV moves, the vehicle's coordinate system, to which each sensor 2,3,4 is calibrated, tends to drift in the world frame due to navigational drift or error. Note that, in part, the navigational system relies upon fifth wheel sensors for RDV distance and rotation data. In the worst case, slippage of the fifth wheels results in a large error. Accordingly, the stated coordinates of the TOI may not be exactly where the TOI is actually is located. This becomes a problem when the TOI's stated coordinates are used to position the TNA 6 which only has a narrow field of view (60 cm diameter). As a result, the final position of the TNA 6 may not be over the TOI at all.

Figure 17:
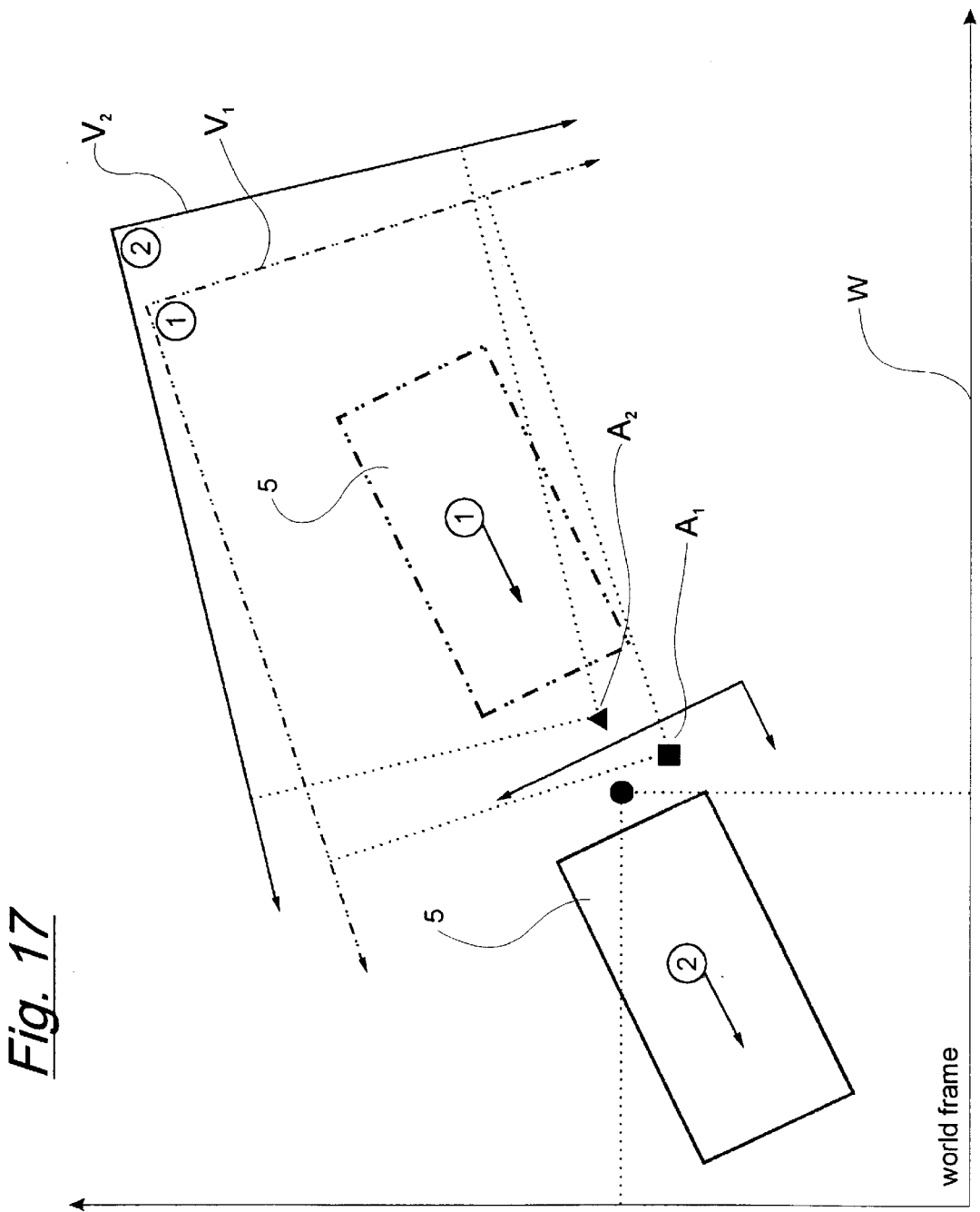
FIG. 17 is a representation of the drift in the sensor and vehicle coordinates with respect to the world frame.

Having reference to FIG. 17, as the leading sensors progress over and report the same object as an alarm in turn, the reported coordinates in world coordinates of frame varies. Shown in the world frame W, an alarm which was originally located at A1 by the FLIR when the RDV was a position 1, is now detected at position A2 by the EMI due to drifting of the vehicle and sensor coordinates in the world frame. The vehicle frame for the second sensing is shown transformed back to the first position and is depicted as having shifted in the world frame from V1 to V2.

To minimise the error between the sensors' coordinates and world coordinates, the following is performed: geometric calibration of each of the sensors 2,3,4,6 and spatial registration.

Geometric calibration involves a careful measurement (survey conducted) and registration of sensors' coordinate systems relative to that of the RDV 5 to which each of the sensors 2,3,4,6 is supported or referenced.

Spatial registration is where data from the navigational system 41 is utilised to relate sensor coordinates, spatial and temporal delays to the vehicle frame and then into world coordinates. As the EMI 3 and GPR 4 alarm algorithms are spatially dependent, requiring knowledge of incremental travel for assessing the data and declaring a detection or an alarm. The latency in the EMI 3 and GPR 4 data is reflected in a time stamp for the sensor data record and that the detection actually occurred a time "t" ago. The location in the world coordinates is obtained by locating the respective sensor coordinates against the RDV coordinates at same time stamp less "t".

Once the location of each sensor's alarm is known in a common world frame, the interrelationship between the alarms is analysed to determine if the alarms qualify as a TOI. Spatial correspondence relates the individual alarms. This is part of the data fusion process. Data fusion occurs at the control station 52.

Figure 18A:
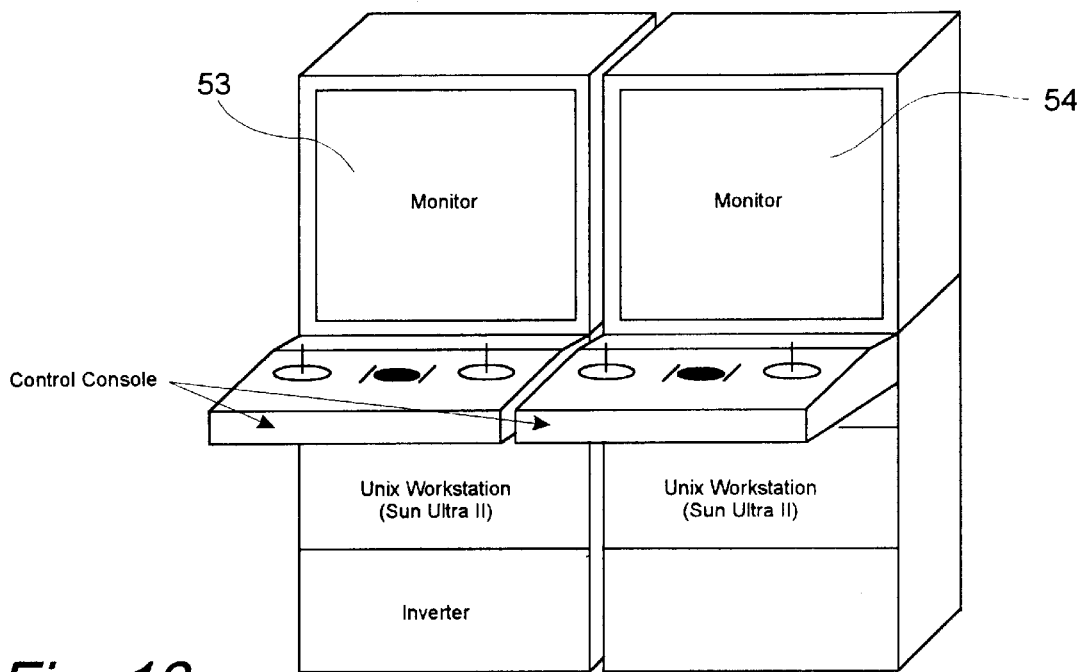
FIG. 18a is a perspective view of the workstations for IR control and RDV operation.
Figure 18B:
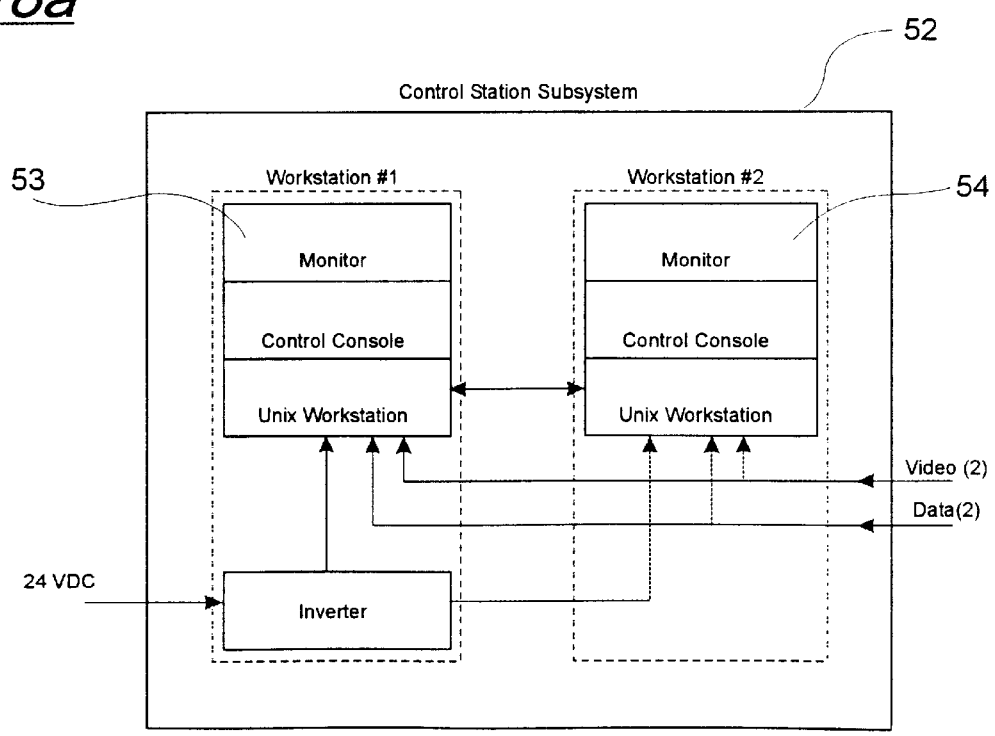
Figure 19:
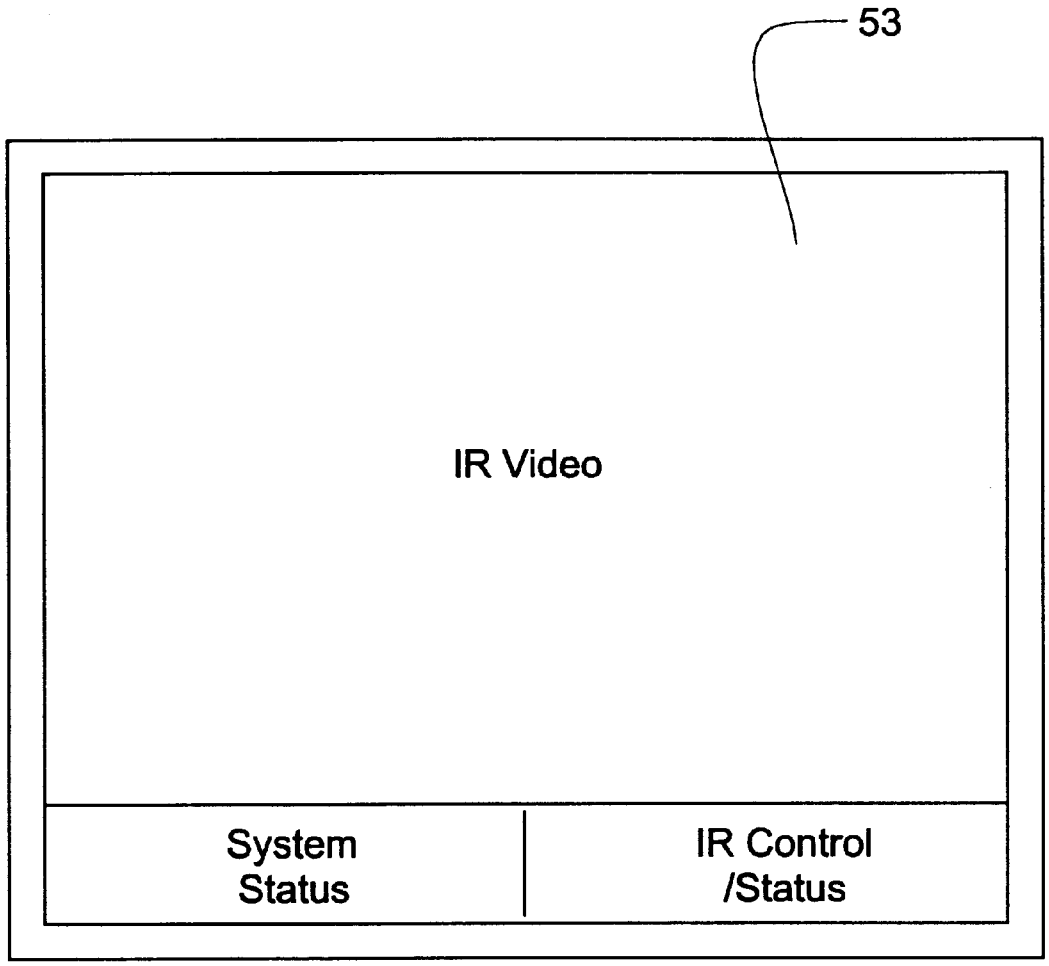
FIG. 19 is a diagrammatic view of the format of the screen for the IR control workstation.
Figure 20A:
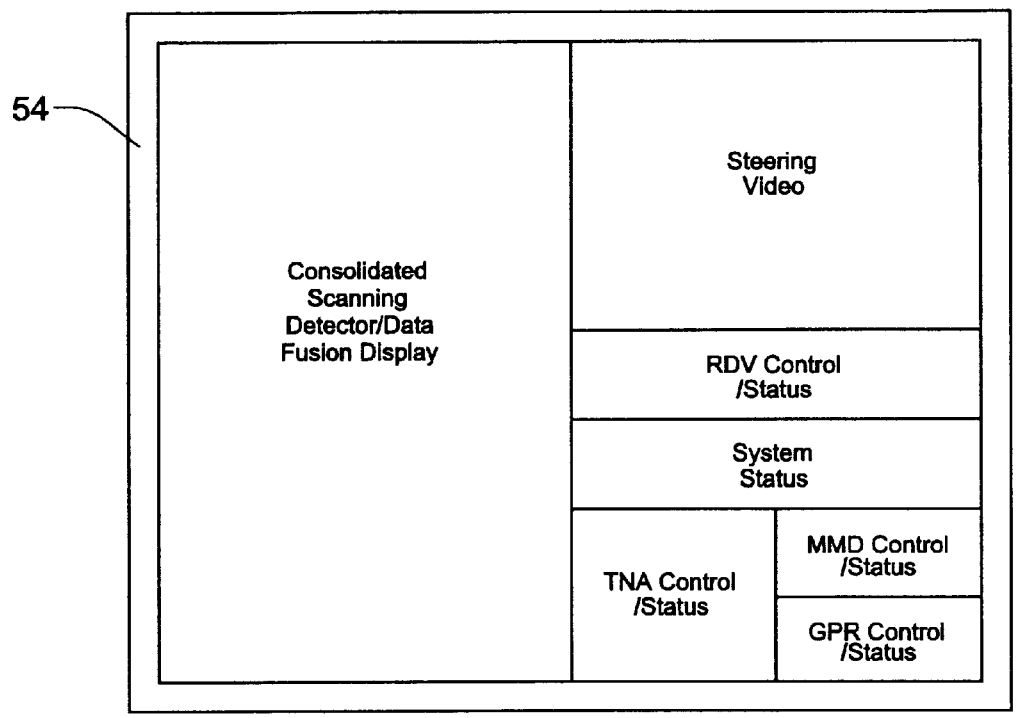
FIGS. 20a and 20b illustrate two diagrammatic, optional displays for the sensor control workstation.
Figure 20B:
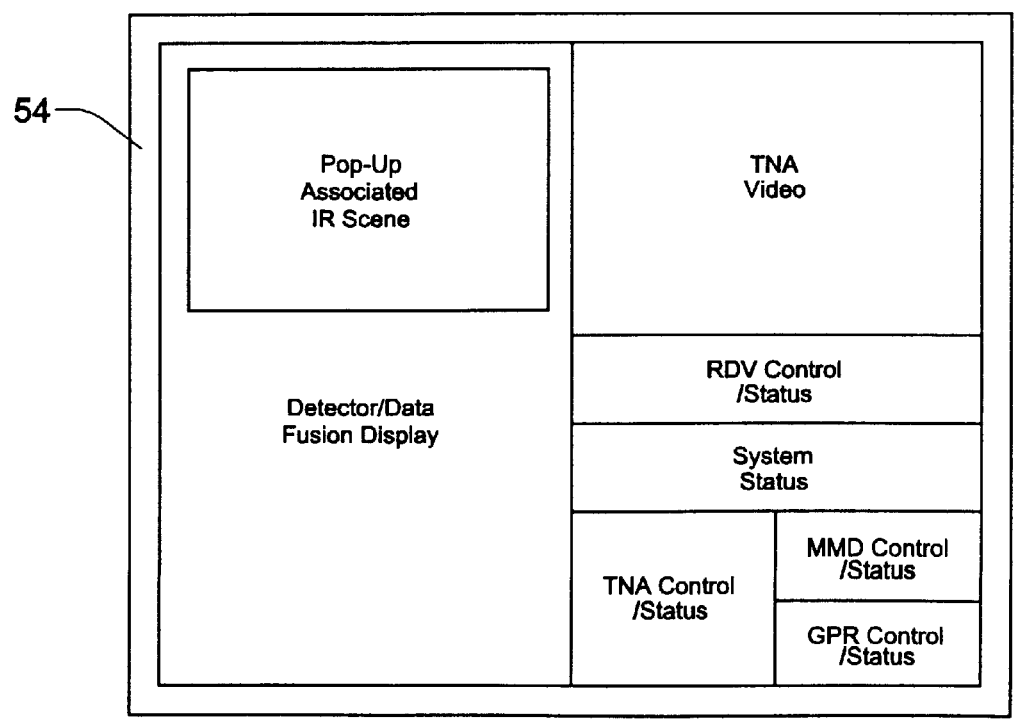

The control station 52 comprises two workstations 53,54 and software for performing functions including remote control of the RDV 5, positioning of the TNA 6,20, and sensor analysis including spatial correspondence and data fusion processing. Each workstation 53,54 currently employs Sun Ultra 11 workstations running under Unix. As shown in FIGS. 18–20, one workstation 53 runs the FLIR and other sensor detection displays while the other workstation 54 operates the RDV control and individual sensor control. The roles of the two workstations 53,54 can be reversed with the switch of a toggle.

Pulse Pile up Rejection—TNA Detail

As discussed above, the ability to use TNA technology in a stationary confirmation role lifts restrictions on the design of a TNA apparatus, said previous apparatus either having the luxury of long interrogation times or conversely being required to perform interrogation in a fraction of a second in a moving role. Either restriction is too onerous to provide a practical TNA sensor.

Figure 21:
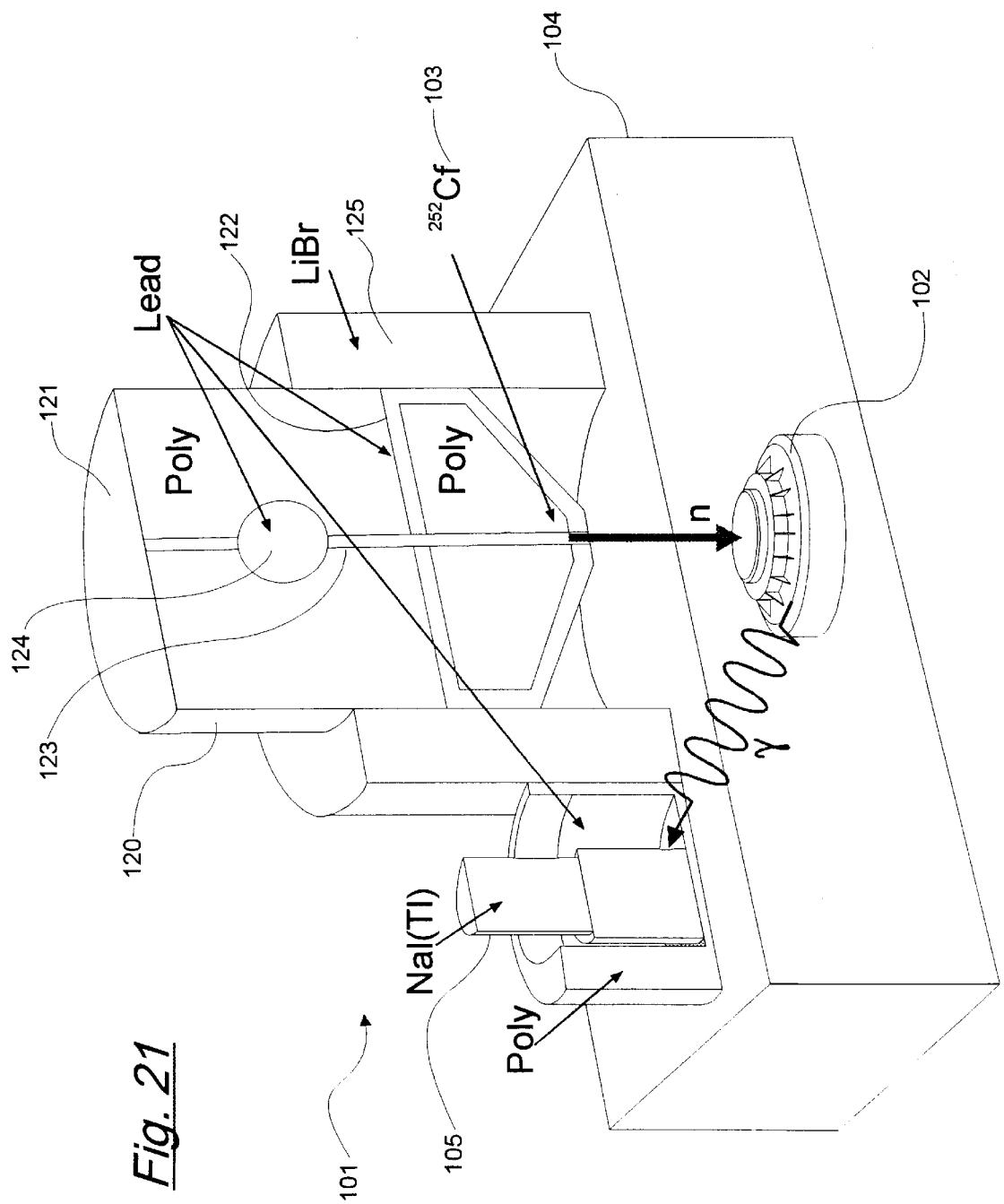
FIG. 21 is a cross-section view of the TNA sensor positioned above a mine. One of four detectors is shown and the shielding materials are identified.

Conversely, having reference to FIG. 21, a TNA sensor 101 is provided. The TNA sensor 101 can be placed accurately over a target of interest 102 (like a mine). Accordingly, the TNA sensor 101 can be strong enough to produce relatively short interrogation times, yet be made small, light (about 270 kgs) and at relatively low cost.

In particular, a TNA point confirmation sensor, model MineSCANS, was manufactured for the Department of National Defence by Science Applications International Corporation (SAIC Canada), Ottawa, Ontario The TNA sensor 101 comprises a 100 $\mu$g neutron source 103 of isotopic Californium ($^{252}$Cf) which emits energetic neutrons n which are slowed prior entering the ground 104 for reaction with nitrogen-14 nuclei ($^{14}$N). The $^{14}$N combine with the slow neutrons to form an energetic $^{15}$N isotope which decays, emitting a number of prompt gamma rays. The TNA sensor 101 is associated with a ground proximity sensor (non-shown) so that the TNA sensor 101 is not inadvertently lowered into contact with a potential mine 102.

For landmine detection, the most pertinent of these emissions of gamma rays is the highest energy transition at 10.835 MeV. At this transition energy there will be virtually no competing reactions—save for a weak 10.611 MeV transition from neutron capture in $^{30}$Si, common in most soils. Detection of this energy transition permits use of poor-resolution high efficiency Sodium Iodide NaI(TI) scintillation cameras or detectors 105 as opposed to high-resolution cryogenically-cooled detectors (intrinsic Ge which have a lower detection efficiency).

The gamma rays impinge one or more detectors 105. As the gamma rays pass through the scintillation crystal—NaI (TI)—they produce scintillation events—light. The events are detected by a photomultiplier tube 106 (not shown in FIG. 21). The signals produced by the photomultipliers 106 are combined into an output signal comprising serial pulses representing the scintillation events. The pulses are counted and are representative of the presence and concentration of $^{14}$N.

| Neutron Source Type | $^{252}$Cf |
| --- | --- |
| Neutron Source Intensity | 1 × 10$^8$ n/s |
| Gamma-ray Detector Type | 3" × 3" NaI(TI) |

-continued

| | |
| --- | --- |
| Number of Detectors | 4 @ every 90° |
| Source-Detector Distance | 30 cm |
| Field of View | 60 cm diameter |

The strong source results in high returned gamma ray count rates. Sophisticated electronics are necessary to deal with observed count rates at the detectors at about 200,000 cps or greater.

Both the NaI(TI) crystal and photomultiplier tube 106 are commercially-available, such from Teledyne-Brown and Hammamatsu respectively. The NaI(TI) crystal and photomultiplier tube are preferably pre-qualified based upon their abilities to handle both the rates and high energies expected.

The detectors 105 are ruggedly mounted in a frame. For a marginal increasing in capture efficiency, each detector 105 is angled downward and inwardly (not shown), roughly converging in the ground 102 below the source 103.

Figure 22:
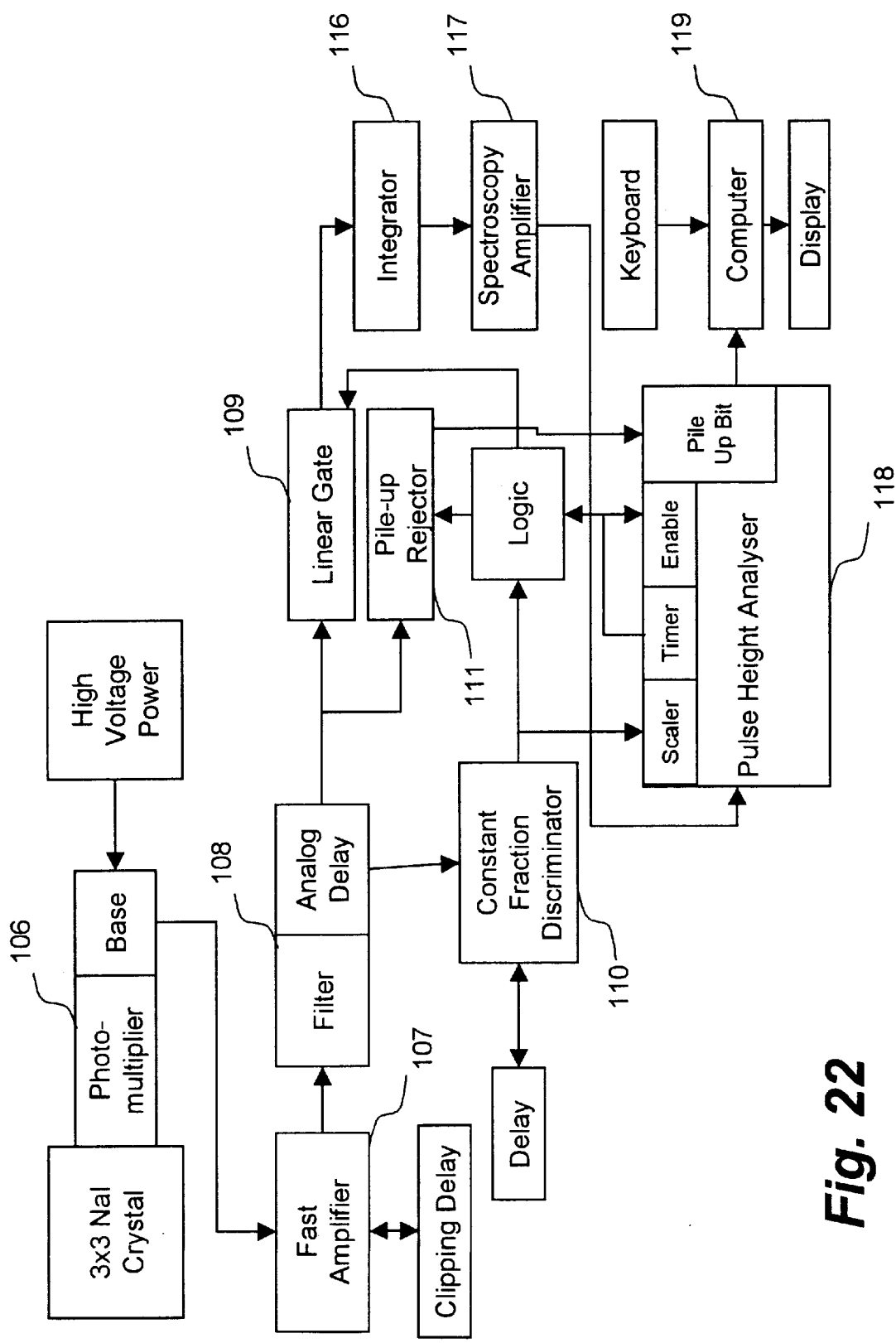
FIG. 22 is a block diagram of the electronics used for detecting and high speed processing of 10.8 MeV gamma rays associated with nitrogen.

Having reference to the schematic of FIG. 22, the photomultiplier 106 monitors the NaI(TI) crystal for a visible event. The photomultiplier produces a signal with a pulse representing each event. The signal passes through an amplifier 107 (with a clipping delay) and a filter 108. The filter signal is delayed and then enters a fast linear gate 109, controlled by a constant fraction discriminator (CFD) 110 for reducing deadtime (where the processing electronics are unable to process one pulse before the next arrives). The CFD 110 has a threshold set to approximately 5 MeV. The combination of the linear gate 109 and CFD 110 lowers gamma ray pulse counting rates from about 200,000 to about 5,000 cps. The linear gate 109 is open for 160 ns for each accepted pulse. The counting rate while the gate 109 is open is still so high that adjacent low energy pulses can pile-up and pass the CFD 110 as a high energy pulse and be improperly counted as nitrogen-caused. This piled-up pulse must be identified and rejected.

Accordingly, a pile-up rejector circuit 111 is provided which utilises a gated-integrator technique (FIG. 23) for rejecting pulses based upon shape distortion compared to "normal" pulses. The pile-up rejector circuit 111 was implemented by Bubble Technology Industries, Chalk River, Ontario as a BTI Pile-up Detector for use with the MineSCANS TNA sensor. Both pre and post pile-up events are detected. The technique is capable of detecting distortion in pulses as closely spaced as 15 ns and rejecting them.

Figure 23:
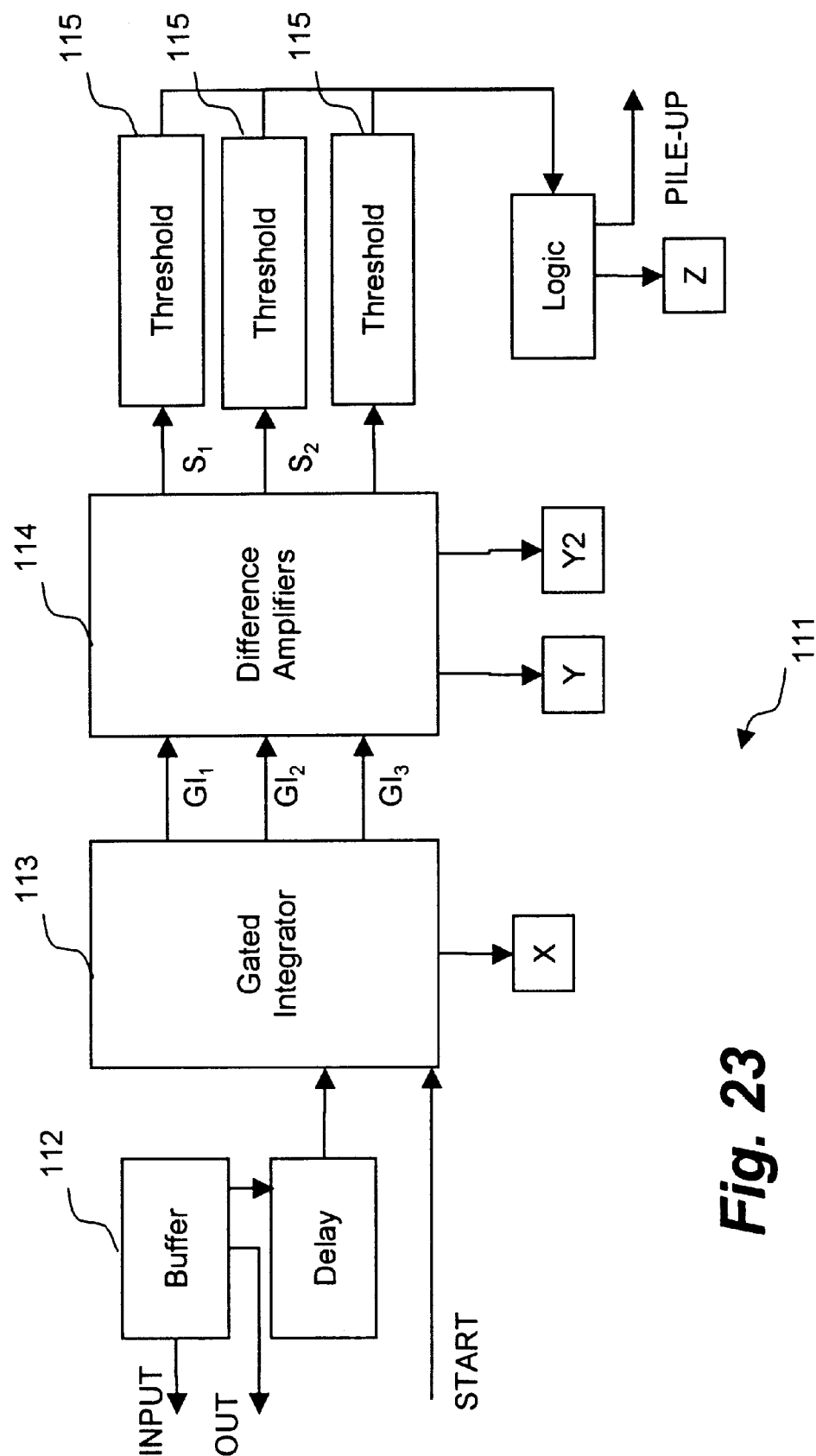
FIG. 23 is a block diagram of the pile-up rejection circuit.
Figure 24:
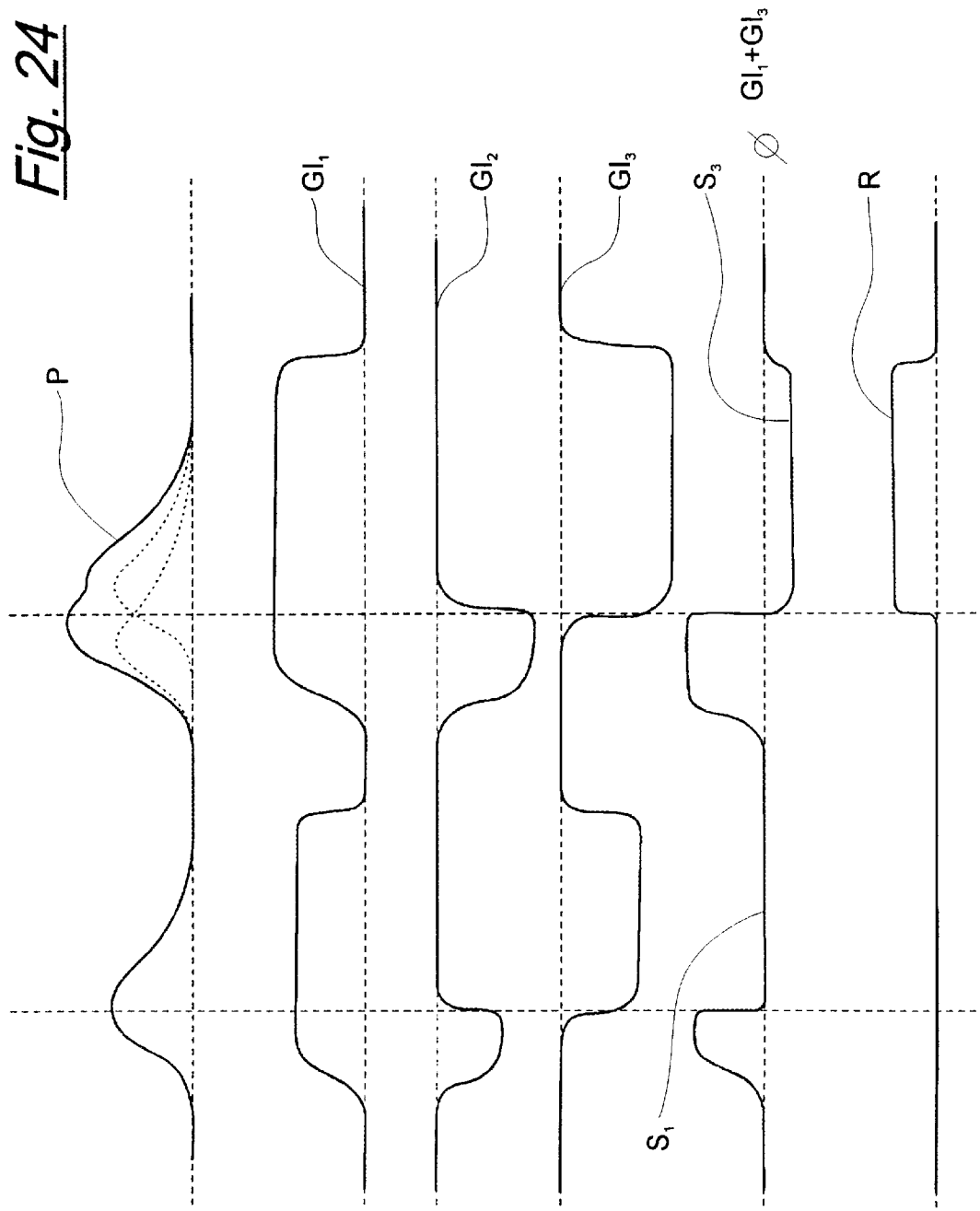
FIG. 24 illustrates the respective signals for a detector amplifier pulse, first and second gated integrator outputs, integrator difference, and pulse rejection output.

More specifically, having reference to FIGS. 23,24, the pile-up rejection circuit 111 accepts an amplified pulse signal which is fed as an input to a buffer 112. The signal is delayed to compensate for a delay in a pulse analysis start signal from the CFD. The signal then enters an integrator 113 which determines two or more integrals of each examined pulse of the serial train of pulses. If the examined pulse is not of a normal shape (i.e. not Gaussian or other "normal" shape) then the pulse is rejected.

Effectively, the gated integrator 113 integrates each pulse over time; firstly; for the whole pulse $GI_1$ (between the beginning of the pulse to a time well past the pulse) and secondly for about one half of the pulse $GI_2$ (between well before the beginning of the pulse to the middle of the pulse). A third integral $GI_3$ represents the integral from the middle of the pulse to a time well past the end of the pulse. Comparison of the integrals of a portion of the pulse to the whole of the pulse is illustrative of distortion of the pulse. Difference Amplifier 114 performs the comparison of the different integrations.

Actually, the gate integrator performs one entire pulse integration and two portions are subdivided out of the overall integration to provide the pre and post integration portions $GI_2, GI_3$.

A calibration is obtained for an actual pulse which has not piled-up. This can be achieved by obtaining data at low count rates where the pulses are not piled up. The integrals from the first integration $GI_1$ and second integration $GI_2$ are of opposite sign. Summing of the two signals yields a differential S. Weighted differences for the two integrals $GI_1, GI_2$ can be applied and adjusted so that the weighted difference $S_1$ to an actual pulse will be zero for non-piled pulses. These adjustments to the weighting factors are made in the differential amplifier 114. This establishes a threshold 115 against which the difference in the integrations can be compared. Application of the differential amplifier and the weighting factors to a piled-up pulse yields an identifiable non-zero baseline $S_2$ which is distinguishable over threshold 115

For an undistorted or non-piled-up pulse, the first integration (whole pulse) should be about twice the second integration (½ pulse for purely Gaussian-shaped pulse). Thus the appropriate weighting factors be about ½:1 to achieve a null difference signal. Weighting factors would be adjusted at the differential amplifier for various other pulse shapes.

Non-zero differences are detected at the thresholds 115. If the appropriate threshold is exceeded then the logic circuit is activated to reject the pulse. A non-zero difference between the first and second integrals are representative of pre-pile-up and between the first and third integrals are representative of post-pile-up.

Provision for inputs X,Y,Y2 to the gated integrator and the difference amplifier permit the timing of the integration and the weighting to be adjusted.

Pulses P which are piled-up due to spacing as close as 15 ns can be detected and rejected R.

Referring again to FIG. 22, an integrator 116 shapes an accepted pulse for analysis by a spectroscopy amplifier 117. The spectroscopy amplifier 117 prepares the pulse for analysis by a pulse height analyser 118. Conventional pulse pile-up rejectors (built into the spectroscopy amplifier 118) are disabled.

The pulse height analyser 118 determines which pulses are representative of nitrogen and outputs the count results to a computer 119.

For accurate energy determination, the overall system is calibrated prior to use. An energy calibration is performed on known materials to obtain a spectrum having lots of counts in distinct energy peaks as near as possible to the energy region of interest, i.e. 8.5–11 MeV. Secondly, a "background" spectrum is acquired—i.e. an energy spectrum with the TNA head sitting over an area known to be free of mines.

Knowing the background spectrum, the spectrum acquired for a target of interest is superimposed with the background and the difference compared against known pulse count rates for known nitrogen targets for establishing whether the target of interest is explosive or not.

Using a standard Gaussian detection limit approach described by Currie, L. A., Anal. Chem., 40, No. 3, 586 (1968) to low-level counting, the false alarm and mine detection probabilities are based upon the number of excess counts in the energy region of interest. Under certain circumstances having large background fluctuations or abnormal structure in the background spectrum (such as excessive silicon in the soil, for example) the detection limit statistical approach can generate false positive indications of a mine. To improve upon the detection probability, a combined Gauss-Bayes statistical approach is employed as described by Silvia, D. S., Los Alamos Science, 19, 180 (1990).

EXAMPLE I

For confirmation of the choice of transition energy for identifying $^{14}N$ and the use of NaI(Tl) detectors, experiments were performed using a weak $^{252}Cf$ source ($1 \times 10^6$ n/s) and a 2"×2" NaI(Tl) detector. An explosive simulant, containing 1 kg of nitrogen, was used. Positive detection of nitrogen reduces to the detection of a statistically significant number of counts above background in the energy region 126 of interest—roughly 9 to 11 MeV.

Figure 25:
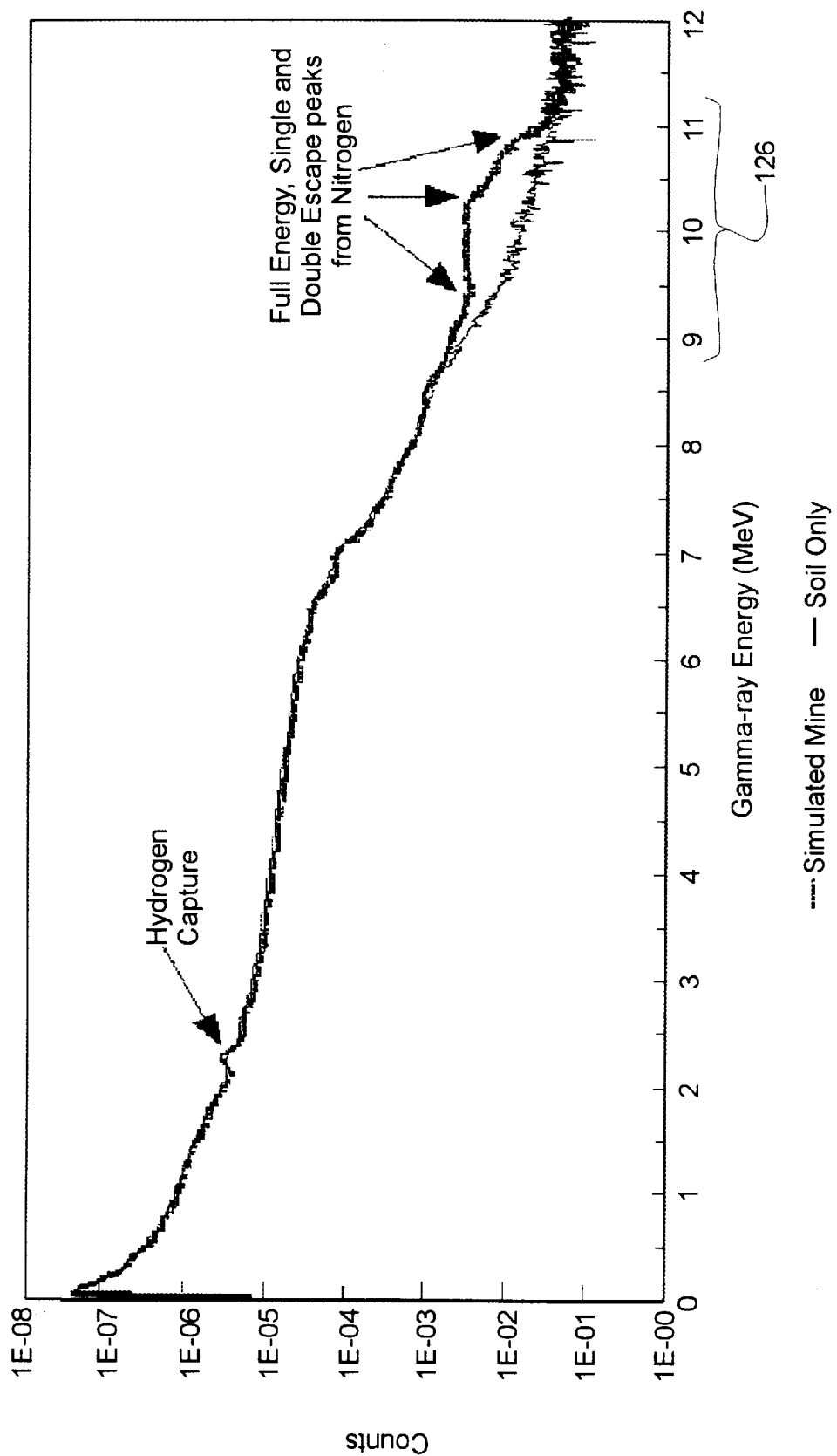
FIG. 25 is a graph illustrating gamma ray pulse counts versus gamma ray energy level (energy spectrum) for an experiment using a weak $^{252}$Cf source and one 2"×2" NaI(CI) detector with a 1 kg N "mine", for an 8 hour run according the EXAMPLE III.
Figure 26:
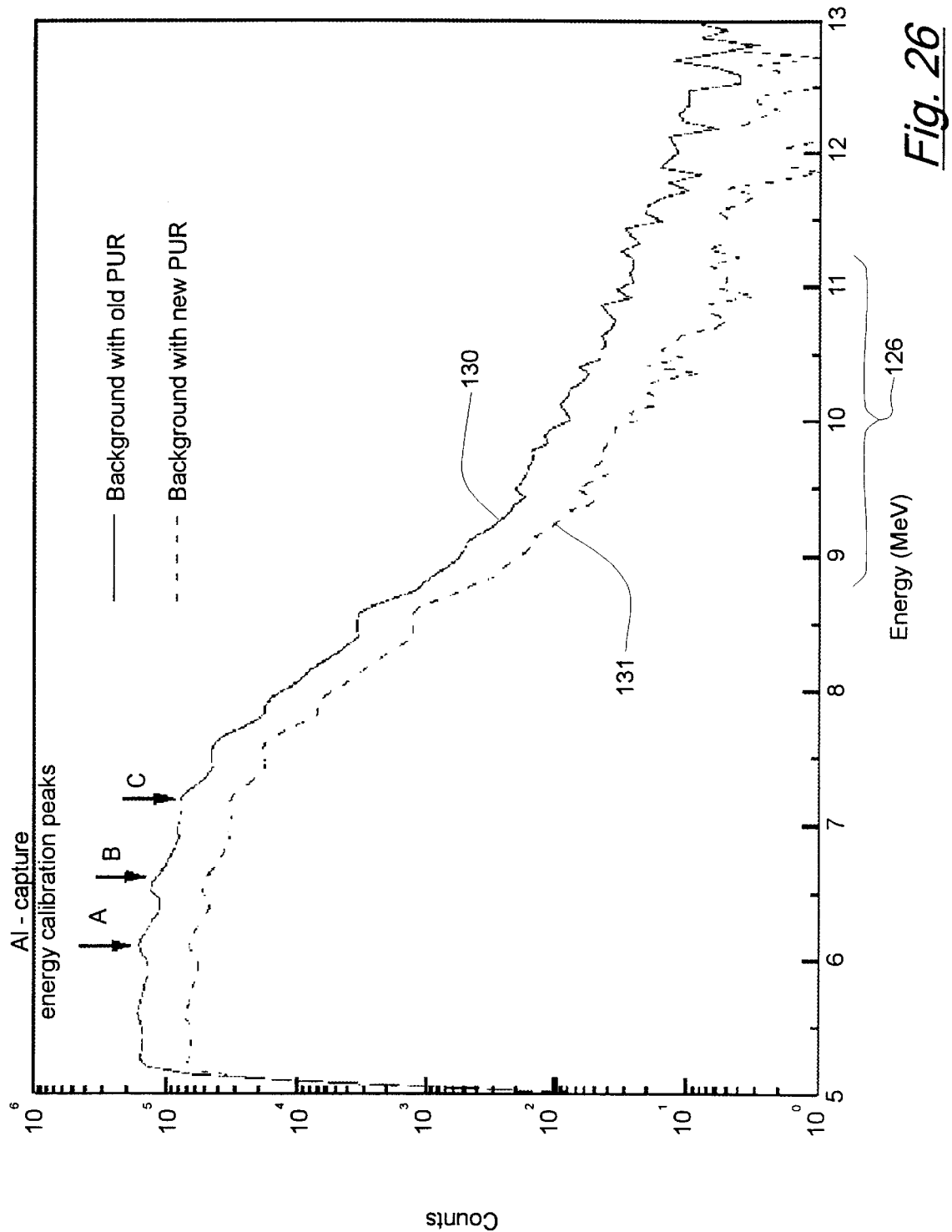
FIG. 26 is a graph illustrating the energy spectrum obtained using both a prior art pile-up rejection technique and the novel method. There is a large effect noted in the energy region of interest at roughly 9–11 MeV resulting from the change of methods to reject piled-up pulses.

Having reference to FIG. 25, a large number of counts were required to obtain sufficient statistics at the desired energy. The count time for this experiment (about 8 hours) was excessive and clearly indicated the need for a stronger $^{252}Cf$ source and/or more efficient detectors in the final TNA system.

EXAMPLE II

Having reference to FIG. 21, the choice of shielding materials was based upon two considerations: firstly for shielding of the high efficiency NaI(Tl) detectors 105 from direct neutron and gamma-ray emanating from the $^{252}Cf$ source 103; and secondly as biological shielding for personnel.

The combination of lead and LiBr shielding and polyethylene moderating material used was optimised using computer code MCNP4A, as described by Briemeister, J. F. In "MCNP—A General Monte Carlo n-Particle Transport Code—Version 4A", LA-12625-M, 1993. The final configuration of materials is as illustrated in FIG. 21.

This shielding configuration lowered the count rate at the NaI(Tl) detectors to about 200,000 cps. This rate was a baseline for the electronics design (FIGS. 22,23). The main contributor to these counts are gamma-rays from the $^{252}Cf$ source 103, however neutron capture gamma rays from a variety of sources, including the NaI(Tl) crystal itself, were found to contribute.

The flask 120 holding the source is substantially polyethylene 121. A lead shield 122 surrounds the source 103 with a source transfer tube 123 extending upwardly through the polyethylene 121. A lead shielding sphere 124 is centred in the flask 120 and located in the source transfer tube 123. A LiBr gel 125 surrounds the flask and absorbs neutrons to block their access to the NaI(Tl) detectors 105.

The measured radiation dose equivalent rates were 55 mRem/h neutron and 2.6 mRem/h gamma at the surface of the TNA head, and 1.8 mRem/h neutron and 0.8 mRem/h gamma at 1 m from the surface.

EXAMPLE III

The system and electronics were calibrated by obtaining a "background" spectrum with the TNA head sitting over an area known to be free of mines. As shown in FIG. 25, three peaks A, B, C generated by neutron activation in Aluminum within the head were prominent enough to be used for calibration—the full energy peak from the 6.103 MeV transition and the double and single escape peaks from the 7.726 MeV transition at 6.704 MeV and 7.215 MeV, respectively. A linear extrapolation of this least squares fit, into the energy region of interest, was then performed.

Two traces are shown, the top solid-line trace 130 representing the results based upon previous prior art pulse rejection technique of comparing pulse widths. The bottom dashed trace 131 represents the results based upon the gated integrator pulse pile-up rejection circuit 111 which demonstrates fewer pile-up pulses being counted as 10.8 MeV nitrogen emission pulses.

EXAMPLE IV

Field trials of the TNA sensor as a confirmatory sensor were held at specially prepared mine fields in Southern Alberta in winter conditions. Ambient temperatures were between −20° C. and −30° C., with winds up to 50 km/h and snow cover of over 30 cm.

Figure 27:
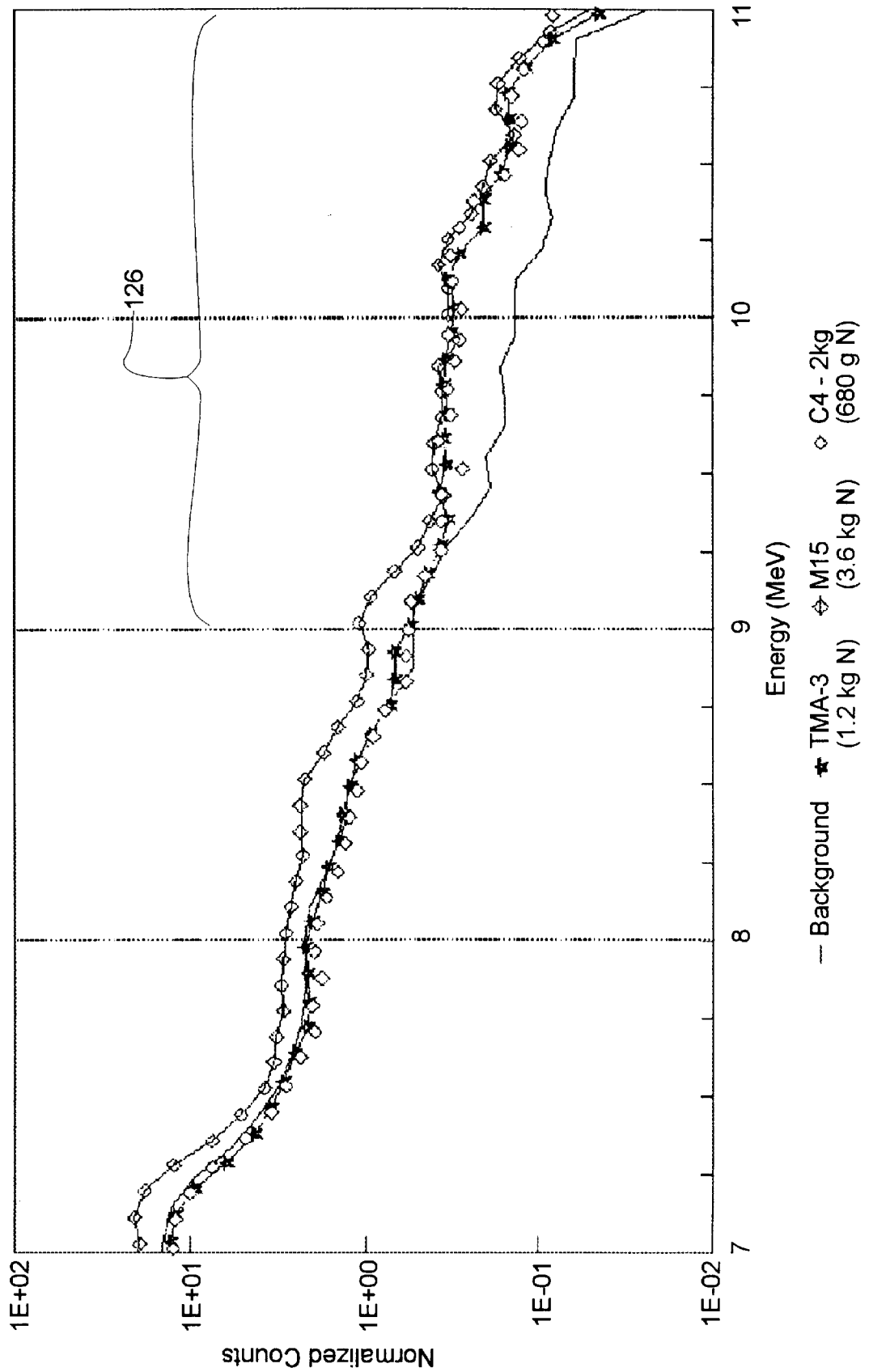
FIG. 27 is a graph illustrating the energy spectrum obtained for the field trials on "large" mines according to EXAMPLE IV. Each run was conducted for 10 minutes. Note the effect of the mines metallic shell on the spectrum for the M15 spectrum.
Figure 28:
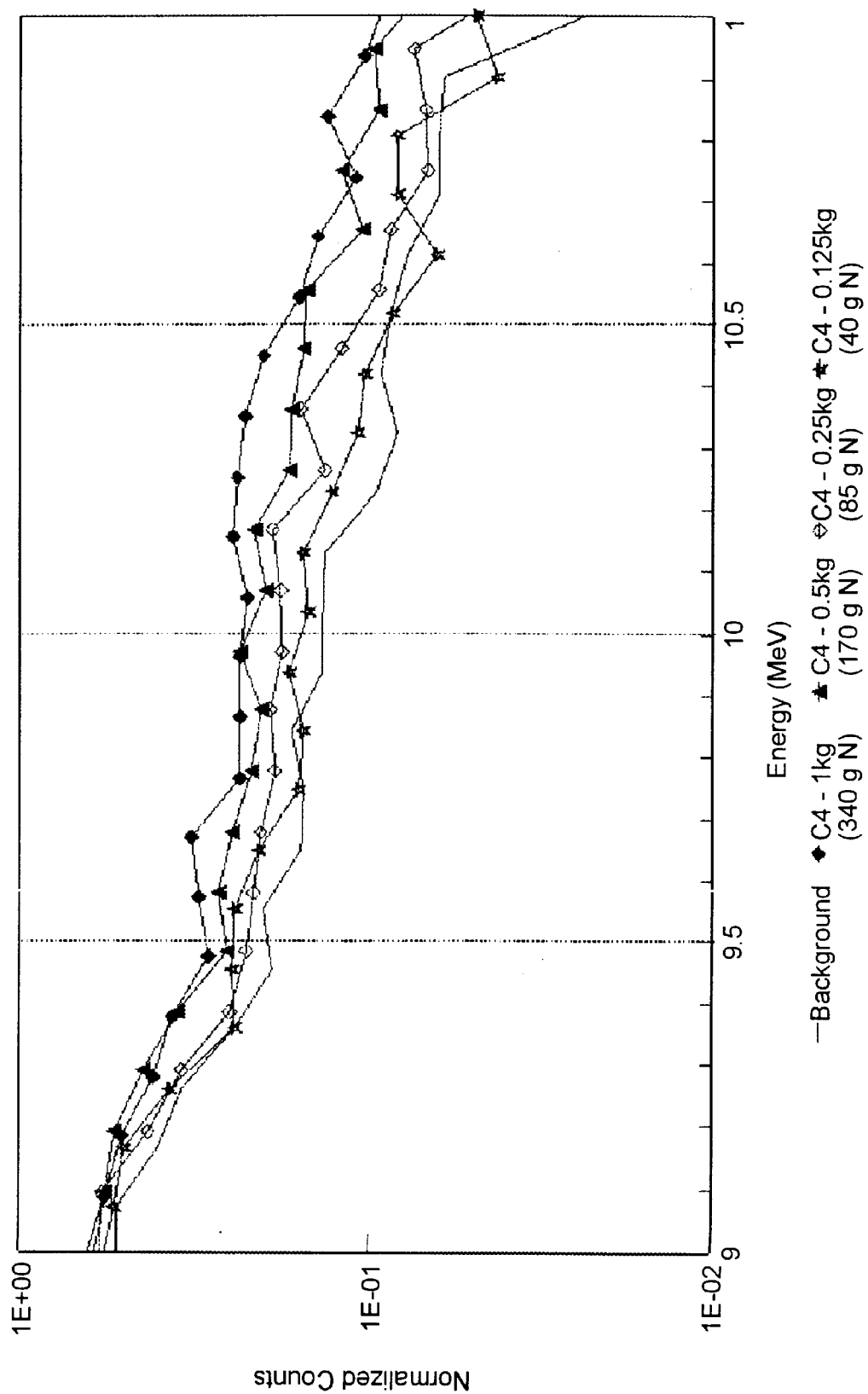
FIG. 28 is a graph illustrating the energy spectrum obtained for the field trials on "small" C4 mines according to EXAMPLE IV. Each run was conducted for 10 minutes. All the tested mines, except for the 0.125 kg C4 mine (having about 40 g of N) could be positively detected in less than 5 minutes.

During the trials, four "large" mines (MIS, TMA3, M21 and TMA5A) representing different masses of nitrogen, were buried at different depths and interrogated. Additionally, different masses of "small" mines or C4 plastic explosive (34% N by mass) were surface-buried and interrogated. Spectral results for different explosives are illustrated in FIGS. 27 and 28. Table 1 summarises the experimentally determined count time for a 93% detection probability. This count time was arrived at by an iterative solution to the statistical analysis techniques described above, based upon the experimentally measured background and net counting rates.

TABLE 1

Results of Detection Trials

| Mine | Nitrogen Mass (to top of mine) | Burial Depth | Count Time for Positive Detection(93%) (s) |
|---|---|---|---|
| Large Mines (FIG. 27) | | | |
| M15 | 3.6 kg | surface | 5 |
| M15 | 3.6 kg | 3" | 19 |
| TMA3 | 1.2 kg | surface | 6 |
| TMA3 | 1.2 kg | 3" | 11 |
| TMA3 | 1.2 kg | 6" | 37 |
| M21 | 1 kg | 3" | 31 |
| TMA5A | 870 g | 4" | 48 |
| Small Mines (FIG. 28) | | | |
| C4 | 680 g | surface | 8 |
| C4 | 680 g | 3" | 20 |
| C4 | 340 g | surface | 14 |
| C4 | 170 g | surface | 45 |
| C4 | 85 g | surface | 254 |
| C4 | 40 g | surface | >1000 |

Several features should be noted. Firstly, for the case of the largest Anti-Tank (AT) mine (M15) there is considerable structure below 9 MeV. This is likely due to neutron capture in other elements in the M15 mine—and the large peak at about 7.1 MeV may be the first escape from the prominent iron capture transition. This is supported by the fact that the M15 is encased in steel, while C4 and the other non-metallic mines are not. Secondly there is an indication of structure in the background around 10.1 MeV, which could be the first escape from the Si-capture peak mentioned earlier (the soil was quite sandy, and thus high in Si-content). Silicon activation will eventually determine the final lower detection limit of the system. Thirdly, from the table and the figures, the lower detection limit of the system as it stands right now is slightly under 100 g of nitrogen (for reasonable count times of less than 5 minutes). This means that the system is capable of detecting almost all AT mines (at depths down to 6") and many larger Anti-Personnel (AP) mines—which would be surface buried. Finally one notes that there is virtually no difference in the positive detection counting times for some of the mines examined here, despite their large differences in mass of N (500 g to 3.6 kg). This is due to a convolution of the thermal neutron flux profile (which drops rapidly with depth) and the distribution of nitrogen within the mines (for the physically larger M15, there is far more nitrogen at greater depths than for C4, for example).

Experiments were also conducted to determine the radial field of view of the system as shown in Table 2.

TABLE 2

Radial Variation in System Sensitivity (M15 Mine Surface Buried)

| Radial Distance of Mine to Source (cm) | Count Time for Positive Detection (93%) (s) |
|---|---|
| 0 | 5 |
| 10 (between detectors) | 4 |
| 20 (between detectors) | 9 |
| 30 (under detector) | 8 |
| 30 (between detectors) | 80 |
| 40 | >1000 |

The field of view is quite constant out to a radius of about 25 cm, after which it begins to drop rapidly. At a radius of about 40 cm, detection is not possible (this is physically outside of the 30 cm radius TNA head). The above serves to illustrate the importance of accurately locating the target of interest (mine) with the primary systems.

In summary, the EXAMPLES have validated use of a TNA sensor for confirmatory detection of land mines having nitrogen masses of greater than about 100 g in a few minutes, over a radial area of about 2000 cm$^2$ (about 25 cm radius). This will enable almost all AT and large AP mines to be positively detected. Smaller surface buried AP mines (containing less than 100 grams of nitrogen) will have to be eliminated by such techniques as flailing, as is performed by a pre-clearance vehicle. Further, the system has clearly shown the ability to perform in adverse weather conditions.

Marking System Detail

Figure 29:
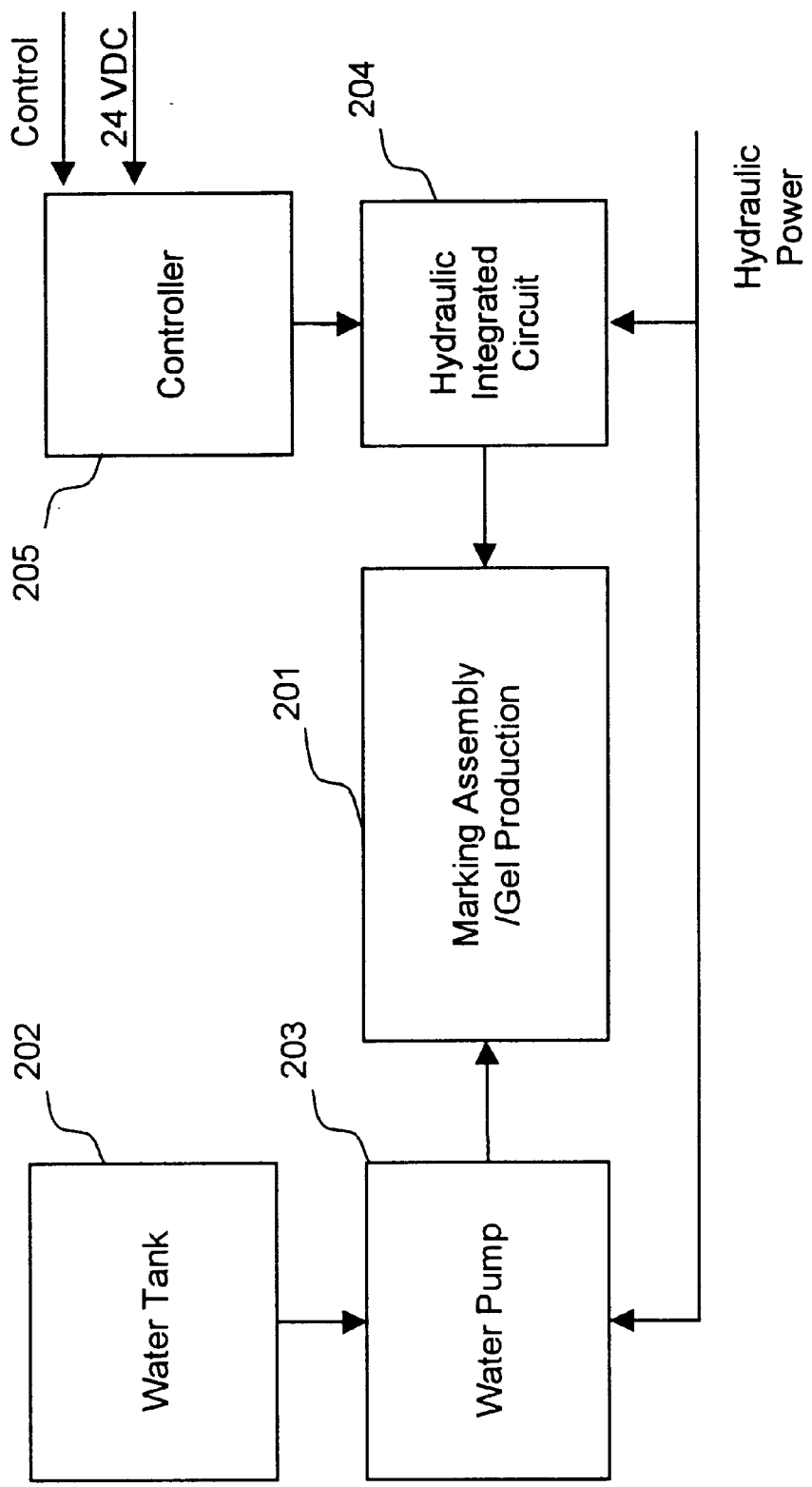
FIG. 29 is a flow chart of the novel marking system.
Figure 30:
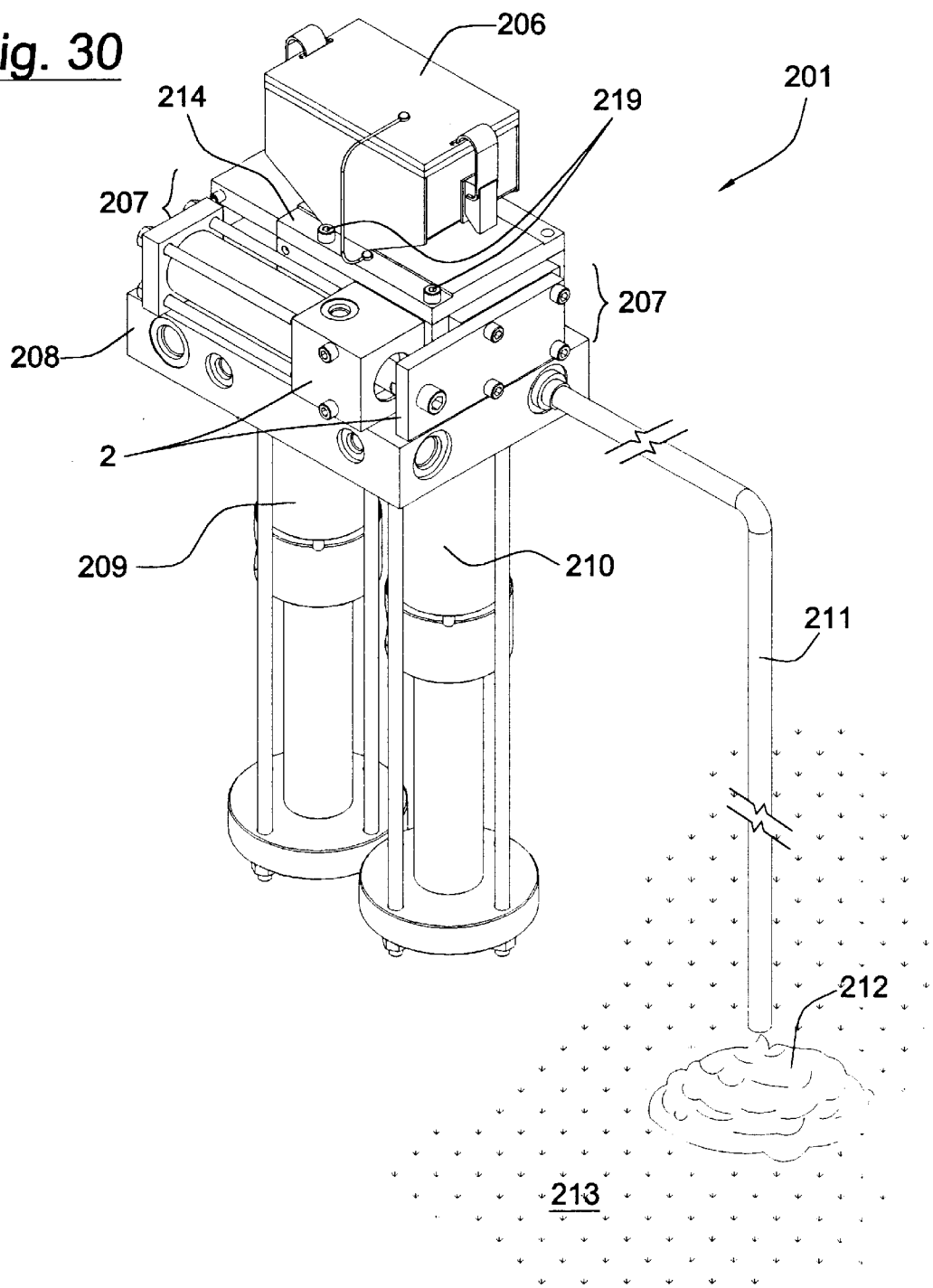
FIG. 30 is a perspective view of the marking apparatus according to one embodiment of the marking system.

Having reference to FIGS. 29,30, a marking system 201 is provided comprising novel apparatus and method. Generally, as described below, a dry granular long-chain polymer powder is mixed with a highly visible dye and water. The polymer swells to form a gel product having a wet volume about 20 times the dry powder volume. This highly visible gel product is deposited on the ground at the position which is to be marked. The gel product has a physical bulk which is more easily visible than is a substantially mass-less mark. Combined with a highly visible dye, the mark very effective. When placed on the ground to mark the presence of a mine, the location is safely and clearly marked for several or more hours before planned degradation lessens its effectiveness.

Having reference to FIG. 29 a marking system is illustrated which comprises a gel production and marking assembly 201, water supply tank 202 and pump 203, a hydraulic power circuit 204 and a 24 VDC controller 205.

Turning to FIG. 30, the apparatus for making and depositing the gel product is an assembly 201 comprising a dry powder hopper 206, a metering head 207, a mixing and injecting manifold 208, a water ram 209, a gel product ram 210 and a gel product discharge tube 211. The gel product or mark 212 is discharged onto the ground 213 from the discharge tube 211.

In more detail and referring to FIGS. 30–33b, the hopper 206 is mounted atop a base plate 214. The hopper 206 is located above the metering head 207 for permitting gravity discharge of its dry powder through a hopper discharge port 215 (seen in FIGS. 33a,33b). The metering head 207 comprises: a guide block 217 sandwiched between a top metering plate 216 and a bottom isolating plate 218. The metering head 207 itself is sandwiched between the hopper's base plate 214 and the manifold 208.

The hopper's base plate 214, metering plate 216, guide block 217, isolating plate 218 and manifold 208 are stacked and incorporate seals between each component. The hopper base plate 214, guide block 217 and manifold 208 are in fixed space relation to each other using two opposing sets of four bolts 219 each, and are spaced from each other by the metering and isolating plates 216,218. The metering and isolating plates 216,218 are laterally movable using a double acting hydraulic actuator 220. The actuator 220 is connected to a slider bracket 221 which links the metering and isolating plates 216,218 together for synchronous, sliding movement.

The guide block 217 has a "H"-shaped cross section for forming a pair of upper side walls 222 and a pair of lower side walls 223 for containing the metering and isolating plates 216,218 during sliding movement.

Each of the hopper base plate, metering plate, guide block, isolating plate and manifold have complementary ports formed therethrough for gravity passage of the dry powder. Dry powder discharges through the hopper port 215. A metering port 224 is formed in the metering plate 216. Port 225 is formed through the guide block 217. Port 226 is formed through isolating plate 218. Finally, a port 227 is formed through the manifold 208.

The hopper base plate port 215 is laterally shifted from the guide block and manifold ports 225,227 so that at no time is there a continuous path from the hopper 206 through to the manifold 208. The guide block port 217 is always aligned with the manifold port 227.

Figure 33A:
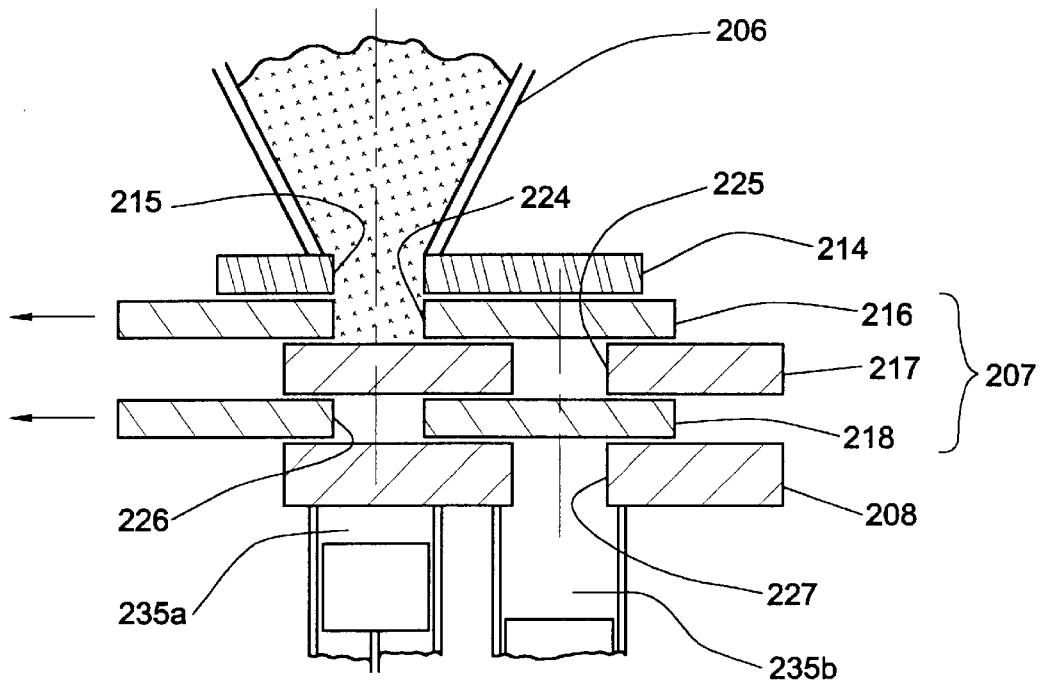
FIG. 33a is a schematic cross-sectional view of the apparatus in the powder charging position.
Figure 33B:
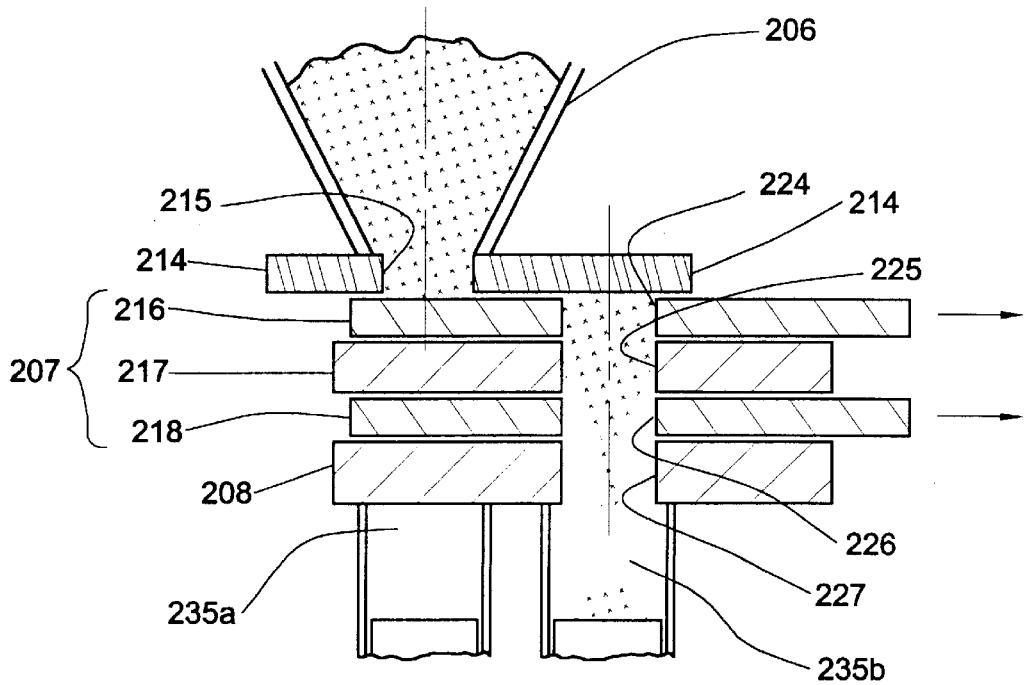
FIG. 33b is a schematic cross-sectional view of the apparatus in the powder discharging position.

The metering and isolating plates 216,218 are movable between a powder charging position (FIG. 33a) and a powder discharging position (FIG. 33b).

In the powder charging position, the metering port 224 (and isolating port 226) are actuated with actuator 220 so as to align with the hopper base plate port 215. This action takes the metering and isolating ports 224,226 out of alignment with the guide block port 225.

In the discharging position, the metering port 224 (and isolating port 226) are actuated to align with the guide block port 225 for discharging metered powder through the manifold port 227.

Figure 31:
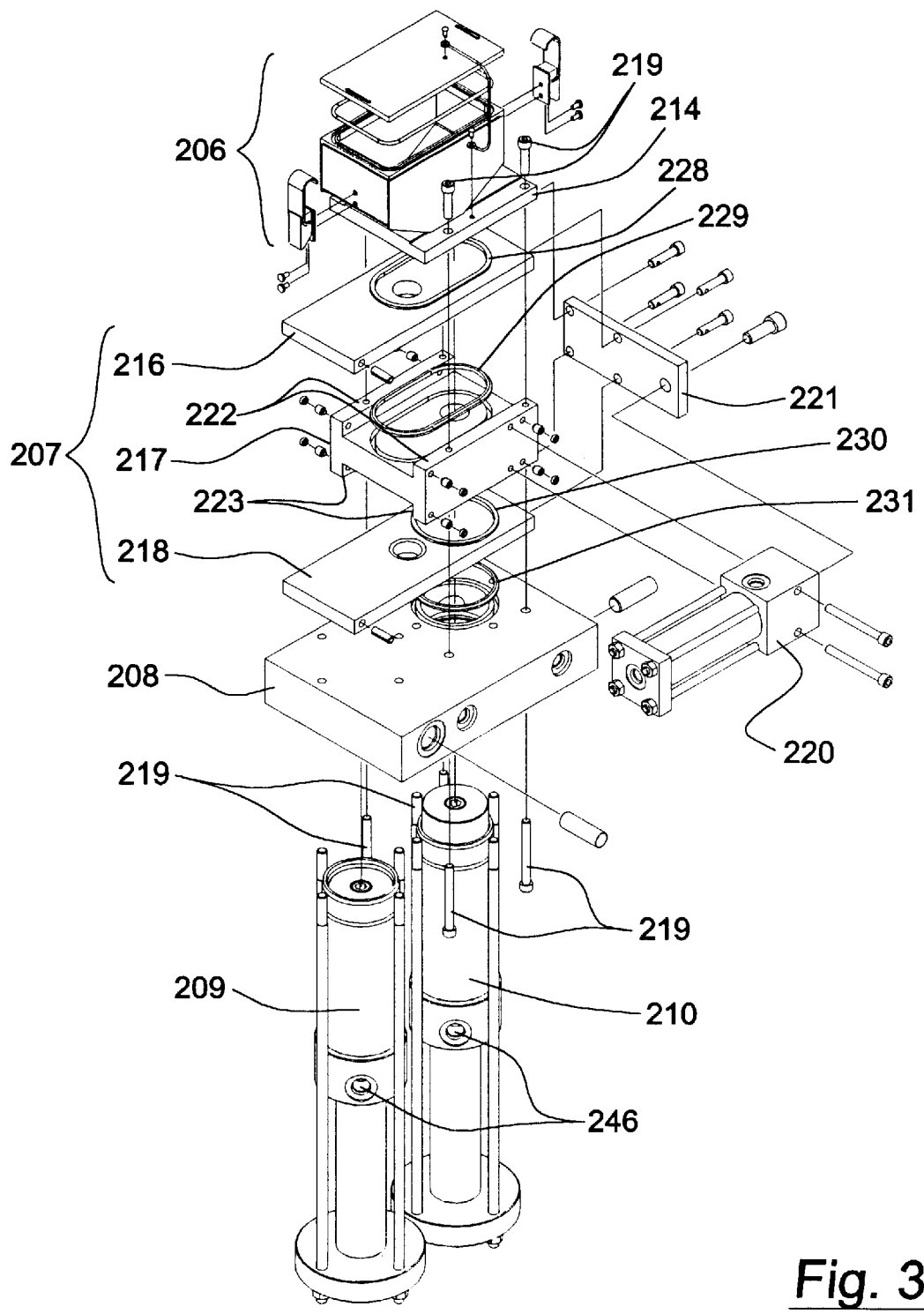
FIG. 31 is a perspective exploded view of the marking apparatus according to FIG. 30.

Best seen in FIG. 31, oblong seals 228,229 are situated in the two interfaces between the hopper base plate 214, metering plate 216, and guide block 217. The oblong shape of the two seals 228,229 maintains a continuous seal between the hopper base plate port 215 and metering plate port 224, and between the metering plate port 224 and guide plate port 225 throughout the powder charging and discharging positions.

Circular seals 230,231 are situated in the two interfaces formed between the guide block 217, the isolating plate 218 and the manifold 208. The isolating plate port 226 moves into the circular sealed area in the discharge position. In the powder charging position, the isolating plate port 226 moves out of the sealed area for isolating the manifold 208 from the metering head 217.

Beneath the manifold 208 is mounted a pair of hydraulically operated rams; the water ram 209 and the gel product ram 210. Best seen in FIG. 206, rams 209,210 have pistons 232 movable within cylinders 233. The pistons 232 have annular seals 234 for forming a water chamber 235a and product chamber 235b within their respective cylinders 233.

The pistons 232 are independently operated with double acting hydraulic actuators 236. The cylinders 233 seal to the underside of the manifold 208, secured with long studs 245.

Figure 34:
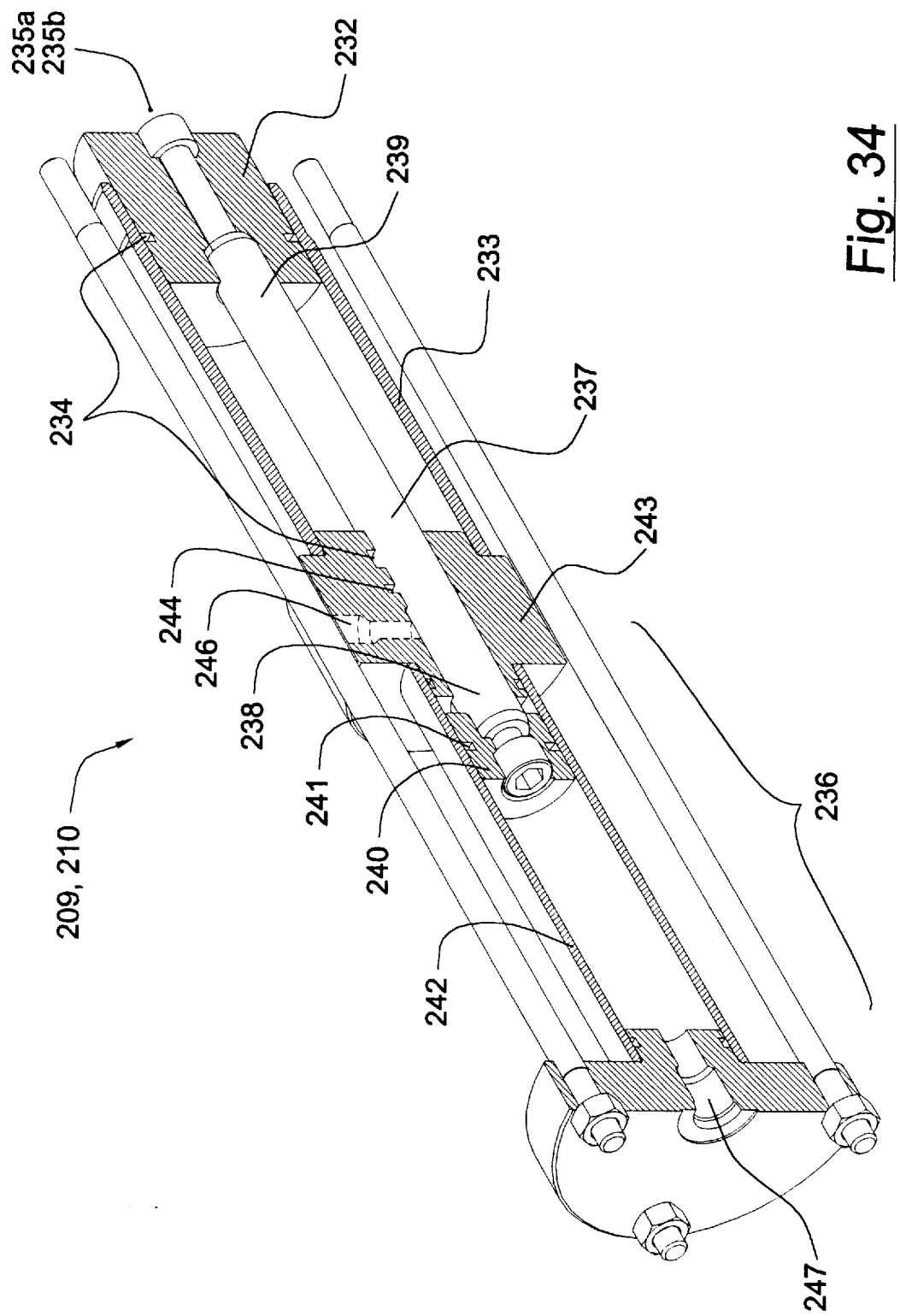
FIG. 34 is a cross-sectional view of a hydraulic actuator and ram used for both the water ram and the product ram.

Each hydraulic actuator 236 has a piston rod 237 having a first end 238 and a second end 239. A hydraulic piston 240 and annular piston seals 241 are mounted at the piston rod's first end 238. The hydraulic piston 240 is operable within a hydraulic cylinder 242 separated from the water and product chambers 235a,235b by bulkhead 243 and annular seal 244. The water and product pistons 232 are mounted at the second ends 239 of the piston rods 237. A first hydraulic port 246 (FIG. 30 and fancifully depicted in dotted lines in FIG. 34) in the bulkhead 243 introduces hydraulic fluid to the hydraulic actuator 236 to drive the piston rod 237 and its respective water and product piston 232 away from the manifold 208, forming their respective water and product chambers 235a,235b. A second hydraulic port 247 introduces hydraulic fluid to the hydraulic actuator to drive its respective water and product piston 232 towards the manifold 208 for ejecting the contents of their respective chambers 235a,235b.

The manifold port 227 extends completely through the manifold 208 from the metering head 207 to the product chamber 235b of the product ram 210 located directly below the port 227 (FIGS. 31,33a,33b).

Figure 32A:
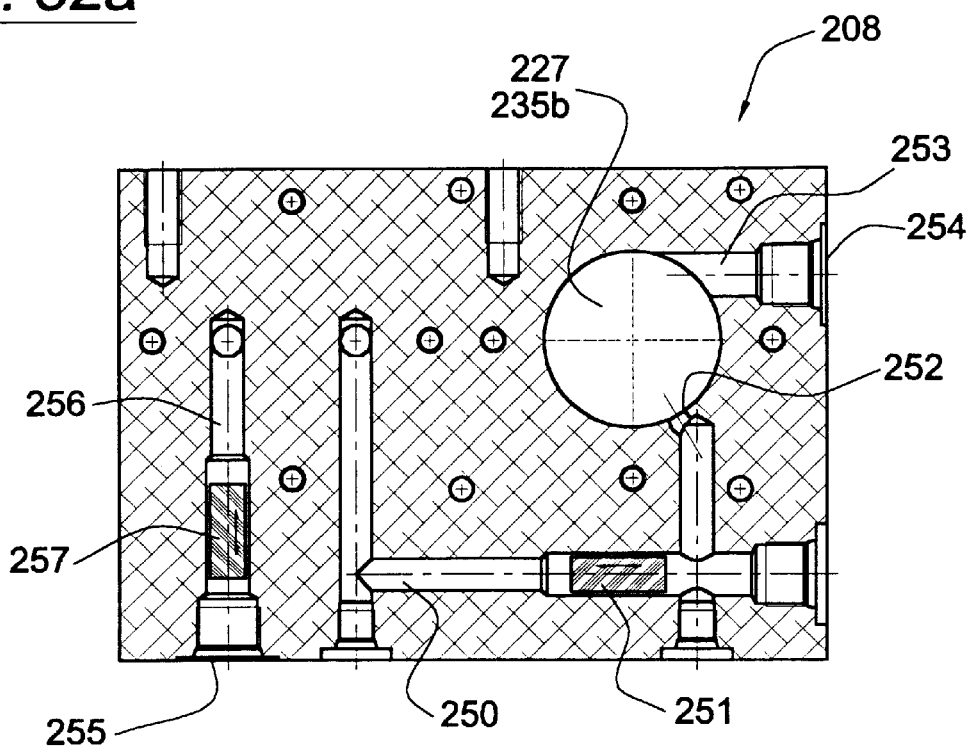
FIG. 32a is a cross-sectional view through the center of the mixing and discharge manifold according to FIG. 30.
Figure 32B:
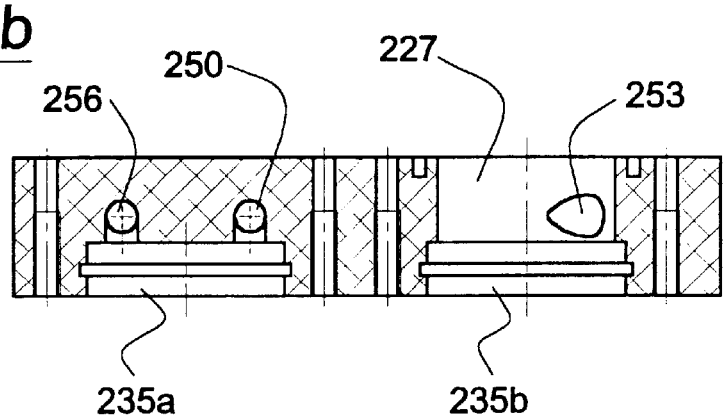
FIG. 32b is a cross-sectional side view of the mixing and discharge manifold as sectioned through the centre of the ram chambers according to FIG. 30.

Having reference to FIGS. 32a,32b, the manifold 208 routes powder, water and product gel to and from the water and product rams 209,210. A first passage 250 extends from the water ram 209 and chamber 235a, through the manifold 208 and into the product ram 210 and chamber 235b. The water passage 250 is interrupted with a valve, such as a check valve 251 for permitting water flow from the water chamber 235a to the product chamber 235b but not in the reverse direction. The first passage 250 exits into the product chamber 235b through discharge 252, angled downwardly towards the product ram's piston 232. A second passage 253 extends from the product chamber 253b, through the manifold 208 and to a gel product outlet port 254. A product discharge tube (FIG. 30) conducts gel product from the outlet port 254 to the marking site. Port 255 is provided for routing water supply through a third passage 256 to the water chamber 253a. The third passage 256 is fitted with a check valve 257 to permit water to enter the water chamber 253a but not exit that way.

A superabsorbant powdered long chain polymer is used such as Potassium Polyacrylate, polycarbonate or polymer available under the tradename "DriMop" or "SaniSorb" from Multisorb Technologies, Inc., Buffalo, N.Y. These and other similar polymers are often used in liquid spill control and activate when mixed with water to form a gel product. When mixed at ratio of about 95:5 water:powder by volume the polymer powder absorbs nearly 20 times its volume in water and forms a semi-solid gel. The gel is not robust and breaks down under mechanical agitation and UV exposure. About 97% of the polymer is biodegradable.

Environmentally-friendly, forestry-marking dyes, are available in liquid form as "Fluorescent Dye" from Forestry Suppliers, Inc., Jackson, Miss. Some dyes are suitable for use with potable water such as "Rhodamine WT".

In operation, dye is pre-mixed with water (for Fluorescent Dye, concentrations of about 0.1% are sufficient). The hopper is filled with powdered polymer.

Having reference to FIGS. 33a, 33b, the metering and isolation plates 216,218 are cycled between the charging and discharging positions in the respective figures. The position of the metering and isolating plates 216,218 dictates the timing of product ram 209 charging with powder and the ejection of gel product.

Figure 35:
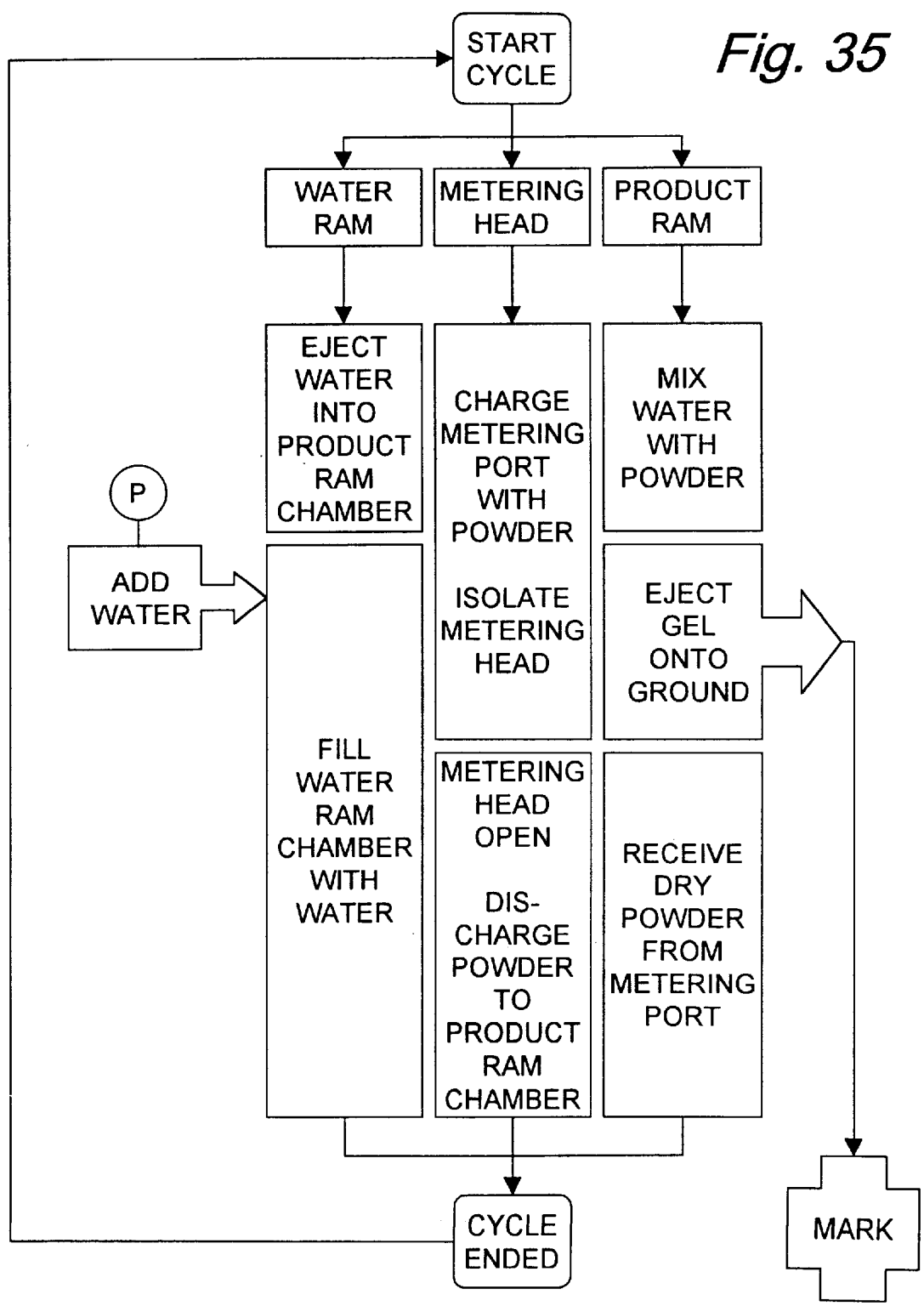
FIG. 35 is flow chart of the water and product ram cycles for taking on water and powder respectively, mixing and making the gel product and discharging the gel product.
Figure 36:
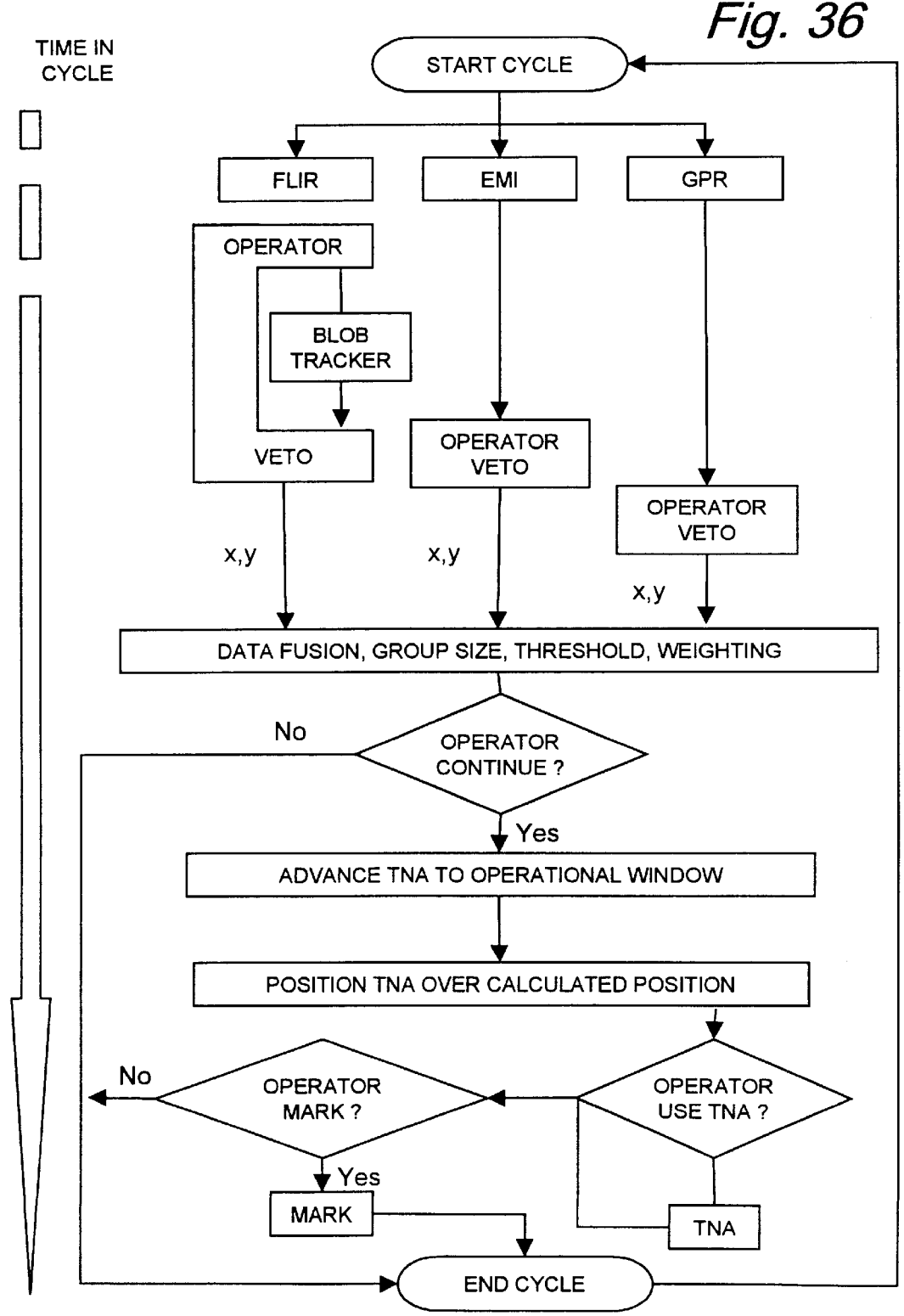
FIG. 36 is a block flow diagram of the operator interaction with the data fusion process to declare a TOI and the decision to mark a TOI as a mine.
Figure 37A:
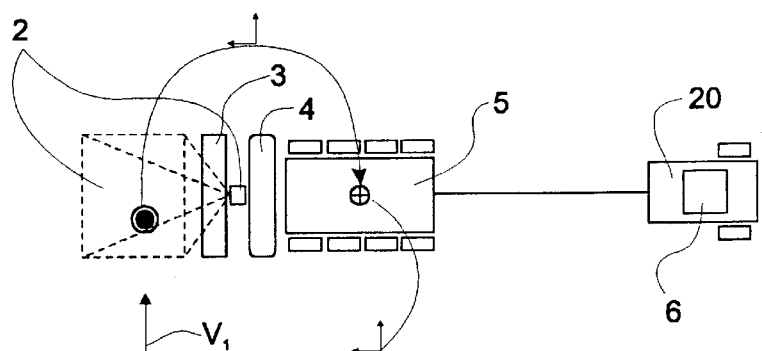
FIGS. 37a–37d are schematic representations of a time sequenced scanning of the ground wherein each figure represents the variation in coordinates of the detected object by each of the three leading sensors and the one trailing sensor, the variation being due to navigational drift.
Figure 37B:
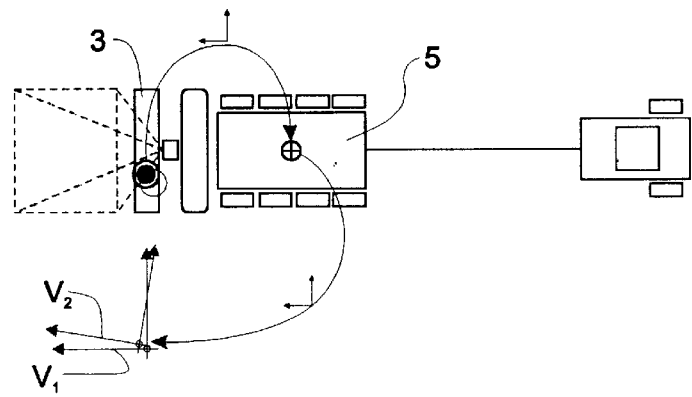
Figure 37C:
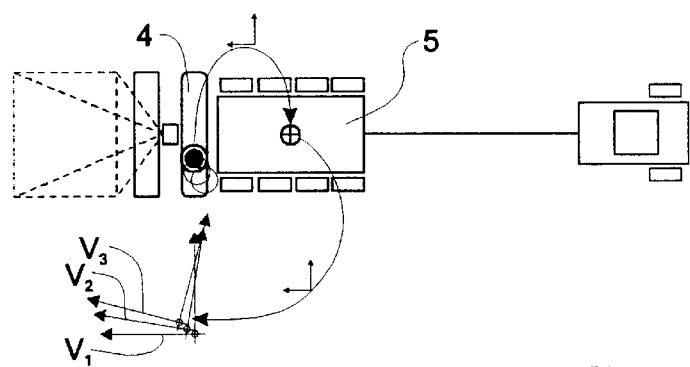
Figure 37D:
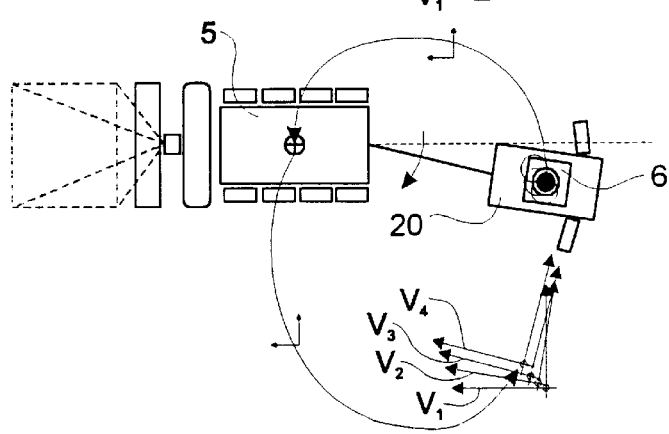

The charging/discharging cycle is illustrated in FIG. 35.

When actuated to the charging position (FIG. 33a), the following occurs. The ⅞" diameter by ½" deep metering port 224 is moved to the charging position under the hopper discharge port 215 for accepting a metered volume of the polymer powder. The isolation plate 218 seals the manifold 208 from the metering head 207 and hopper 206.

While the metering and isolation plates 216,218 are still at the charging position, the following steps can occur. The water ram 209 is actuated to move water from the water chamber 235a, through the first passage 250 and into the product chamber 235b for mixing with polymer powder present from the previous cycle. Air is bled from the product chamber 235b while water is transferred. The water and powder mix to form the gel product. The product ram 210 is then actuated for pressurizing and ejecting the gel product out through the manifold's second passage 253 and the discharge tube 211 without subjecting the gel product to excessive mechanical agitation or flow-back into the metering head 207 or hopper 206.

When actuated to the discharging position (FIG. 33b), the following occurs. The metering plate port 224 is positioned to discharge the metered polymer through the aligned guide block 217, isolation plate 218 and manifold ports 227 so that it enters the product chamber 235b of the product ram 210. The metering plate 216 seals the hopper discharge port 215. As it is disadvantageous to contaminate the guide block isolation plate ports 217,218 of the metering head 207, it is necessary to return the metering and isolation plates 216,218 to the charging position before mixing the gel product and discharging it.

If the discharge point of the discharge tube 211 is known relative to the location of the object or site to be marked then the tube so directed to that location for discharge of the marking gel product.

If the marking apparatus is not going to be used right away, it is flushed with water to clean the product chamber 235b, manifold port 227, second passage 253 and product discharge tube 211 of gel product.

Optionally, powdered dye can be added to the polymer powder before mixing.

Once discharged, the product gel has the following advantages:

it is visible even from the side due to its bulk, and highly visible due to the dye, visibility continuing for several hours and in even low light conditions using a fluorescent dye;

the gel components are easily obtained, stored and are inexpensive;

the apparatus is simple, requires little maintenance and easy to operate; and after its useful life of several hours, the mark (gel product) degrades in an environmentally-friendly manner, substantially disappearing completely in 48 hours under drying, sunlight or rain conditions.

Overall System In Operation

The MVMMD is operated in a stop-and-go manner. In conventional mine detection and clearing, it is the neutralisation of the mines which is the most time consuming and thus, stopping for confirmation is not a significant impact.

The antipersonnel mine clearance vehicle precedes the MVMMD. Sufficient time should pass so that the IR disturbance dissipates. For a finger plow, in good IR conditions, 20–30 minutes should suffice.

Referring to FIGS. 36, 37a–37d, the coordinates of a first detection or alarm located by the IR are transformed to vehicle coordinates then into world coordinates. Meanwhile the RDV has moved on and the EMI is scanning over the same object. If it also declares an alarm, then those coordinates are transformed to RDV vehicle 5 and then to world coordinates. Due to navigation drift, the detected object located by the EMI may be assigned world coordinates which are slightly different than the coordinates of the same object detected by the IR. The vehicle and sensor frame V1,V2,V3,V4 has drifted in the world frame. The coordinates assigned by the GPR for the same object can be different for both previous coordinates.

The error is shown to increase as the vehicle and sensors advance. With each successive alarm, even if co-incident, an ever widening error circle is associated with the an TOI's supposed coordinates. Accordingly, the TNA will be positioned within an error circle which encompasses all the accumulated errors.

Spatial Correspondence, Fusion, Confirmation

The plurality of alarms or detections identified by the plurality of sensors are displayed on a single screen, simplifying the human operator's role in data fusion and establishing one or more targets of interest.

The IR produces a "blob" which the operator can track through across the screen as it get closer and closer to the bottom of the field of view. The coordinates of the blob are most accurate at the bottom. This is due to a path which is not flat. Having reference to FIG. 38, as the FLIR views further ahead, the coordinates of an object appears to have a lesser X-coordinate than it really has. This error occurs even in the sensor's own coordinates. The operator is best served to mark the blob with an X when it reaches the bottom of the screen or the closest point in the filed of view of the FLIR. The system assists the operator by providing a "Blob-Tracker" routine. The operator marks the blob and the Blob Tracker re-centres the mark in the blob as the blob progresses down the screen so that it is marked at its most accurate location for the FLIR when the blob leaves the screen.

As result of the errors described above, an ever larger error circle is built up: once due the drift of the navigational system and secondly due to the sensors own resolution.

Intuitively one can see that the center of an error circle placed over the three sensor circles is likely best located shifted more towards the EMI rather than the FLIR. This is a weighting decision and is easily implemented mathematically. Weighting can vary with environmental conditions, for example, with a sunny day and flat ground, the IR can be very effective and its weighting factor will be greater.

Some data fusion techniques which can be applied by the system include applying thresholds to detection by each leading sensor. Note that a zero threshold means that any disturbance will be labelled a detection and increase the Pd but also increase the FAR. Higher thresholds will reduce the FAR. Thresholds are preferably determined empirically.

Further, certain thresholds can be pre-set for assessing the coincident detections by two or more sensors. Clearly three strong coincident detections is strong and worthy labelling as a target of interest. Three weak coincident hits may also be of interest. Further, a strong detection on any one sensor may be sufficient. Weak on any two or more may be sufficiently strong to perform confirmatory TNA.

Figure 39:
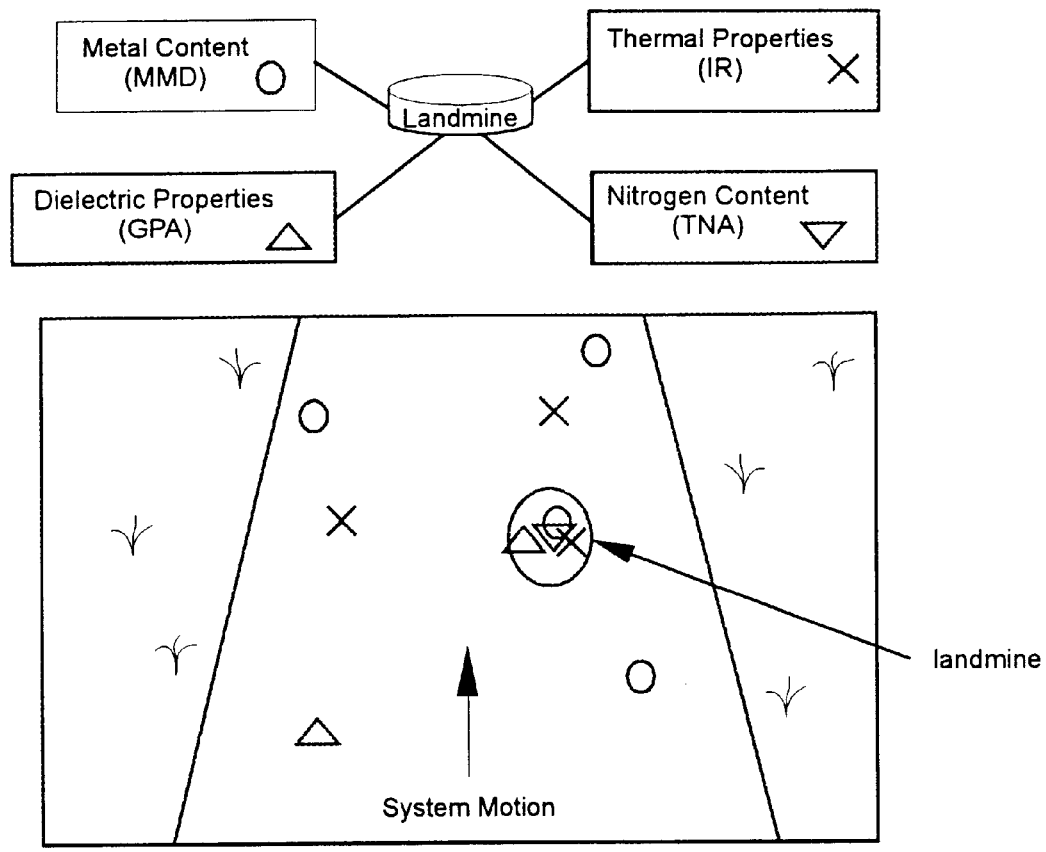
FIG. 39 is an illustration of the operators view at the workstation, of each of the leading sensors and the trailing TNA.
Figure 40:
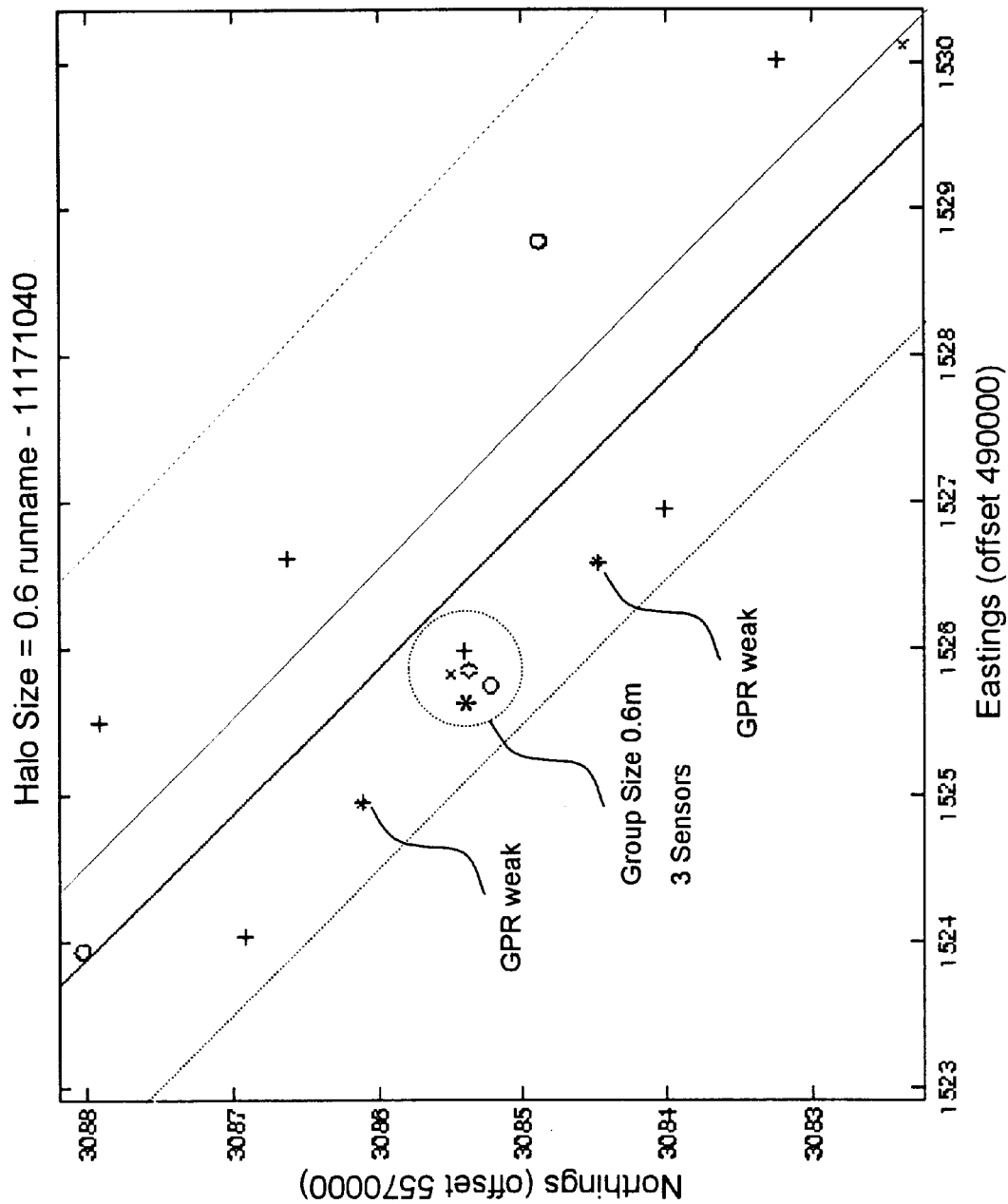
FIG. 40 is a graph illustrating the detection of alarms by each of the sensors on an actual roadway where + GPR, x IR, o EMI and * is a mine; The () indicated three alarms within a grouping of 0.6 meters and thus qualified for confirmation TNA.

Having reference to FIG. 39, on the screen of the workstation 54, top to bottom corresponds to a lineal section of the path ahead. First the operator, assisted by the Blob Tracker, can follow an IR detection down the screen to the bottom of view, making a detection which is significant or unmarking a marked detection. The computer then includes and displays the EMI and GPR hits. Thresholds, such as grouping size, are applied to determine it the detections become a TOI worthy of TNA confirmation. All of the above detections appear as icons of the screen. Before the icons disappear off of the bottom of the screen, the operator still has an opportunity to cancel even a strong correspondence if the operator has information the computer does not have.

Once the last detected hit in the screen is marked as a TOI, the RDV must be stopped to position the TNA. The computer calculates an operational window which is within the radial and polar movement of the TNA. The stop must be controlled to avoid skidding and introducing errors which cannot be compensated for. Further, one would want to avoid backing up.

The TNA requires the TOI to be within a 30 cm radius to be detected. From the first detection by the FLIR to a TNA about 10 meters behind, the overall positional error cannot be >1% or else the coordinates of the TOI could be outside the 30 cm and thus required multiple positioning, doubling the time to confirm a TOI.

The navigational system need only be accurate over traversed distance between the FLIR and the TNA.

MVMMD Vehicle RESULTS

Figure 41:
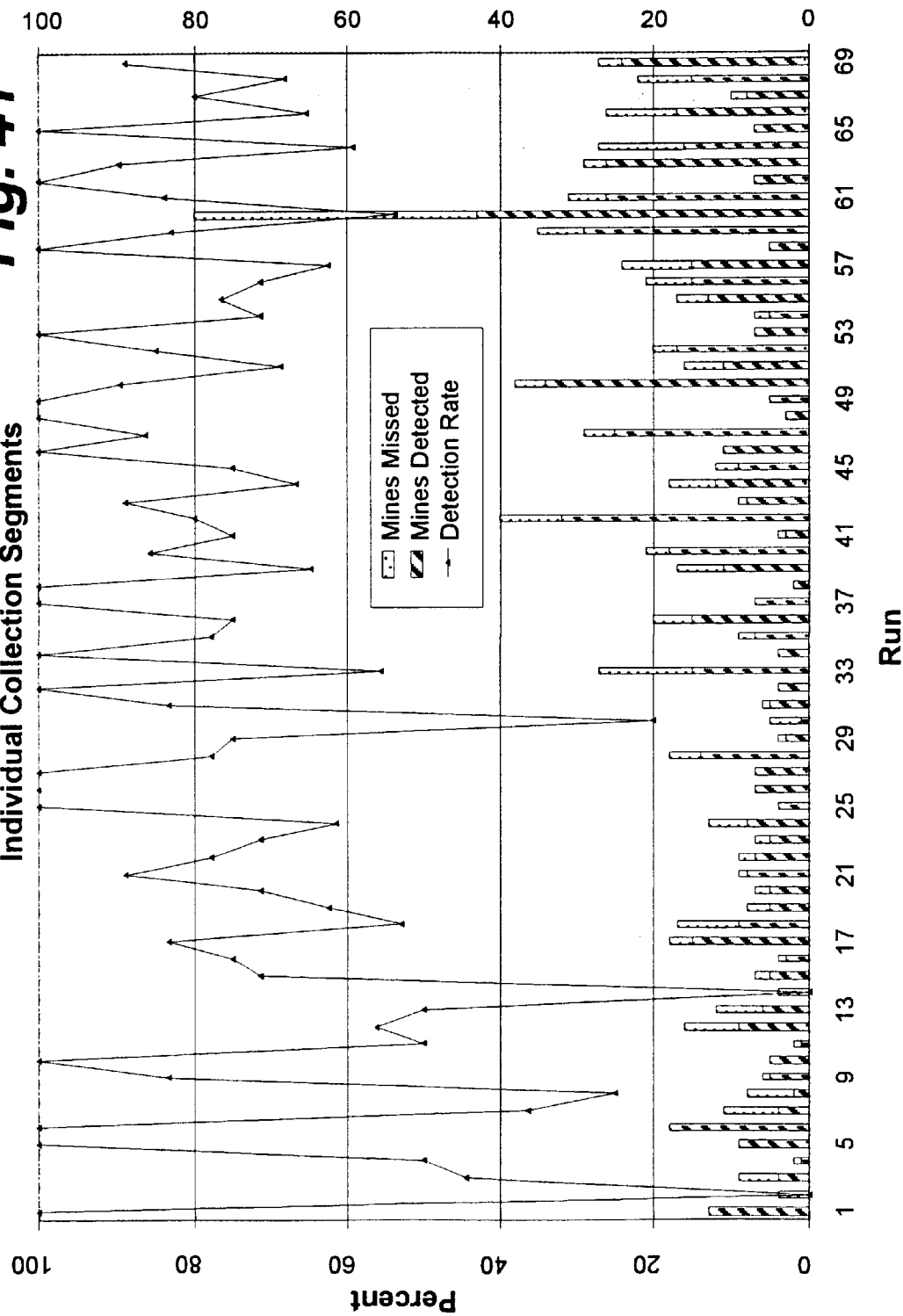
FIG. 41 is a graph illustrating the performance of the MVMMD using the three leading sensors FLIR, EMI, GPR and visible light camera. Each run was sequential and improved detection is partly due to increasing operator experience.
Figure 43A:
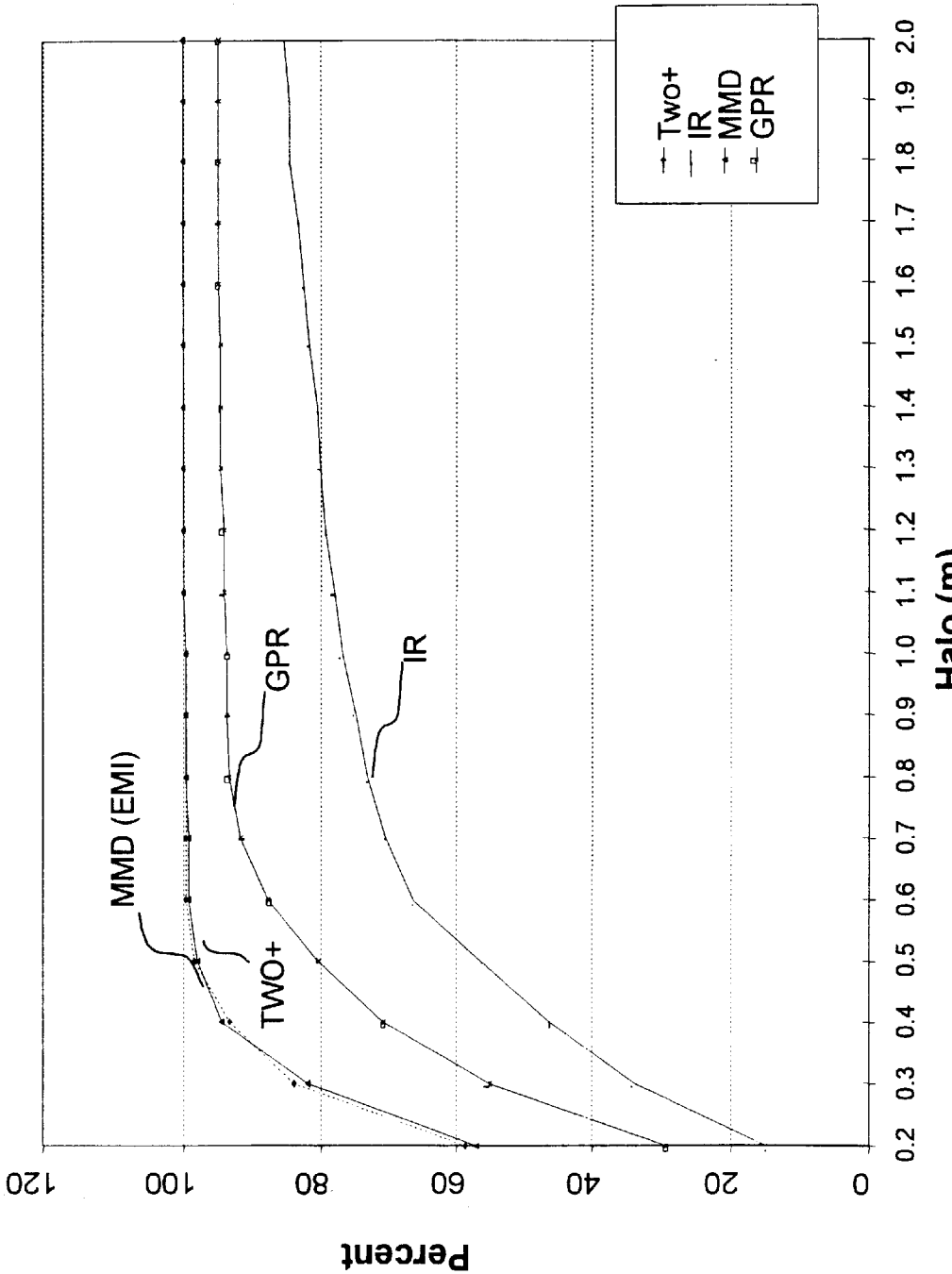
FIGS. 43a and 43b are post run analysis of the success of the detection fusion algorithms based on the size of the scoring halo. The results are illustrative of the trade off between choosing a large halo to get a high Pd yet also by getting a correspondingly high FAR.
Figure 43B:
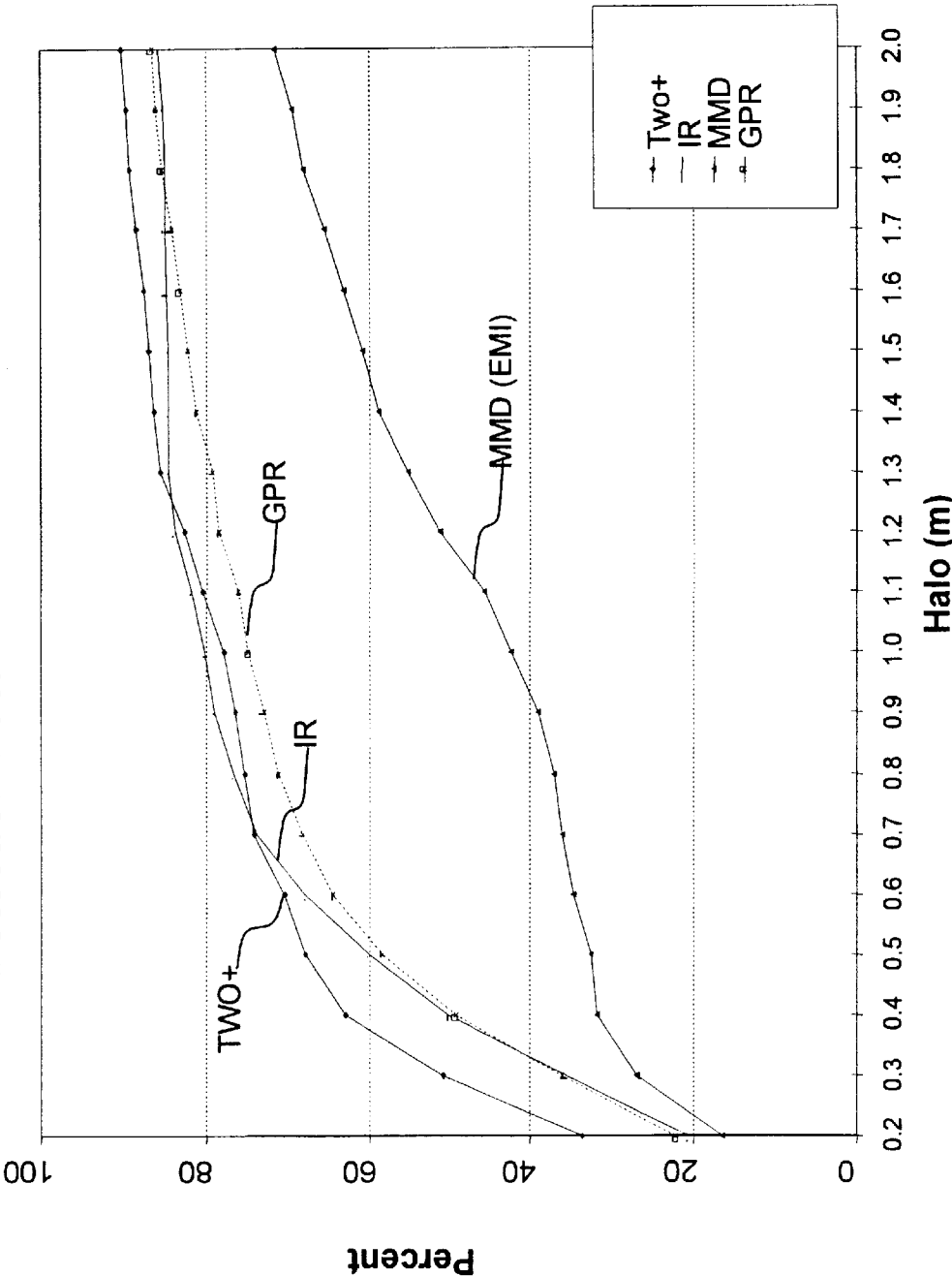
Figure 44A:
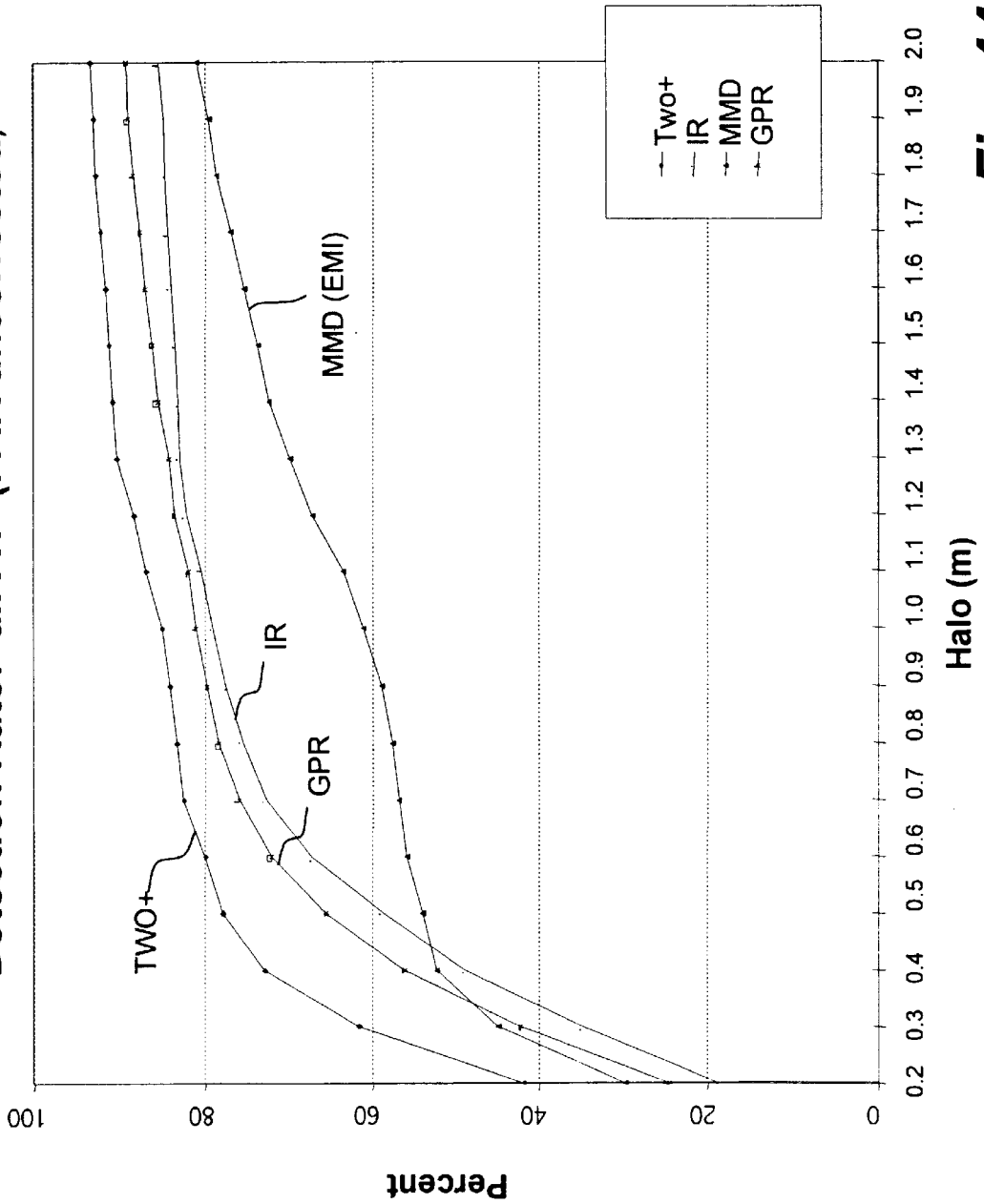
FIGS. 44a and 44b illustrate the post run analysis comparing the high Pd (FIG. 44a) with a FAR correction illustrating that a halo of 0.6 m is optimal.
Figure 44B:
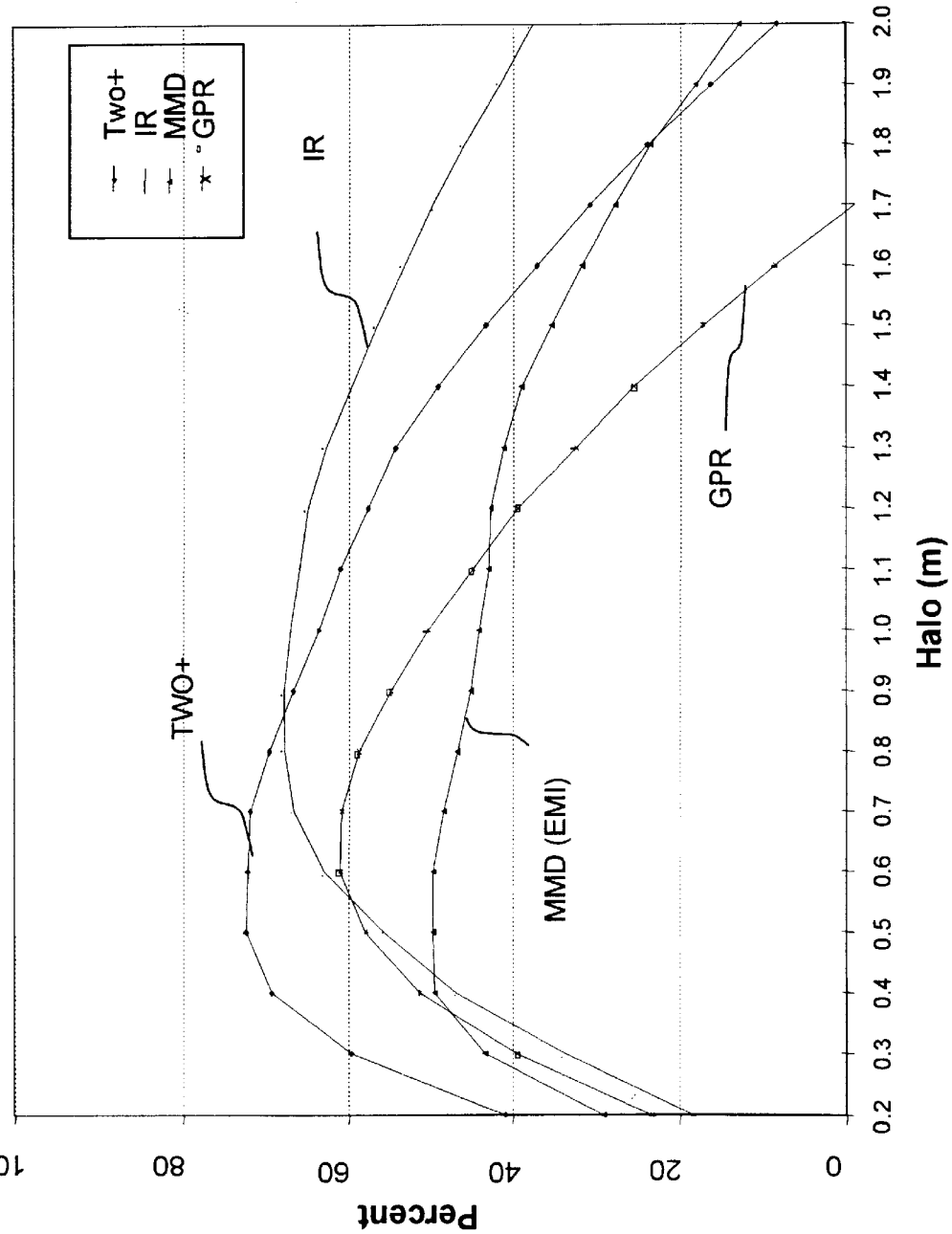
Figure 45A:
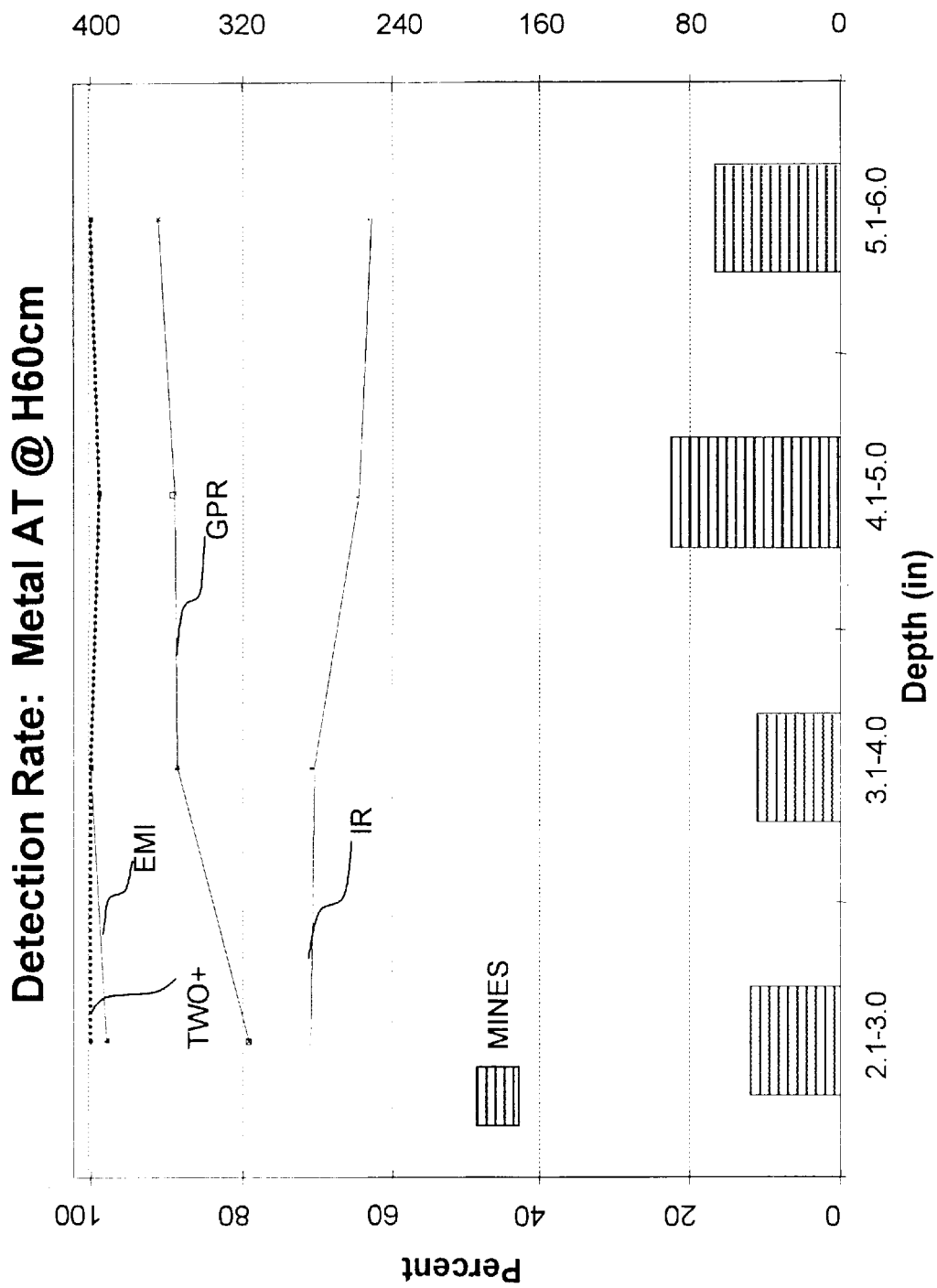
FIGS. 45a and 45b illustrate the performance based upon mine type and depth.
Figure 45B:
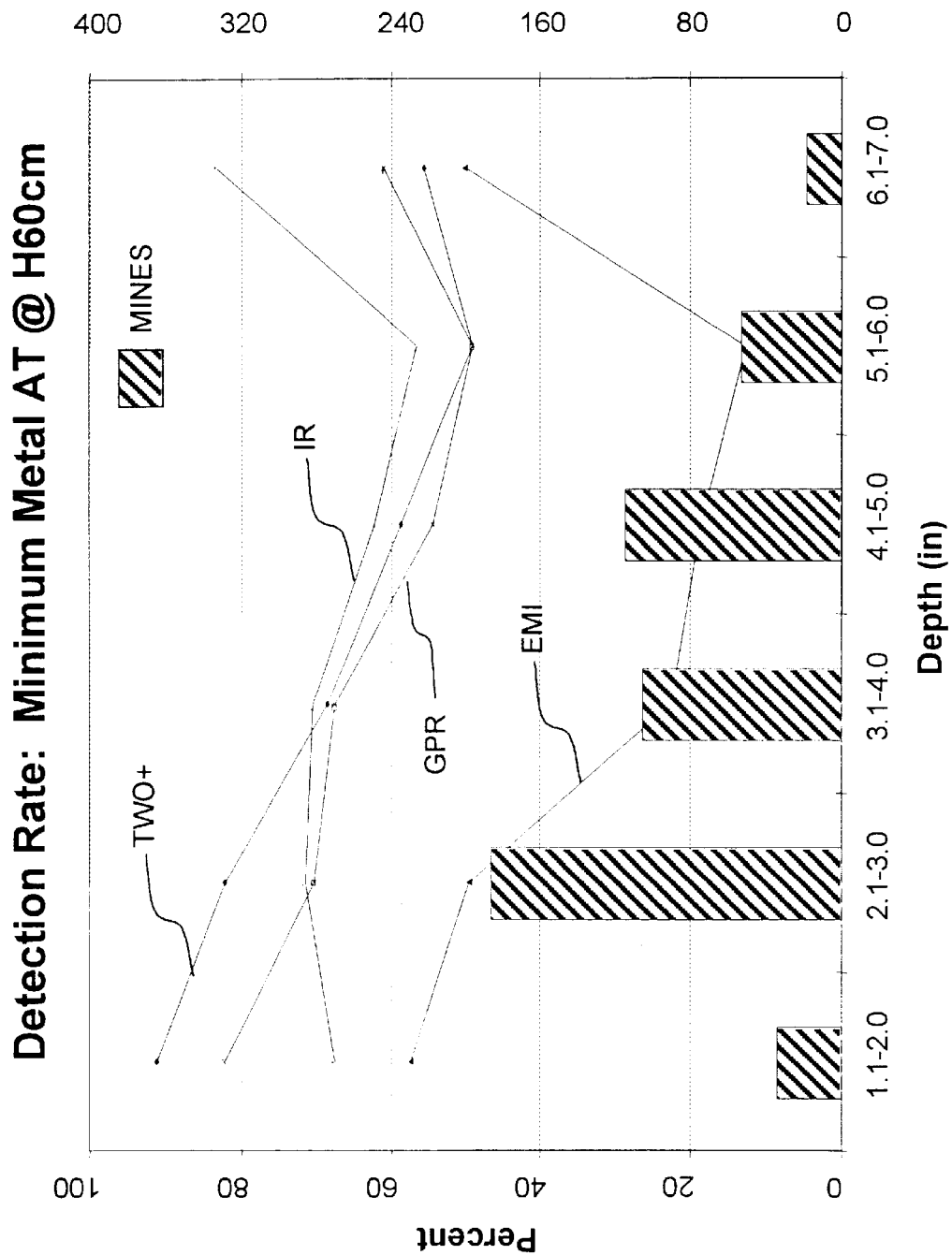
Figure 46A:
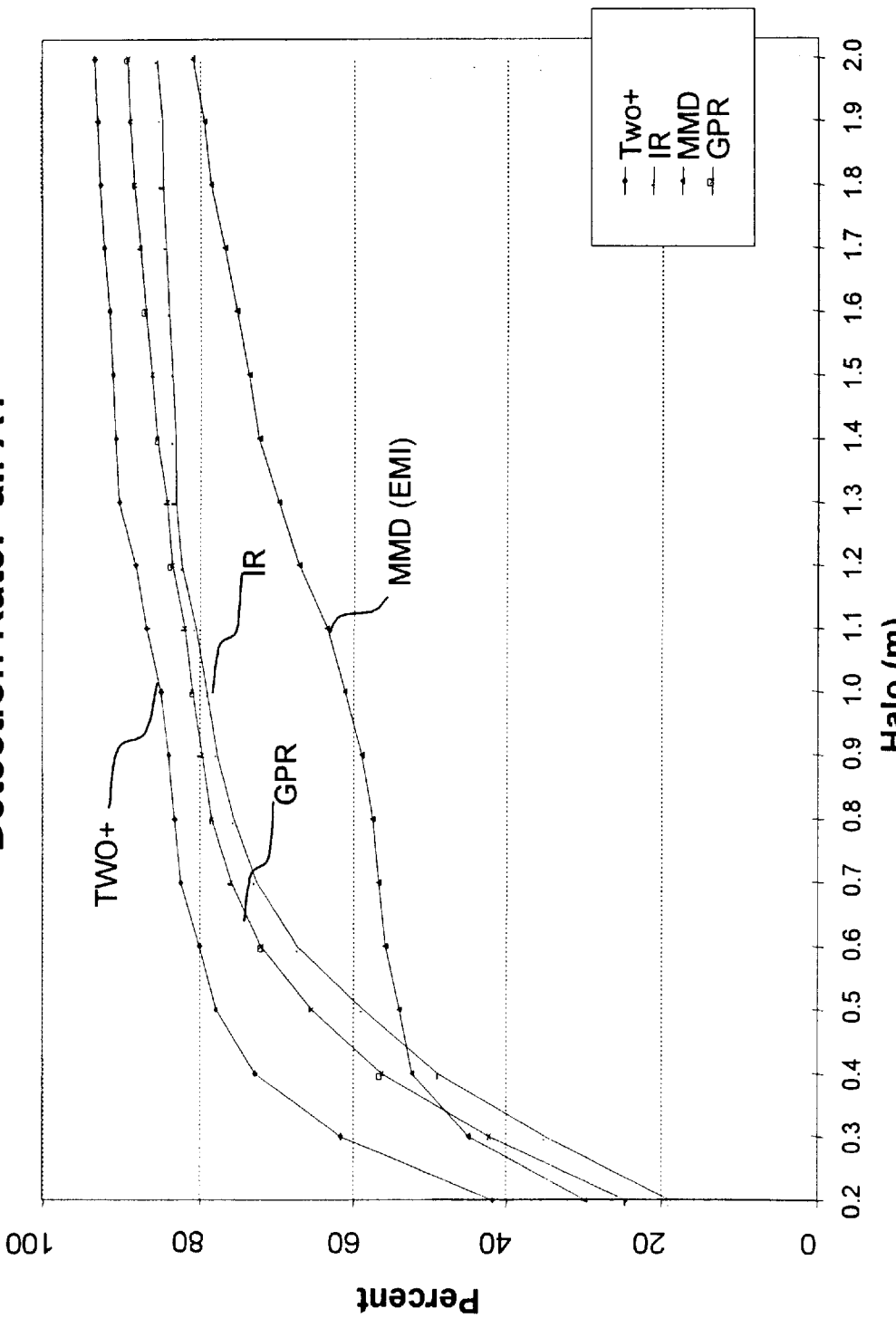
FIGS. 46a and 46b illustrates detection rate over all per FIG. 44a for all antitank mines against Pd performance as against mine depth.
Figure 46B:
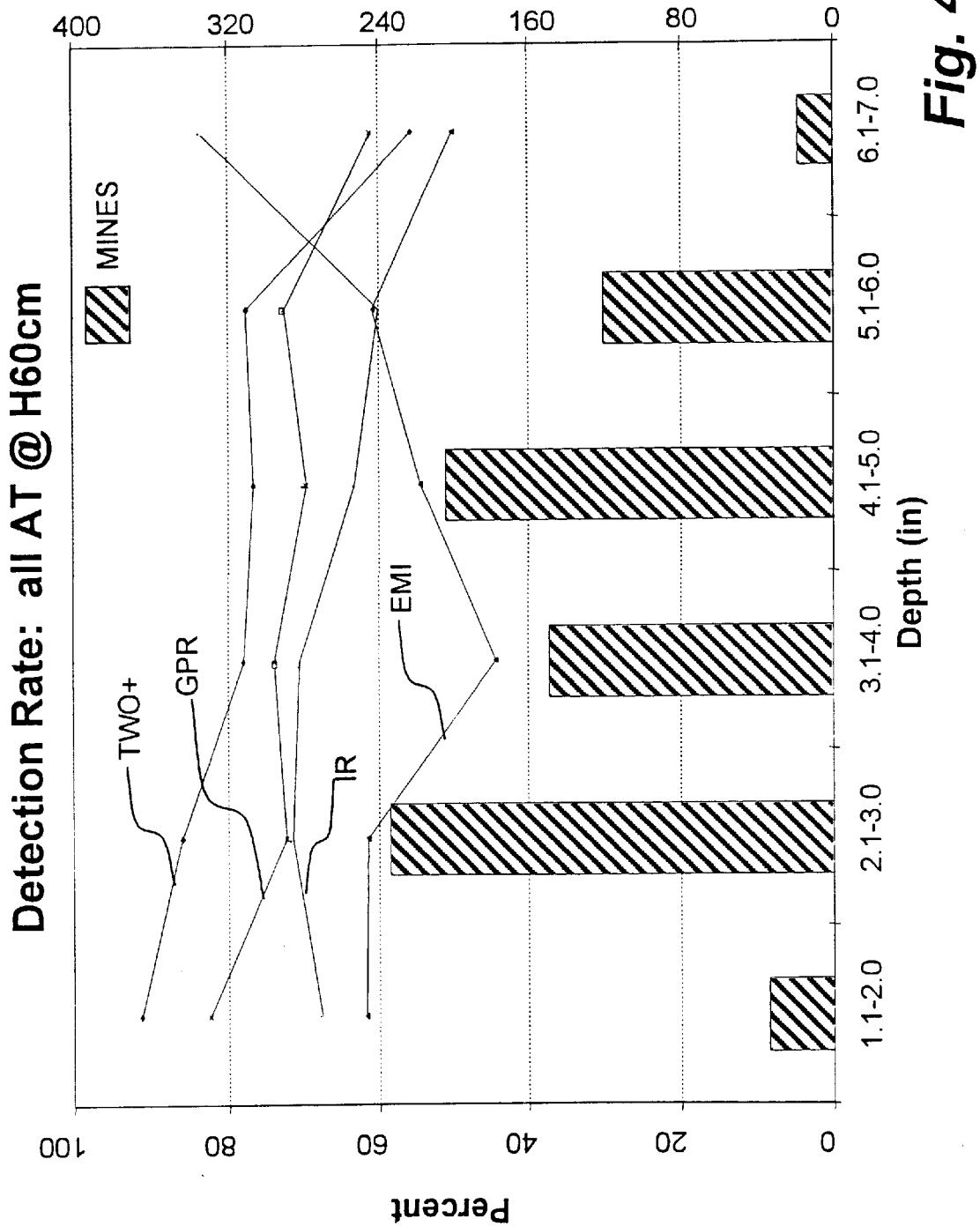

Having reference to FIGS. 40–46b, actual results are depicted for use of each of the sensors on an actual roadway where + GPR, x IR, o EMI and * is a mine. For a grouping size of 0.6 m, there were three alarms provided by the GPR, IR and EMI. This was sufficient to declare the three alarms as a TOI for confirmation by the TNA. FIG. 41 is a graph illustrating the performance of the MVMMD when applied against a roadway prepared with mines, the distribution of which is illustrated in FIGS. 42a and 42b. Each run was sequential in time and demonstrated improved detection due in part to increasing operator experience.

In the detection trial results of FIGS. 42a–46b, the legend two+ indicates an elementary data fusion approach of declaring a TOI if two sensors detected alarms within a 0.6 m group size.

The embodiments of the invention in which an exclusive property or privilege is claimed are defined as follows:

1. A mine detector adapted for travelling over objects on or under the ground and for identifying which of said objects are mines comprising:
   a vehicle for advancing over the objects;
   one or more sensors leading the vehicle and being supported therefrom, said leading sensors being operative to sense objects which they advanced over while the vehicle is in motion and establishing the coordinates of said sensed objects;
   means for tracking the coordinates of the sensed object as the vehicle advances over the sensed object;
   a sensor trailing the vehicle and being connected thereto, said trailing sensor being operative to confirm whether a sensed object is a mine when the trailing sensor dwells stationary over the sensed object; and
   means for positioning said trailing sensor stationary over the established coordinates of the sensed object and operating said trailing sensor for confirming whether the sensed object is a mine.

2. The apparatus as recited in claim 1 wherein the means for positioning the trailing sensor comprises:
   means for moving the trailing sensor radially towards and away from the vehicle; and
   means for moving the trailing sensor laterally, said lateral means being operable independently of the radial moving means.

3. The apparatus as recited in claim 2 wherein the trailing sensor is a sensor employing thermal neutron interrogation and gamma ray detection.

4. The apparatus as recited in claim 3 wherein the gamma ray detection is performed at about 10.8 MeV using a Sodium Iodide detector.

5. The apparatus as recited in claim 4 further comprising a strong neutron source and wherein the Sodium Iodide detector produces scintillation events, the apparatus further comprising:
   means for detecting the scintillation events and producing pulses representing a high rate of detected gamma rays; and
   means for high speed rejection of piled-up pulses.

6. The apparatus as recited in claim 2 wherein means for positioning the trailing sensor comprises:
   a trailer towed behind the vehicle and connected thereto by a pivot, the trailing sensor being mounted in the trailer;
   means for moving the trailer radially towards and away from the vehicle; and
   means for pivoting the trailing sensor laterally, said lateral means being operable independently of the radial moving means.

7. The apparatus as recited in claim 6 wherein means the trailing sensor is further radially movable within the trailer.

8. The apparatus as recited in claim 7 wherein the vehicle is unmanned and is remotely controlled from a personnel-carrying command vehicle.

9. The apparatus as recited in claim 1 wherein the leading sensors determine the coordinates of the sensed object relative to the leading sensors and the means for tracking the coordinates of the sensed object comprise:
   navigational sensors for determining the coordinates of the vehicle relative to the ground; and
   a controller for determining the coordinates of the leading sensors relative to the vehicle and for using the coordinates of the sensed objects relative to the leading sensors, and the coordinates of the vehicle relative to the ground so as to establish coordinates of the sensed object relative to the ground.

10. The apparatus as recited in claim 9 wherein the means for positioning the trailing sensor further comprises:
    positional sensors for determining the coordinates of the trailing sensor relative to the vehicle wherein the controller uses the determined coordinates of the vehicle relative to the ground, the determined coordinates of the trailing sensor relative to the vehicle, and the established coordinates of the sensed object relative to the ground; and
    actuating means for positioning the trailing sensor over the established coordinates of the sensed object.

11. The apparatus as recited in claim 7 further comprising means associated with the trailing sensor for placing a mark at the coordinates of the sensed object if it is confirmed as a mine.

12. The apparatus as recited in claim 10 wherein:
    the coordinates of the leading sensors relative to the vehicle are predetermined and stored for performing spatial registration of the coordinates of the leading sensors and the coordinates of the vehicle.

13. The apparatus as recited in claim 10 wherein the controller further:
    assigns errors to the determined coordinates of the sensed object relative to the leading sensors;
    assigns errors to the determined coordinates of the vehicle relative to the ground;
    performs data fusion on the determined coordinates and assigned errors for both the sensed object and the vehicle so as to establish a range of coordinates of the sensed object relative to the ground.

14. The apparatus as recited in claim 13 wherein the navigational sensors are subject to drift error, further comprising:
assigning an error circle to the determined coordinates of the sensed object relative to the ground, the error circle encompassing the drift error so that the sensed object lies somewhere within the error circle, so that positioning of the trailing sensor within the error circle will confirm whether the sensed object is a mine.

15. The apparatus as recited in claim 10 wherein the leading sensors comprise at least a metal detecting sensor.

16. The apparatus as recited in claim 15 wherein the leading sensors further comprise a ground penetrating radar sensor.

17. The apparatus as recited in claim 16 wherein the leading sensors further comprise an infrared sensor.

18. The apparatus as recited in claim 10 wherein the leading sensors produce two or more coordinates for a sensed object, the controller further comprising:
means for performing data fusion for determining if each of the coordinates represents a sensed object which is a target of interest, and if it is a target of interest, determining its coordinates or range of coordinates over which the trailing sensor should be positioned.

19. The apparatus as recited in claim 10 wherein the navigational sensors comprise:
an inertial sensor;
a magnetometer; and
a ground speed measurement sensor so that vehicle attitude, heading and rotational rates, inertial velocities and coordinates.

20. The apparatus as recited in claim 19 wherein the navigational sensors further comprise two laterally spaced ground measurement sensors for permitting determination of the vehicle rotation.

21. A method for determining whether an object on or under the ground's surface is a mine comprising:
providing one or more sensors capable of sensing the presence of an object while the sensors are moving across the ground and a confirmatory sensor which, when stationary, is capable of confirming whether an object is a mine;
traversing the ground with the moving sensors for sensing an object and establishing the coordinates of said sensed object;
positioning the confirmatory sensor over the coordinates of the sensed object; and
dwelling the confirmatory sensor stationary over the sensed object; and
operating the confirmatory sensor to confirm whether the sensed object is a mine.

22. The method as recited in claim 21 further comprising:
placing a physical mark at the coordinates of a sensed object which is confirmed as a mine.

23. The method as recited in claim 21 further comprising:
preparing a mixture of superabsorbent polymer, dye and liquid for forming a highly visible, voluminous semi-solid gel; and
placing the gel at the coordinates of a sensed object which is confirmed as a mine.

24. The method as recited in claim 21 wherein the confirmatory sensor is a nuclear sensor capable of producing a thermal neutron flux and having detectors capable of counting events from emitted gamma rays, and operating the confirmatory sensor comprises:
producing a thermal neutron flux for causing the emission of gamma rays from the sensed object;
detecting emitted gamma rays with the detector for establishing the count rate of gamma ray emissions; and
comparing the count rate against pre-determined count rate for gamma ray emissions from known mines.

25. The method as recited in claim 24 further comprising:
producing a strong thermal neutron flux of slow neutrons;
producing an electronic signal having a plurality of pulses representing emitted gamma rays events in the range of about 8.5–11 MeV as indicative of the presence of nitrogen-14;
comparing the number of events with a pre-determined number of events for mine-free ground for establishing whether the sensed object contains statistically significant amounts of nitrogen-14 and is deemed to be a mine.

26. The method as recited in claim 25 further comprising:
analysing the electronic signal for rejecting piled-up pulses; and
analysing the remaining normal pulses as events indicative of the presence of nitrogen-14.

27. The method as recited in claim 21 wherein the moving sensors are mounted to a vehicle, further comprising:
advancing the vehicle so as to advance the moving sensors;
trailing the confirmatory sensor behind the advancing vehicle.

28. The method as recited in claim 27 further comprising
determining the coordinates of the sensed object relative to the one or more moving sensors;
determining the coordinates of the one or more moving sensors relative to the vehicle;
determining the coordinates of the vehicle relative to the ground; and analysing the coordinates of each of the sensed object, the one or more sensors and the vehicle for
determining the coordinates of the sensed object relative to the ground.

29. The method as recited in claim 28 further comprising:
slowing the movement of the vehicle to a stop while continuing to determine the coordinates of the sensed object relative to the ground;
positioning the trailing confirmatory sensor over the coordinates of the sensed object; and
dwelling the confirmatory sensor over the sensed object and operating it to confirm whether the sensed object is a mine.

30. The method as recited in claim 29 further comprising:
determining the coordinates of the trailing sensor relative to the vehicle;
determining the coordinates of the trailing sensor relative to the ground using the determined coordinates of the vehicle relative to the ground;
continuing to determine the coordinates of the trailing sensor relative to the vehicle and the ground while positioning the trailing confirmatory sensor over the determined coordinates of the sensed object.

31. The method as recited in claim 21 further comprising
determining the coordinates of the sensed object relative to the one or more moving sensors;

determining the coordinates of the one or more moving sensors relative to the ground; and determining the coordinates of the sensed object relative to the ground.

32. The method as recited in claim 31 further comprising determining one or more coordinates of the sensed object relative to the one or-more moving sensors;

performing data fusion on the one or more coordinates of the sensed object and the coordinates of the one or more moving sensors for determining a range of coordinates for the sensed object which are relative to the ground.

33. The method as recited in claim 32 further comprising associating each of the one or more coordinates of each of the one or more sensors with an error range and a weighting factor;

performing data fusion on the error range and weighting factor for determining a range of coordinates for the sensed object.

34. The method as recited in claim 33 further comprising assigning each of the one or more sensors with a weighting factor representing its sensitivity to the environmental conditions;

determining the environment conditions;

performing data fusion including adjusting each environmental weighting factor for the environmental conditions for each of the one or more sensors and determining a range of coordinates for the sensed object.

* * * * *